(12) United States Patent
Wang et al.

(10) Patent No.: US 9,922,394 B2
(45) Date of Patent: Mar. 20, 2018

(54) DISPLAY APPARATUS AND METHOD FOR DISPLAYING SPLIT SCREENS THEREOF

(71) Applicant: Samsung Electronics Co., Ltd., Suwon-si, Gyeonggi-do (KR)

(72) Inventors: Tae-ho Wang, Seoul (KR); Ja-ok Koo, Yongin-si (KR); Hyun-soo Nah, Seoul (KR); Eun-kyung Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/959,597

(22) Filed: Dec. 4, 2015

(65) Prior Publication Data

US 2016/0163018 A1 Jun. 9, 2016

Related U.S. Application Data

(60) Provisional application No. 62/088,065, filed on Dec. 5, 2014.

(30) Foreign Application Priority Data

Mar. 10, 2015 (KR) .................. 10-2015-0033176

(51) Int. Cl.
*G06F 3/14* (2006.01)
*G06T 1/20* (2006.01)
*G06F 1/16* (2006.01)

(52) U.S. Cl.
CPC .............. *G06T 1/20* (2013.01); *G06F 1/1601* (2013.01); *G06F 3/1423* (2013.01); *G06F 3/1431* (2013.01); *G06F 3/1446* (2013.01); *G06F 2200/1612* (2013.01); *G09G 2300/026* (2013.01); *G09G 2320/0693* (2013.01); *G09G 2356/00* (2013.01); *G09G 2370/022* (2013.01)

(58) Field of Classification Search
None
See application file for complete search history.

(56) References Cited

U.S. PATENT DOCUMENTS

| 8,150,380 B2* | 4/2012 | Adkins | .......................... 455/416 |
| 8,519,971 B1* | 8/2013 | Mackraz | ................. G06F 3/147 313/504 |
| 2005/0124293 A1* | 6/2005 | Alicherry | ................. G01S 5/14 455/41.2 |

(Continued)

FOREIGN PATENT DOCUMENTS

KR 10-2014-0066384 A 6/2014

*Primary Examiner* — Joni Richer
(74) *Attorney, Agent, or Firm* — Jefferson IP Law, LLP

(57) ABSTRACT

A display apparatus and a method for displaying a screen thereof are provided. The display apparatus is configured to when a slave display apparatus approaches a display apparatus which displays contents, split the contents into a plurality of content split screens and transmit the content split screens to the slave display apparatus to correspond to an arrangement of the display apparatus and the slave display apparatus. The display apparatus is further configured to, when a slave display apparatus comes into contact with a master display apparatus, split contents displayed in the master display apparatus into a plurality of content split screens and transmit the content split screens to the slave display apparatus to correspond to a contact point between the master display apparatus and the slave display apparatus.

20 Claims, 25 Drawing Sheets

(56) References Cited

U.S. PATENT DOCUMENTS

| | | | |
|---|---|---|---|
| 2011/0187657 A1 | 8/2011 | Knowles | |
| 2012/0146898 A1* | 6/2012 | Lin | H04N 21/4432 345/157 |
| 2013/0033415 A1* | 2/2013 | Chang | G06F 3/1431 345/1.3 |
| 2013/0198298 A1* | 8/2013 | Li | H04N 21/41407 709/206 |
| 2013/0307877 A1* | 11/2013 | Alonso | G09G 3/006 345/690 |
| 2014/0145984 A1 | 5/2014 | Yoon et al. | |
| 2014/0232616 A1* | 8/2014 | Drake | H04B 5/02 345/1.2 |
| 2014/0323036 A1* | 10/2014 | Daley | H04H 20/08 455/3.06 |

* cited by examiner

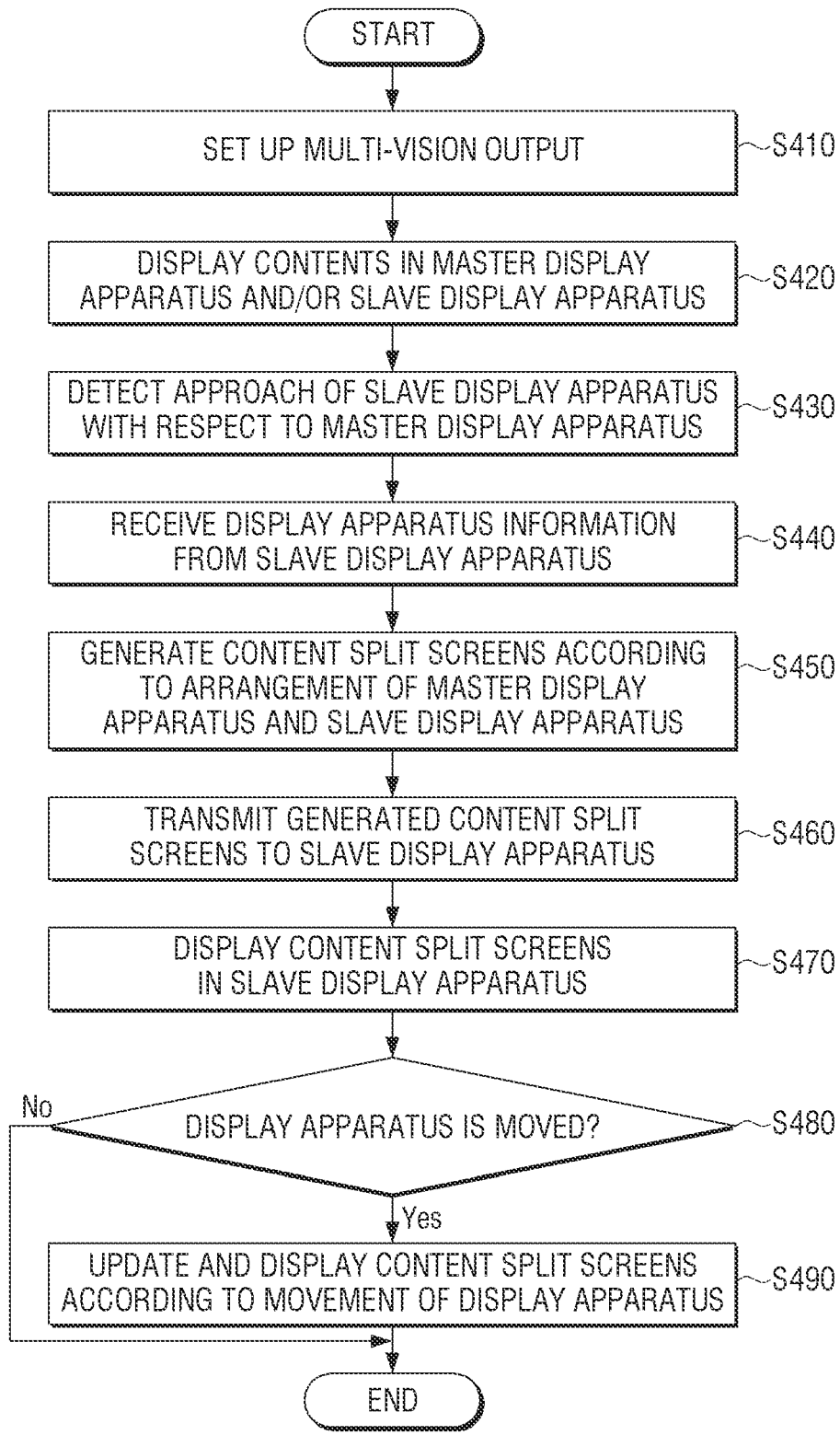

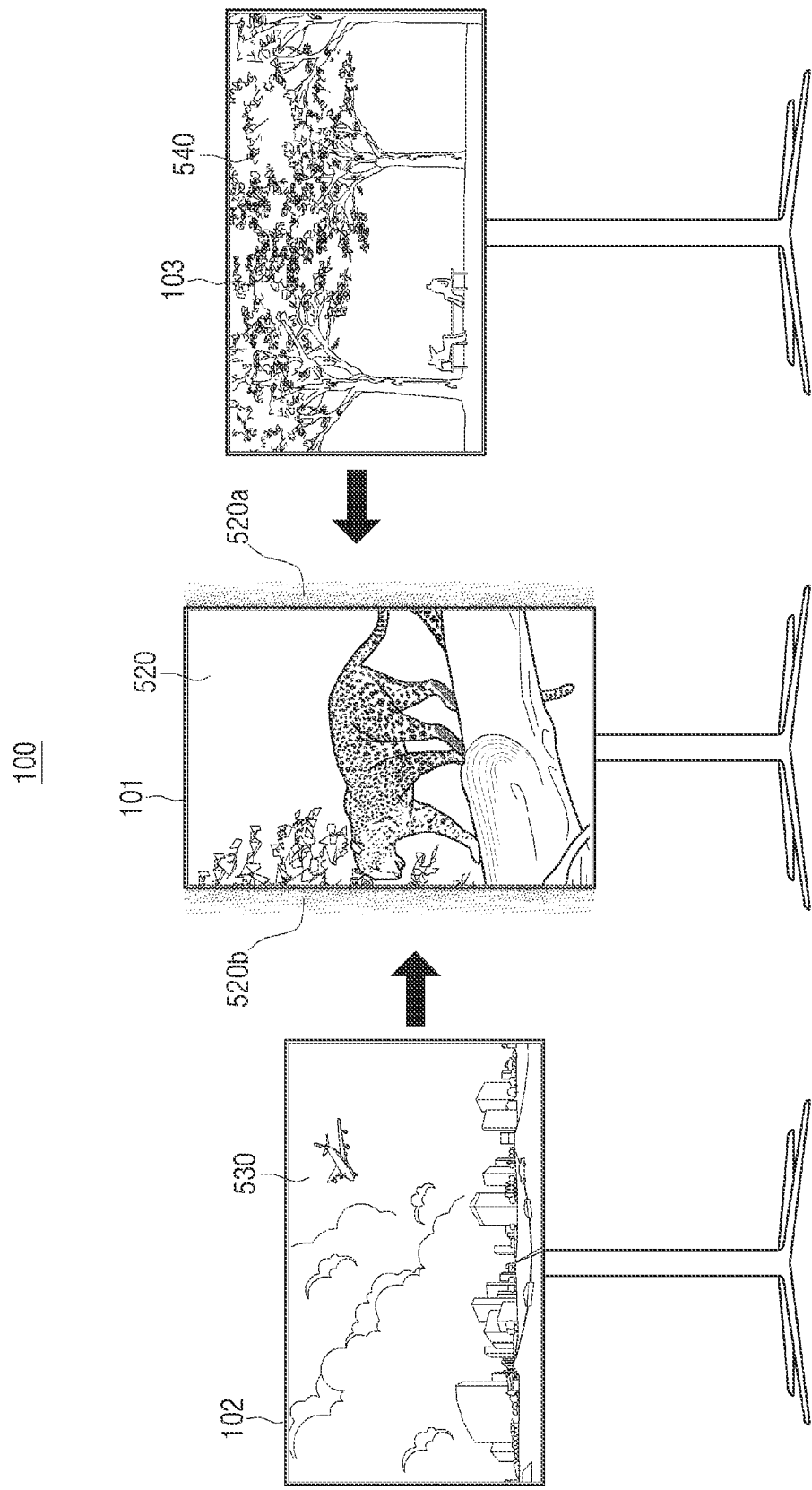

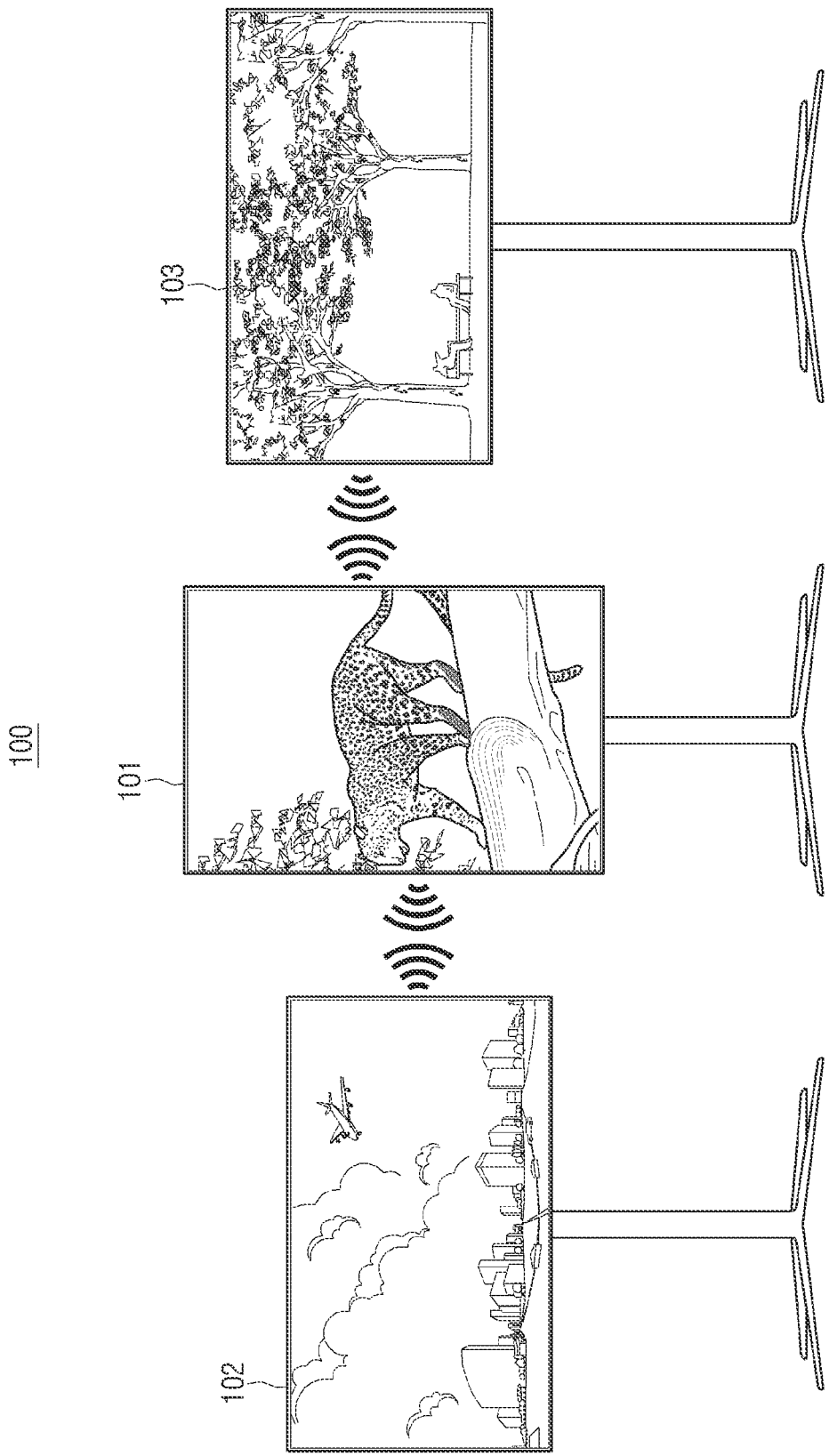

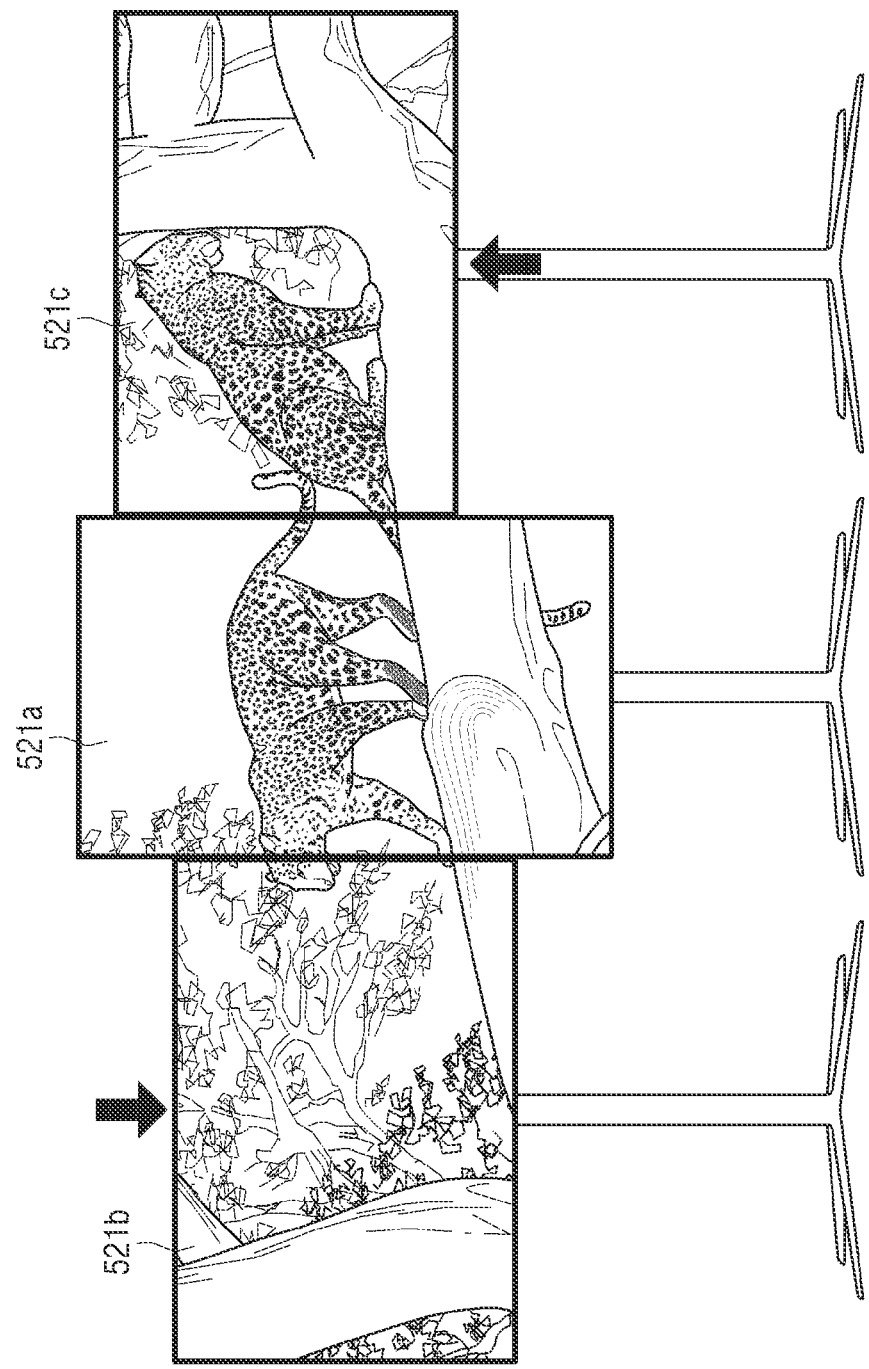

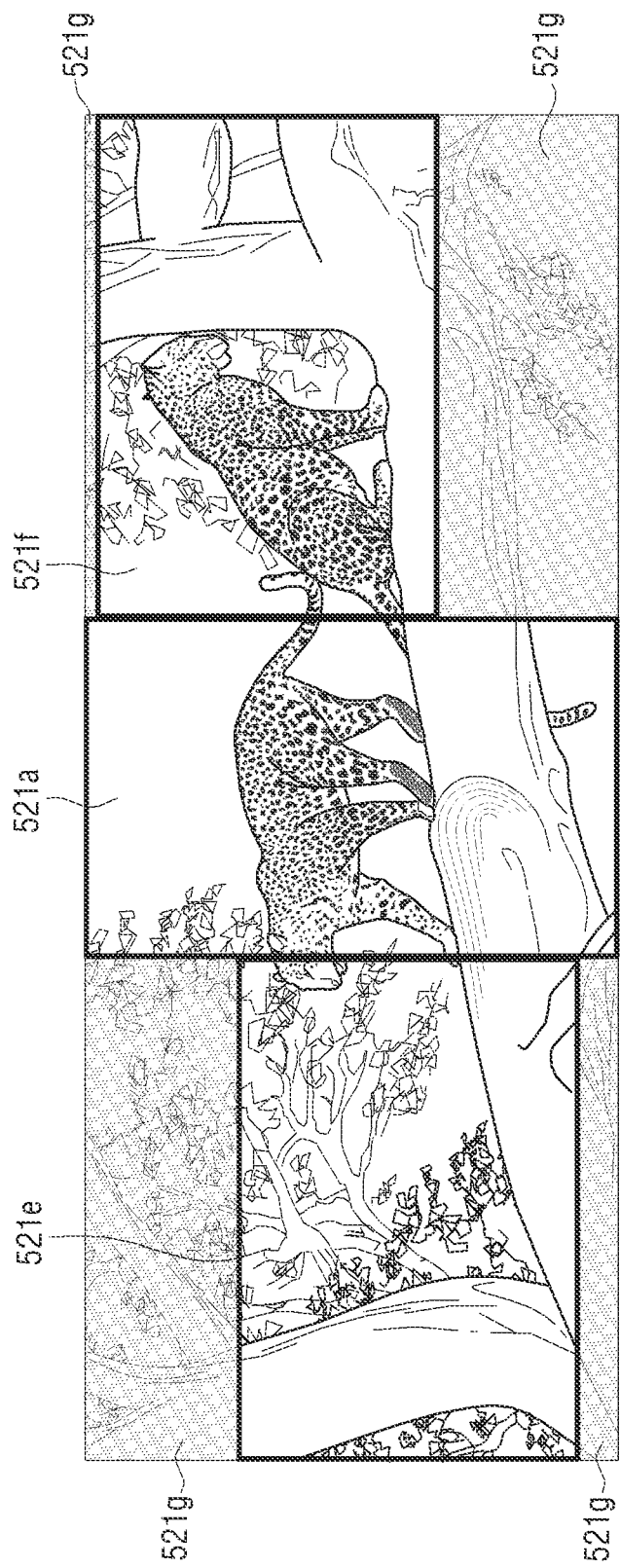

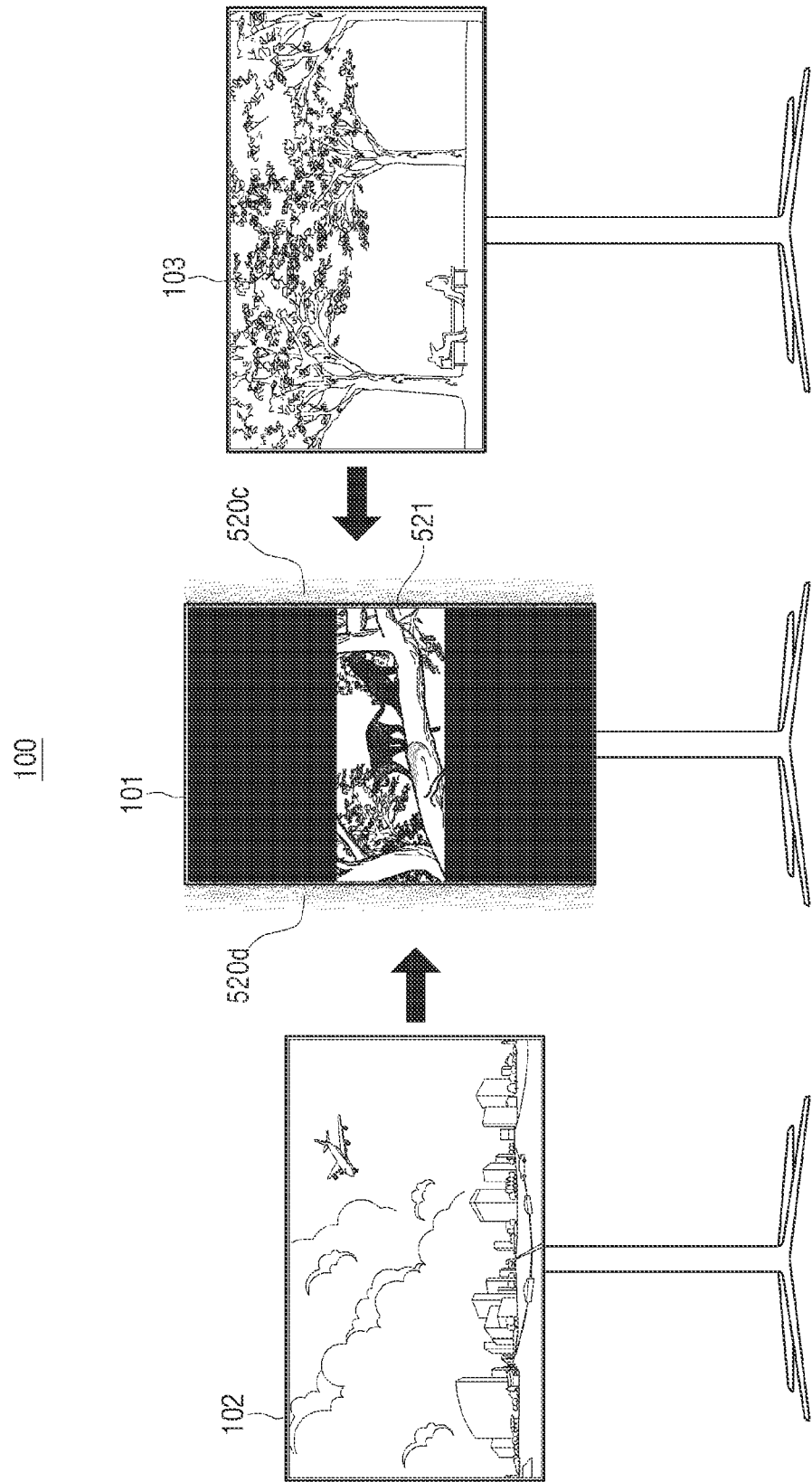

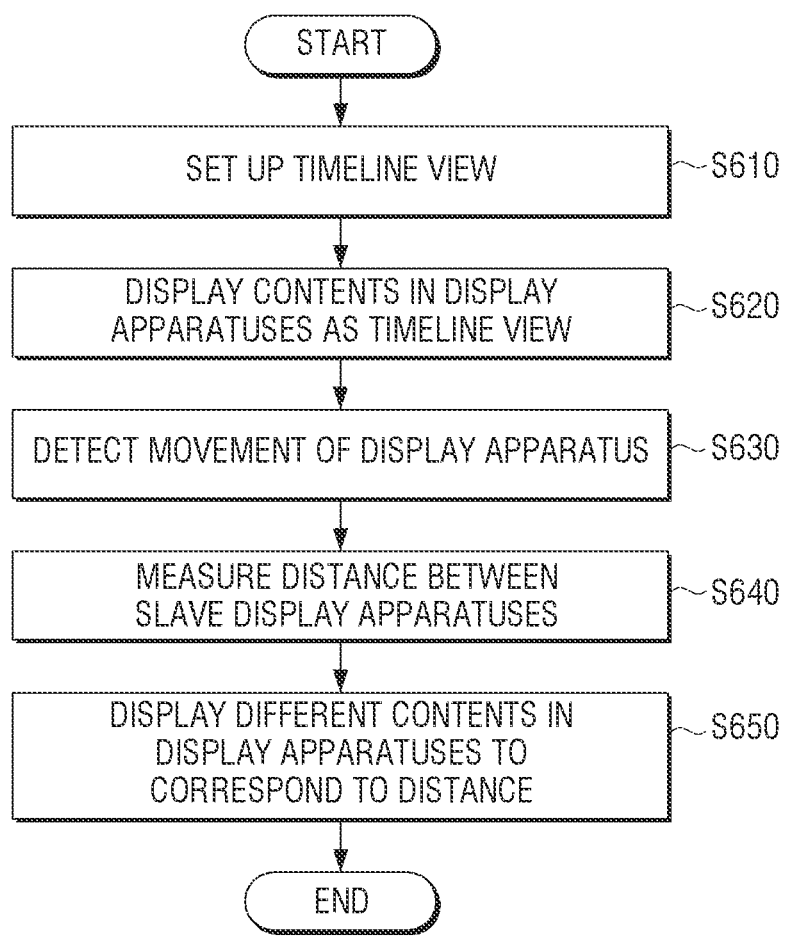

DISPLAY APPARATUS AND METHOD FOR DISPLAYING SPLIT SCREENS THEREOF

CROSS-REFERENCE TO RELATED APPLICATION(S)

This application claims the benefit under 35 U.S.C. § 119(e) of a U.S. provisional patent application filed on Dec. 5, 2014 in the U.S. Patent and Trademark Office and assigned Ser. No. 62/088,065, and under 35 U.S.C. § 119(a) of a Korean patent application filed on Mar. 10, 2015 in the Korean Intellectual Property Office and assigned Serial number 10-2015-0033176, the entire disclosure of each of which is hereby incorporated by reference.

TECHNICAL FIELD

The present disclosure relates to a display apparatus and a method for displaying a screen thereof. More particularly, the present disclosure relates to a display apparatus which splits a content displayed in a display apparatus into a plurality of content split screens and transmits a part of the content split screens to other slave display apparatus to correspond to an arrangement of the slave display apparatus which approaches and comes into contact with the display apparatus, and a method for displaying a screen thereof.

BACKGROUND

Recently, services and functions of a display apparatus are gradually diversifying. In addition, there is an increasing demand for a display apparatus capable of being connected to an adjacent display apparatus in a wired and/or wireless manner at an exhibition or a performing place.

Multi-vision refers to a complex displaying method for displaying a single content by using a plurality of display apparatuses. In case of a large-scale image or moving image having high resolution, such image may be displayed in a multi-vision method which uses a plurality of display apparatuses rather than a single display apparatus having a limit on a screen size.

However, when configuring a multi-vision system, a user is inconveniently forced to manually arrange respective display apparatuses or connect a cable between the display apparatuses.

Therefore, a need exists for a display apparatus which splits a content displayed in a display apparatus into a plurality of content split screens and transmits a part of the content split screens to other slave display apparatus to correspond to an arrangement of the slave display apparatus which approaches and comes into contact with the display apparatus, and a method for displaying a screen thereof.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a display apparatus which splits a content displayed in a display apparatus into a plurality of content split screens and transmits a part of the content split screens to other slave display apparatus to correspond to an arrangement of the slave display apparatus which approaches and comes into contact with the display apparatus, and a method for displaying a screen thereof.

In accordance with an aspect of the present disclosure, a method for displaying a screen of a display apparatus is provided. The method includes detecting, in response to a master display apparatus displaying a first content and a slave display apparatus displaying a second content, an approach of the slave display apparatus by the master display apparatus, determining a contact point between the master display apparatus and the slave display apparatus, splitting the first content being displayed in the master display apparatus into a plurality of content split screens corresponding to the contact point of the slave display apparatus, and transmitting at least one of the plurality of content split screens from the master display apparatus to the slave display apparatus.

In accordance with another aspect of the present disclosure, a display apparatus is provided. The display apparatus includes a display configured to display contents, a communication unit configured to be connected to a slave display apparatus, a distance measuring sensor configured to measure a distance to the slave display apparatus, and a controller configured to control the display, the communication unit, and the distance measuring sensor, wherein the controller is further configured to detect an approach of the slave display apparatus by using the distance measuring sensor, split the contents into a plurality of content split screens to correspond to a contact point of the slave display apparatus, and transmit at least one of the plurality of content split screens to the slave display apparatus through the communication unit.

In accordance with another aspect of the present disclosure, a method for displaying a screen of a display apparatus is provided. The method includes receiving detection of a movement of a first display apparatus from among a plurality of display apparatuses which display contents according to a time sequence, receiving distance information corresponding to a detected distance between the first display apparatus and a slave display apparatus, and transmitting contents in a different time sequence corresponding to the received distance information to the first display apparatus.

In accordance with another aspect of the present disclosure, a display apparatus is provided. The display apparatus includes a communication unit configured to be connected to a plurality of display apparatuses which display contents according to a time sequence, a storage configured to store the contents, and a controller configured to control the communication unit and the storage, wherein the controller is further configured to receive detection of a movement of a first display apparatus from among a plurality of display apparatuses by using the communication unit, receive distance information corresponding to a detected distance between the first display apparatus and a slave display apparatus, and transmit contents in a different time sequence in the storage to the first display apparatus, the contents corresponding to the received distance information.

In accordance with another aspect of the present disclosure, a display apparatus and a method for displaying a screen thereof are provided. The method includes splitting contents displayed in a master display apparatus into a plurality of content split screens corresponding to an arrangement of a slave display apparatus which comes into contact and transmitting at least one of the plurality of content split screens to the slave display apparatus.

In accordance with another aspect of the present disclosure, a display apparatus and a method for displaying a screen thereof are provided. The method includes splitting contents displayed in a master display apparatus into a plurality of content split screens to correspond to a contact point of a slave display apparatus and transmitting at least one of the plurality of content split screens to the slave display apparatus.

In accordance with another aspect of the present disclosure, a display apparatus and a method for displaying a screen thereof are provided. The method includes splitting, in response to a slave display apparatus coming contact with a master display apparatus, an original copy of contents displayed in the master display apparatus into a plurality of content split screens to correspond to a contact point of the slave display apparatus and transmitting at least one of the plurality of content split screens to the slave display apparatus.

In accordance with another aspect of the present disclosure, a display apparatus and a method for displaying a screen thereof are provided. The method includes changing contents displayed in a first display apparatus to contents in a different year in response to a distance change between the first display apparatus from which a movement is detected and a slave display apparatus among a plurality of display apparatuses which display contents in a chronological order.

In accordance with another aspect of the present disclosure, a display apparatus and a method for displaying a screen thereof are provided. The method includes changing contents displayed in a first display apparatus to contents in a different year and transmitting the contents to the first display apparatus in response to a distance change between the first display apparatus from which a received movement is detected and a slave display apparatus among a plurality of display apparatuses which display contents in a chronological order.

In accordance with another aspect of the present disclosure, a display apparatus and a method for displaying a screen thereof are provided. The method includes receiving contents in a different year from a first display apparatus, the contents being changed from contents displayed in the first display apparatus in response to a distance change between the first display apparatus which moves and a slave display apparatus among a plurality of display apparatuses which display contents in a chronological order.

According to various embodiments of the present disclosure, a display apparatus which splits displayed contents into a plurality of content split screens and transmits the content split screens to a display apparatus which approaches and comes into contact and a method for displaying a screen thereof may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a flowchart illustrating a method for displaying a screen of a display apparatus according to an embodiment of the present disclosure;

FIGS. 5A, 5B, 5C, 5D, 5E, 5F, 5G, 5H, 5I, and 5J are diagrams illustrating a method for displaying a screen of a display apparatus according to various embodiments of the present disclosure;

FIG. 6 is a flowchart illustrating a method for displaying a screen of a display apparatus according to an embodiment of the present disclosure.

Throughout the drawings, it should be noted that like reference numbers are used to depict the same or similar elements, features, and structures.

DETAILED DESCRIPTION

Figure 1:
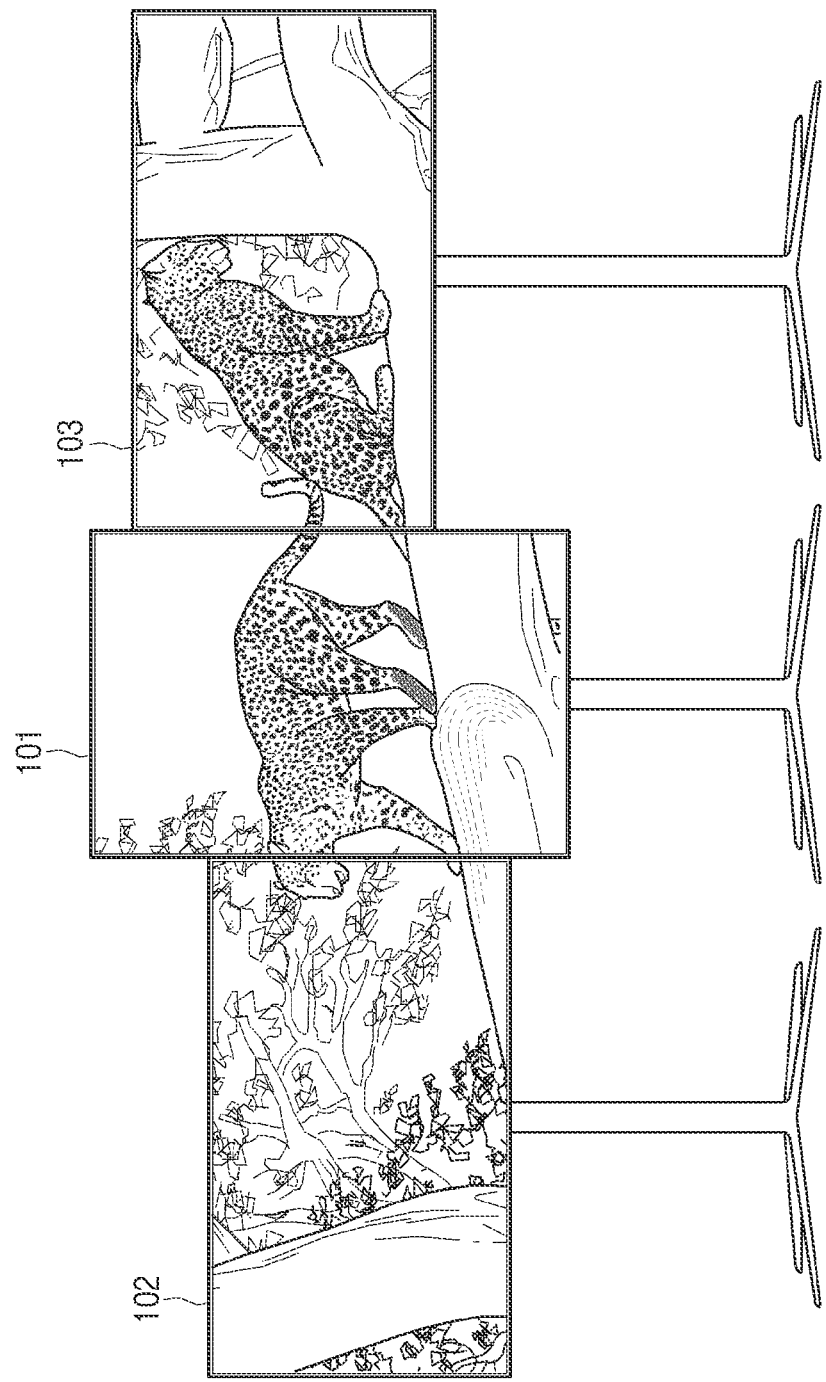
FIG. 1 is a schematic diagram illustrating an operation of a plurality of display apparatuses according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions or constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In embodiments of the present disclosure, relational terms, such as 'first' and 'second,' may be used to distinguish one entity from another entity, without necessarily implying any actual relationship or order between such entities. For example, 'first element' may be called 'second element,' and 'second element' may be called 'first element' without going beyond a scope of right of the present disclosure. A term 'and/or' includes one of a plurality of related elements described herein or a combination thereof.

An application refers to software which is executed in an operating system (OS) for computer, a web OS, an OS for a display apparatus, or a mobile OS so that a user is able to use the software. In addition, an application may refer to software for controlling a display apparatus by a user or a controller. For example, an application may include a word processor, a spread sheet, a contacts application, a calendar application, a memo application, an alarm application, a social network system (SNS) application, a chatting application, a map application, a music player, or a video player. According to an embodiment of the present disclosure, an application may refer to software which is executed in a display apparatus or executed in an electronic apparatus which is connected to a display apparatus in a wired and/or wireless manner (e.g., a mobile device). In addition, according to an embodiment of the present disclosure, an application may refer to software which is executed in a display apparatus in response to a user input.

According to an embodiment of the present disclosure, a term 'user' refers to a person who controls a function or an operation of the display apparatus by using a remote controller (not shown), and the 'user' may include a user, an administrator, and an installation engineer.

A term 'select key' in a remote controller may be used as a term that refers to an operation of pressing or touching a key.

Contents may be displayed in an application which is capable of reproducing contents. For example, content may include a video file which is reproduced in a video player that is one of applications, an audio file, a music file reproduced in a music player, a photo file displayed in a photo gallery, a web page file displayed in a web browser, and the like. In addition, contents may include a video file, an audio file, a text file, an image file, or a web page which is displayed or executed in an application. According to an embodiment of the present disclosure, a term 'video' may be used as the same meaning as a moving image. In addition, a content may include a video file, an audio file, a text file, an image file, or a web page which is executed in response to a user input (e.g., a touch).

Contents may include a video, an image, a text, or a web document. In addition, contents may include a video including an advertisement, an image including an advertisement, or a web document including an advertisement.

A widget refers to a mini application that is one of graphic user interfaces (GUI) for supporting and facilitating an interaction between a user and an application or an OS. For example, a widget may include a weather widget, a calculator widget, a clock widget, and the like.

The terms used in the following description are provided to explain the various embodiments and are not intended to limit the scope of rights of the present disclosure. A term in a singular form includes a plural form unless it is intentionally written that way. The terms, such as 'include,' 'comprise,' 'configured to,' in the description are used to indicate that there are features, numbers, operations, elements, parts or combination thereof, and they should not exclude the possibilities of combination or addition of one or more features, numbers, operations, elements, parts or combination thereof. In the following description, like drawing reference numerals are used for the like elements, even in different drawings.

FIG. 1 is a schematic diagram illustrating an operation of a plurality of display apparatuses according to an embodiment of the present disclosure.

Referring to FIG. 1, a remote controller (not shown), a master display apparatus 101, and slave display apparatuses 102 and 103 which are connected to the master display apparatus 101 wirelessly are illustrated. The master display apparatus 101 may be connected to the slave display apparatuses 102 and 103 in a wired manner through a cable (not shown).

The remote controller (not shown) may control the display apparatuses 101 to 103 through infrared communication or a short range communication (e.g., Bluetooth). The remote controller (not shown) may control a state of a display apparatus 100 (e.g., a power on/off state) and/or functions (e.g., a multi-vision output) by using at least one of an operation of selecting a key (including a button (not shown)), a touch pad (not shown), a microphone for receiving a user voice (not shown), and a motion sensor (not shown) of the remote controller (not shown).

A user is able to output an audio, a video, and/or additional information corresponding to a tuned broadcasting channel in the display apparatus 100 by using the remote controller (not shown). In addition, the user is able to perform a multi-vision output (e.g., the user may enable a content displayed in the master display apparatus 101 to be enlarged and displayed in the slave display apparatuses 102 and 103) by using the remote controller (not shown). In addition, the user is able to set up a multi-vision output through a setting 500 (refer to FIG. 5A) of the display apparatuses 101 to 103 by using the remote controller (not shown).

FIG. 1 illustrates an example of connecting three display apparatuses. However, according to another embodiment of the present disclosure, two display apparatuses, four display apparatuses, or five or more display apparatuses may be connected to each other. In addition, in FIG. 1, the master display apparatus is directly connected to the slave display apparatuses, but each apparatus may be connected through a sharer device, a router, a wireless interne network, and the like.

Figure 2A:
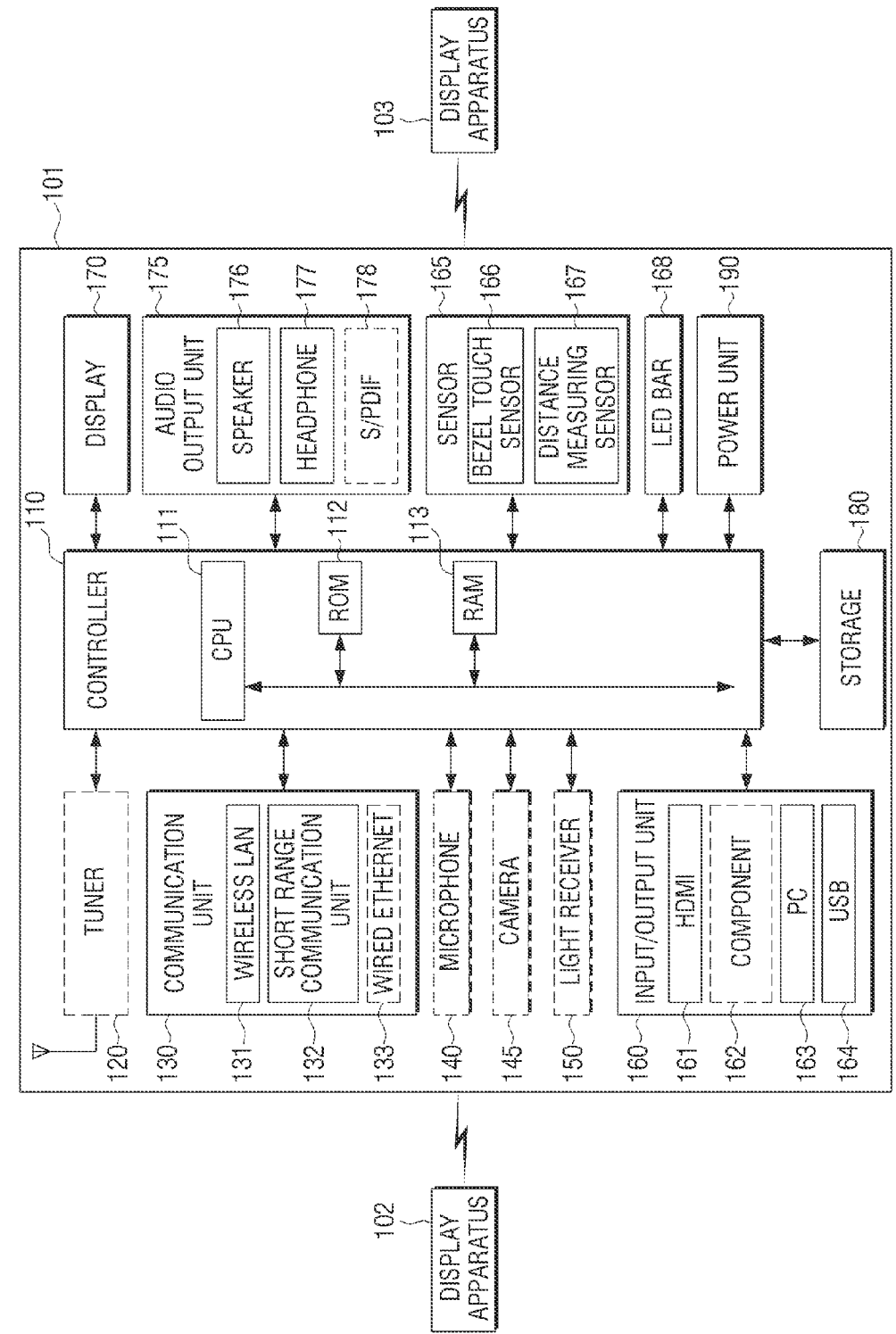
FIG. 2A is a block diagram illustrating a plurality of display apparatuses according to an embodiment of the present disclosure.

FIG. 2A is a block diagram illustrating a plurality of display apparatuses according to an embodiment of the present disclosure.

Figure 2B:
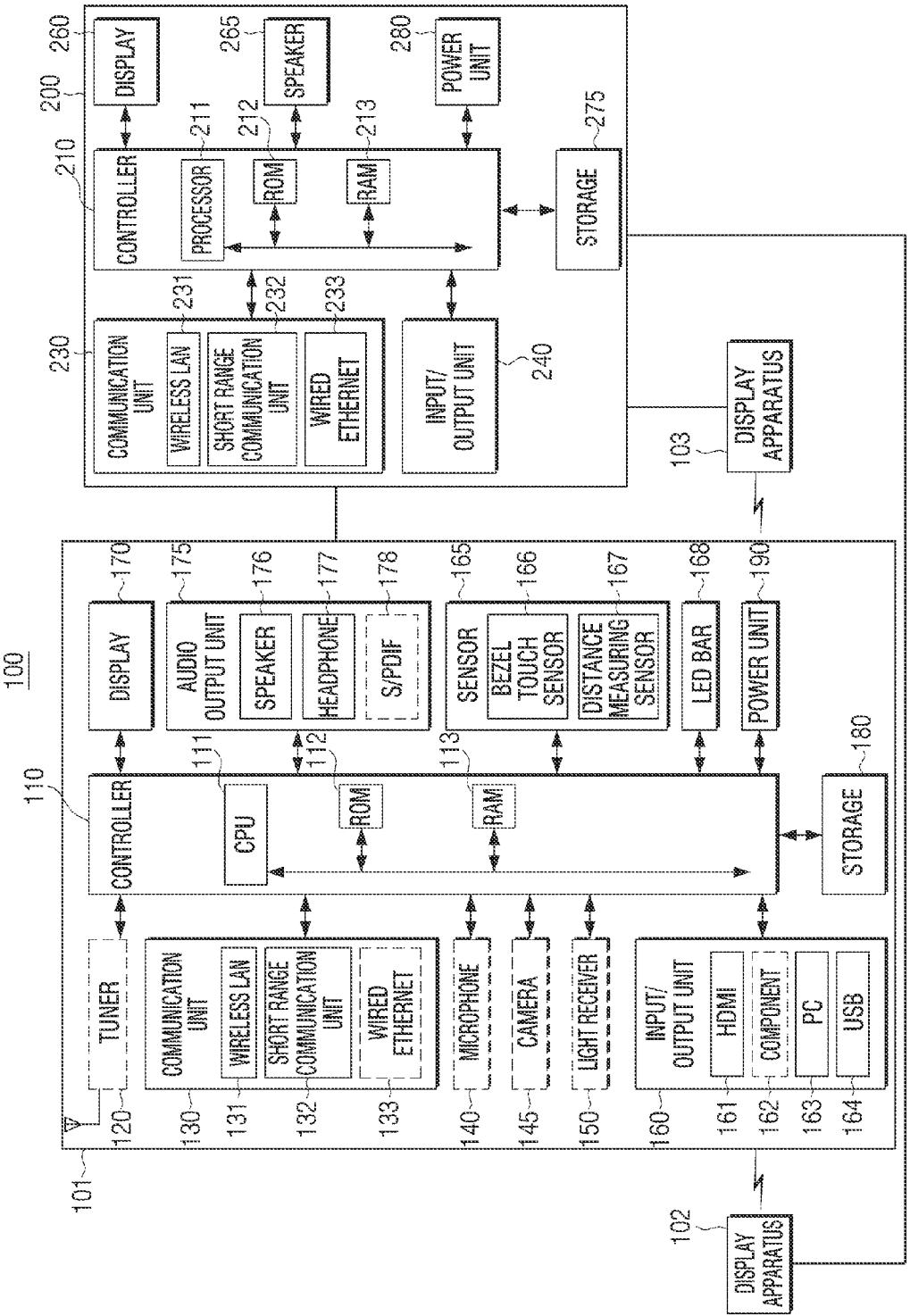
FIG. 2B is a block diagram illustrating a plurality of display apparatuses and an electronic apparatus according to an embodiment of the present disclosure.

FIG. 2B is a block diagram illustrating a plurality of display apparatuses and an electronic apparatus according to an embodiment of the present disclosure.

Referring to FIG. 2A, the master display apparatus 101 which receives a control signal from the remote controller (not shown) may be connected to the slave display apparatuses 102 and 103 in a wired and/or wireless manner by using a communication unit 130. In addition, the master display apparatus 101 may be connected to the slave display apparatuses 102 and 103 in a wired manner by using an input/output unit 160. The display apparatus 100 may include the master display apparatus 101 and the slave display apparatus 102 and/or 103 which is controlled by the master display apparatus 101.

Referring to FIG. 2B, an electronic apparatus 200 may be connected to the display apparatus 100. In addition, the electronic apparatus 200 may be connected to the master display apparatus 101 and the slave display apparatuses 102 and 103 in a wired and/or wireless manner by using a communication unit 230. In addition, the electronic apparatus 200 may be connected to the master display apparatus 101 and the slave display apparatuses 102 and 103 in a wired manner by using an input/output unit (not shown).

The display apparatus 100 may include a display 170, a tuner 120, the communication unit 130, and the input/output unit 160. In addition, the display apparatus 100 may include a combination of the display 170, the tuner 120, the communication unit 130, and the input/output unit 160. The display apparatus 100 having the display 170 may be electrically connected to an external apparatus having a tuner (e.g., a set-top box (not shown)).

For example, the display apparatus 100 may be realized as a digital television (TV), a three-dimensional (3D) TV, a smart TV, a light emitting diode (LED) TV, an organic LED (OLED) TV, a plasma TV, a monitor, an analog TV, a curved TV having a constant-curvature screen, a flexible TV having a constant-curvature screen, a bended TV having a constant-curvature screen, and/or a curvature-variable TV capable of changing a curvature of a current screen according to a user input, but not limited thereto, and it will be easily understood by a person having ordinary skill in the art (hereinafter, referred to as 'those skilled in the art').

The display apparatus 100 includes the tuner 120, the communication unit 130, a microphone 140, a camera 145, a light receiver 150, the input/output unit 160, the display 170, an audio output unit 175, a storage 180, and a power unit 190. The display apparatus 100 may include a sensor 165 which detects an internal state or an external state of the display apparatus 100 (e.g., an illumination intensity sensor or temperature sensor (not shown)).

A controller 110 may include a processor 111, a read-only memory (ROM) 112 configured to store a control program for controlling the display apparatus 100, and a random access memory (RAM) 113 which stores a signal or data received from outside of the display apparatus 100 or is used as a storage area corresponding to various operations performed in the display apparatus 100.

The controller 110 controls overall operations of the display apparatus 100 and a signal flow of internal components 120 to 190 of the display apparatus 100 and processes data. The controller 110 controls power supplied to the internal components 120 to 180 by the power unit 190. In addition, in response to a user input being received or a certain condition being satisfied, the controller 110 may execute an OS and diverse applications stored in the storage 180.

The processor 111 may include a graphical processing unit (GPU (not shown)) for performing a graphic processing operation with respect to an image or a video. The processor 111 may be realized as a system on chip (SOC) in which a core (not shown) and the GPU (not shown) are integrated. The processor 111 may include a single core, a dual core, a triple core, a quad core, and cores in the number of multiple thereof.

The processor 111 may include a plurality of processors. For example, the processor 111 may be realized as a main processor (not shown) and a sub processor (not shown) which operates in a sleep mode. In addition, the processor 111, the ROM 112, and the RAM 113 may be interconnected through an internal bus.

The controller 110 may control to display a first content, detect an approach of the slave display apparatuses 102 and 103, determine a contact point between the master display apparatus 101 and the slave display apparatuses 102 and 103, split the first content into a plurality of content split screens corresponding to the contact point of the slave display apparatuses 102 and 103, and transmit at least one of the plurality of content split screens to the slave display apparatuses 102 and 103 from the master display apparatus 101.

The controller 110 may set up or finish a multi-vision output through a setting of the master display apparatus 101.

In addition, the controller 110 may set up or finish the multi-vision output through the setting of the master display apparatus 101 according to a user input.

The controller 110 may control to detect an approach of the slave display apparatuses 102 and 103 by using the distance measuring sensor of the master display apparatus 101.

In addition, in response to the approach of the slave display apparatuses 102 and 103, the controller 110 may control to provide a feedback by using an LED bar 168 of the master display apparatus 101 which comes into contact with the slave display apparatuses 102 and 103.

The controller 110 may control to receive display apparatus information on the slave display apparatuses 102 and 103 before the master display apparatus 101 and the slave display apparatuses 102 and 103 come into contact with each other.

The controller 110 may control to generate content split screens by using the received display apparatus information on the slave display apparatuses 102 and 103.

The controller 110 may determine a contact point between the master display apparatus 101 and the slave display apparatuses 102 and 103 by using at least one of a bezel touch sensor 166 and a distance measuring sensor 167 of the master display apparatus 101.

Figure 5A:
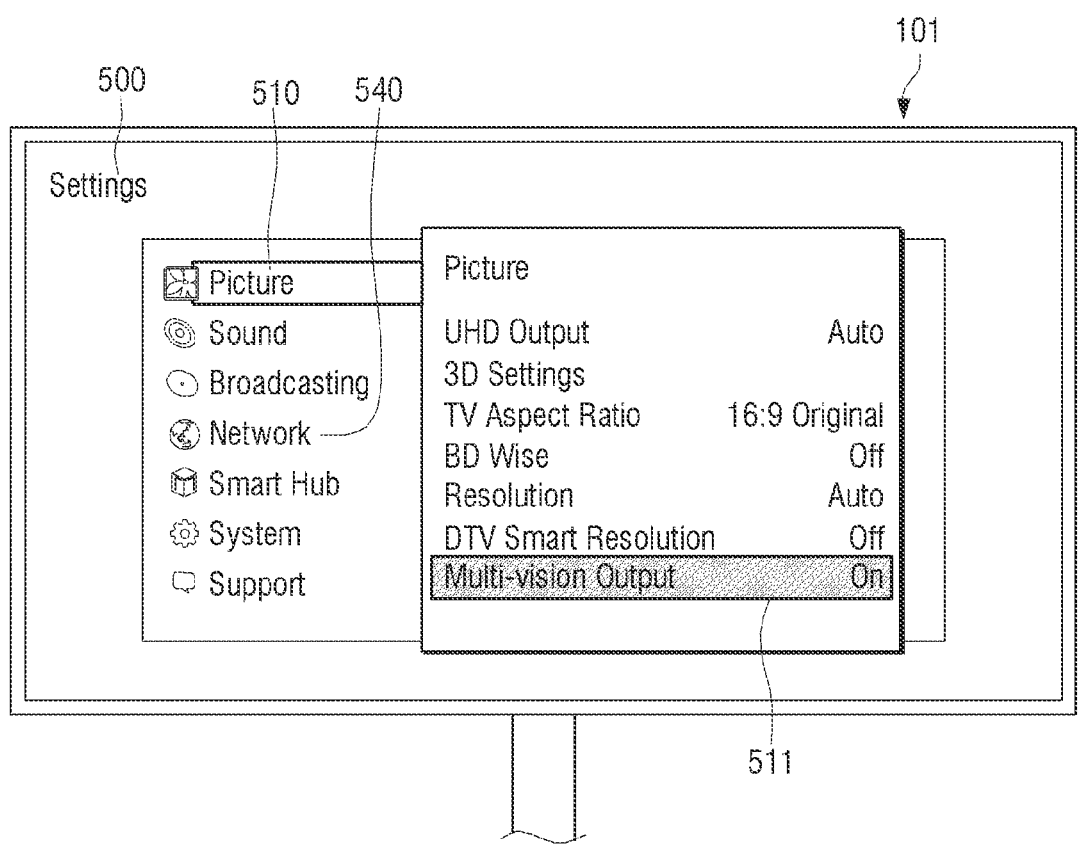
Figure 5B:
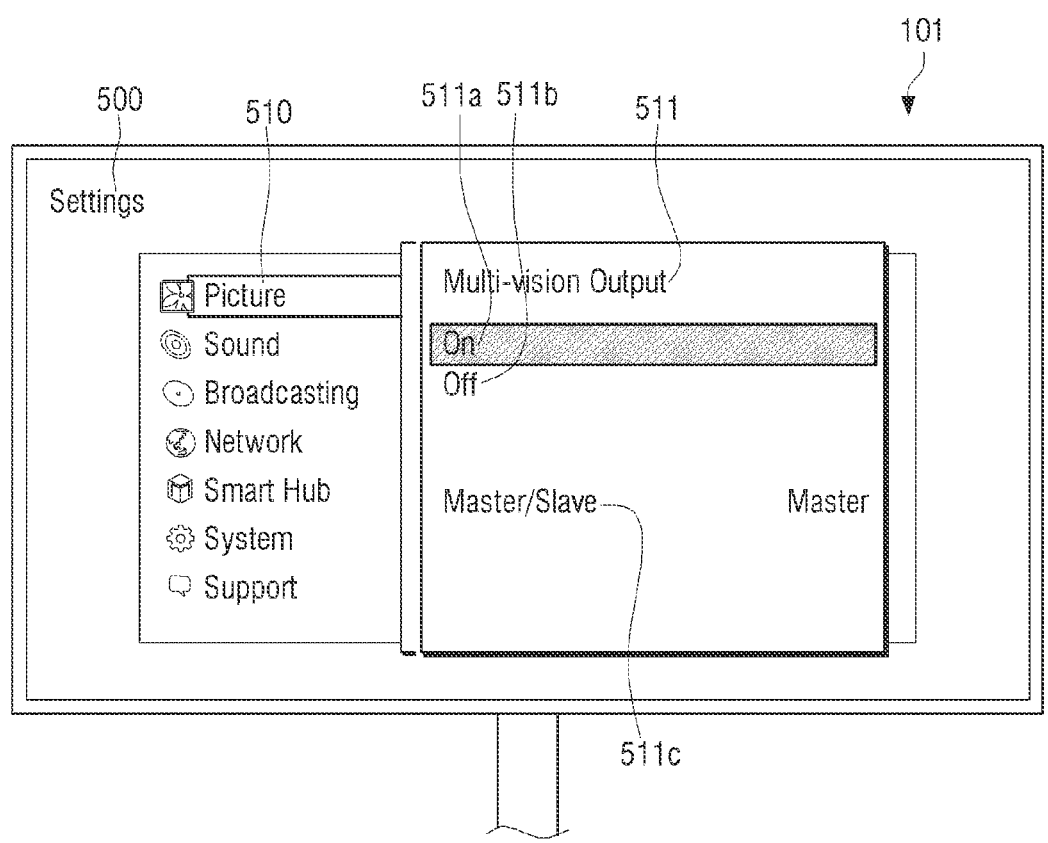
Figure 5E:
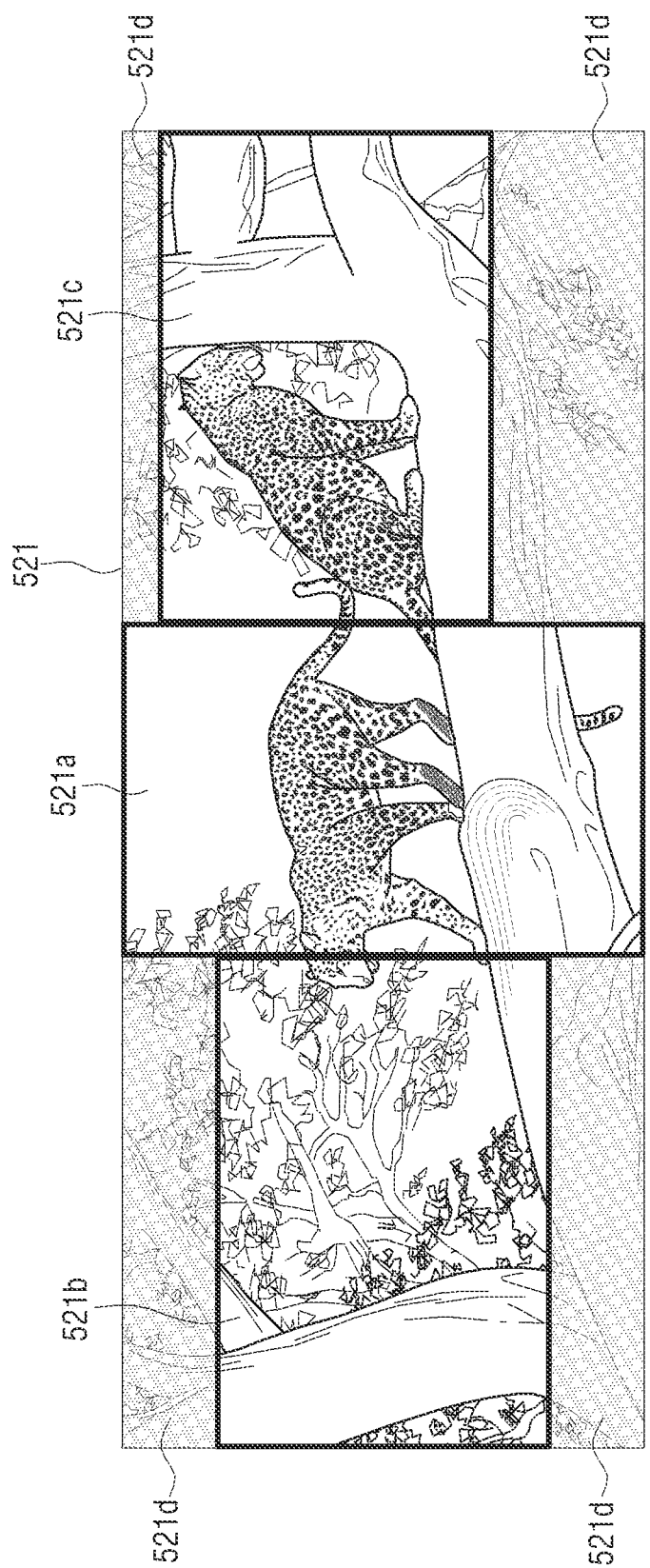

The controller 110 may control an original size 521 of FIG. 5E of a first content 520 of FIG. 5C to be greater than a sum of screen sizes of a plurality of content split screens which are transmitted to the slave display apparatuses 102 and 103.

Meanwhile, in response to one of a state before the master display apparatus 101 and the slave display apparatuses 102 and 103 come into contact with each other and a state when the master display apparatus 101 and the slave display apparatuses 102 and 103 come into contact with each other, the controller 110 may control to transmit at least one of the plurality of content split screens to the slave display apparatuses 102 and 103.

In response to a time delay between an operation of displaying one of the plurality of content split screens in the master display apparatus and an operation of displaying another one of the plurality of content split screens in the slave display apparatus, the controller 110 may control to transmit at least one of the plurality of content split screens to the slave display apparatus.

In addition, in response to a time delay between an operation of displaying one of the plurality of content split screens in the master display apparatus and an operation of transmitting another one of the plurality of content split screens to the slave display apparatus, the controller 110 may control to transmit at least one of the plurality of content split screens to the slave display apparatus.

In response to the operation of transmitting at least one of the plurality of content split screens from the master display apparatus 101 to the slave display apparatuses 102 and 103, the controller 110 may control to provide at least one of a visual feedback and an auditory feedback.

Meanwhile, the controller 110 may set up or finish a timeline view through the setting of the master display apparatus 101.

In addition, the controller 110 may set up or finish the timeline view through the setting of the master display apparatus 101 according to a user input.

In a plurality of display apparatuses which display contents in a chronological order, the controller 110 may control to detect a movement of the master display apparatus 101 and change the contents displayed in the master display apparatus 101 to a content in a different year in response to a distance change between the master display apparatus 101 and the slave display apparatuses 102 and 103.

In the plurality of display apparatuses which display the contents in a chronological order, the controller 110 may control to receive the content in the different year corresponding to the distance change between the master display apparatus 101 from which the movement is detected and the slave display apparatuses 102 and 103, from the electronic apparatus 200.

The controller 110 may control to display the content in the different year received from the electronic apparatus 200 in the display 170.

According to an embodiment of the present disclosure, 'controller of the display apparatus 100' includes the processor 111, the ROM 112, and the RAM 113.

The configuration and operations of the controller 110 may be implemented variously according to an embodiment of the present disclosure, which may be easily understood by those skilled in the art.

The tuner 120 may tune and select only a frequency of a desired channel that a user wishes to receive in the display apparatus 100 from among several radio wave elements, through amplification, mixing, resonance, and the like with respect to a broadcasting signal received in a wired and/or wireless manner. A broadcasting signal (e.g., video and/or audio corresponding to a TV broadcasting signal, a radio broadcasting signal, or a data broadcasting signal) includes broadcasting additional information (e.g., an electronic program guide (EPG)).

According to a user input (e.g., an input of a control signal received from a remote controller 50—a channel number, input of channel up/down, or input of a channel in an EPG screen), the tuner 120 may receive a broadcasting signal in a frequency band corresponding to a channel number (e.g., a Channel number 506 of a cable broadcasting).

The tuner 120 may receive a broadcasting signal from various sources, such as, a terrestrial broadcasting, a cable broadcasting, a satellite broadcasting, an interne broadcasting, and the like. In addition, the tuner 120 may receive a broadcasting signal from a source, such as a digital broadcasting and an analog broadcasting. A broadcasting signal received through the tuner 120 is decoded (e.g., audio decoding, video decoding, or additional information decoding) and divided into an audio, a video, and/or additional information. The divided audio, video, and/or additional information may be stored in the storage 180 according to control of the controller 110.

The tuner 120 of the display apparatus 100 may be realized as a single device or two or more devices. In addition, the tuner 120 may be realized as an all-in-one type device included in the display apparatus 100 or may be realized as a separate device having a tuner (not shown) which is electrically connected to the display apparatus 100 (e.g., a set-top box (not shown)). The tuner 120 may be realized as a tuner (not shown) which is connected to the input/output unit 160.

The display apparatus 100 may do not include the tuner 120 depending upon the performance and structure of the display apparatus 100, which may be easily understood by those skilled in the art.

The communication unit 130 may be connected to the slave display apparatus or a server 200 according to the control of the controller. The communication unit 130 may transmit/receive a content from/to the slave display apparatus or the server 200 (refer to FIG. 2B), download an application, or perform a web browsing operation according to the control of the controller. In addition, the communication unit 130 may transmit the content split screens to other display apparatuses 101, 102 or the server 200 according to the control of the controller. In addition, the communication unit 130 may receive display apparatus information on other display apparatuses according to the control of the controller.

The communication unit 130 may include one of a wireless local area network (LAN) 131, a short range communication unit 132, and a wired Ethernet 133 or a combination thereof, depending upon the performance and structure of the display apparatus 100.

The communication unit 130 may receive a remote control signal (including a control signal) of a remote controller (not shown) according to the control of the controller 110. The remote control signal received from the remote controller (not shown) may be realized in a Bluetooth method or a radio frequency (RF) signal method.

The short range communication unit 132 may include Bluetooth low energy, infrared data association (IrDA) communication, wireless-fidelity (Wi-Fi) direct, ultra wideband (UWB), and near field communication (NFC), on top of Bluetooth.

The microphone 140 receives a user's uttered voice. The microphone 140 may convert the received voice into an electronic signal and output the signal to the controller. For example, a user voice may include a voice corresponding to a menu (e.g., a multi-vision output) or a voice corresponding to a function (e.g., a multi-vision output) of the display apparatus 100. A recommended recognition range of the microphone 140 is an area within 4 meter (m) between the microphone 140 and a user's position. The recognition range of the microphone 140 may vary depending upon a volume of the user voice and a surrounding environment (e.g., a speaker sound or an ambient noise)

The microphone 140 may be realized as an integral type or a separate type with respect to the display apparatus 100. A separate type microphone (not shown) may be wirelessly connected to the display apparatus 100 through the communication unit 130 or may be electrically connected to the display apparatus 100 through the input/output unit 160.

The display apparatus 100 may do not include the microphone 140 depending upon the performance and structure of the display apparatus 100, which may be easily understood by those skilled in the art.

The camera 145 receives a video (e.g., consecutive frames) corresponding to a user motion including a gesture within a recognition range of the camera 145. The camera 145 may be located on a front surface (e.g., a surface which faces a user) or may be located on a side surface (e.g., a surface which is connected to the front surface where the camera protrudes from an inside of the bezel 10) of a bezel 10 of the display apparatus 100.

The recognition range of the camera 145 may be an area within 0.1 m to 5 m between the camera 145 and a user. For example, a user motion may include a part of a user body, such as, a face, a look on face, a hand, a fist, a finger, and the like, and a motion performed by the part of the user body. The camera 145 may convert a received video into an electronic signal and output the signal to the controller according to the control of the controller.

The controller 110 may control to select a menu displayed in a screen of the display apparatus 100 by using a recognition result of the received motion or operate a function corresponding to the recognition result. For example, such control operation may include channel control, volume control, movement of an indicator, or multi-vision output.

The camera 145 may include a lens (not shown) and an image sensor (not shown). The camera 145 may support an optical zoom or a digital zoom by using a plurality of lens and an image processing operation. A zoom recognition range of the camera 145 may be set variously depending upon an angle of the camera and conditions of the surrounding environment. When the camera 145 is realized as a plurality of cameras, the camera 145 may receive a 3D still image or a 3D motion by using a second camera (not shown) which is adjacent to the first camera 145 of the bezel 10 (e.g., distance between the first camera and the second camera may be longer than 2 centimeter (cm) and shorter than 8 cm.)

The camera 145 may be realized as an integral type or a separate type with respect to the display apparatus 100. A separate device (not shown) including a separate type camera (not shown) may be wirelessly connected to the display apparatus 100 through the communication unit 130 or may be electrically connected to the display apparatus 100 through the input/output unit 160.

The display apparatus 100 may not include the camera 145 depending upon the performance and structure of the display apparatus 100, which may be easily understood by those skilled in the art.

The light receiver 150 receives a light signal (including a control signal) which is received from an external remote controller (not shown) through a light window (not shown) in the bezel 10. A material of the light window may include an optical glass (e.g., a crown glass, a flint glass, and a barium crown glass) and plastic (e.g., poly-methyl-methacrylate, polycarbonate, and allyl-diglycol-carbonate).

The light receiver 150 may receive a light signal corresponding to a user input (e.g., a touch through a button, touch gesture through a touch pad, voice through a microphone, or motion through a sensor) from the remote controller (not shown). According to the control of the controller 110, a control signal may be extracted from the received light signal.

The input/output unit 160 receives a video (e.g., a moving image), an audio (e.g., voice or music), an image, a text, additional information (e.g., an EPG), and the like from outside of the display apparatus 100 according to the control of the controller. The input/output unit 160 may include one of a high-definition multimedia interface (HDMI) port 161, a component jack 162, a personal computer (PC) port 163, and a universal serial bus (USB) port 164. In addition, the input/output unit 160 may include a combination of the HDMI port 161, the component jack 162, the PC port 163, and the USB port 164.

The configuration and operations of the input/output unit 160 may be implemented variously according to an embodiment of the present disclosure, which may be easily understood by those skilled in the art.

The sensor 165 may include the bezel touch sensor 166 which is located in the bezel 10 of the display apparatus 100 and/or the distance measuring sensor 167 which measures a distance between the master display apparatus 101 and the slave display apparatus 102 and 103.

The bezel touch sensor 166 may receive a user input which comes into contact with the side surface of the bezel 10 of the display apparatus 100. In addition, the bezel touch sensor 166 may located on the front surface and the rear surface of the display apparatus 100 and receive a user input which comes into contact with the surfaces.

According to an embodiment of the present disclosure, a user input may include a touch through fingers including a thumb and a touch through an input unit (not shown) including a stylus. In addition, according to an embodiment of the present disclosure, a contact includes a non-contact with respect to the bezel (hovering) as well as a touch with respect to the bezel. The bezel touch sensor 166 may receive a bezel non-contact (hovering) as well as a bezel touch, which may be easily understood by those skilled in the art. The detailed description on the bezel touch sensor 166 will be provided below with reference to FIGS. 3A, 3B, and 3C.

Figure 3A:
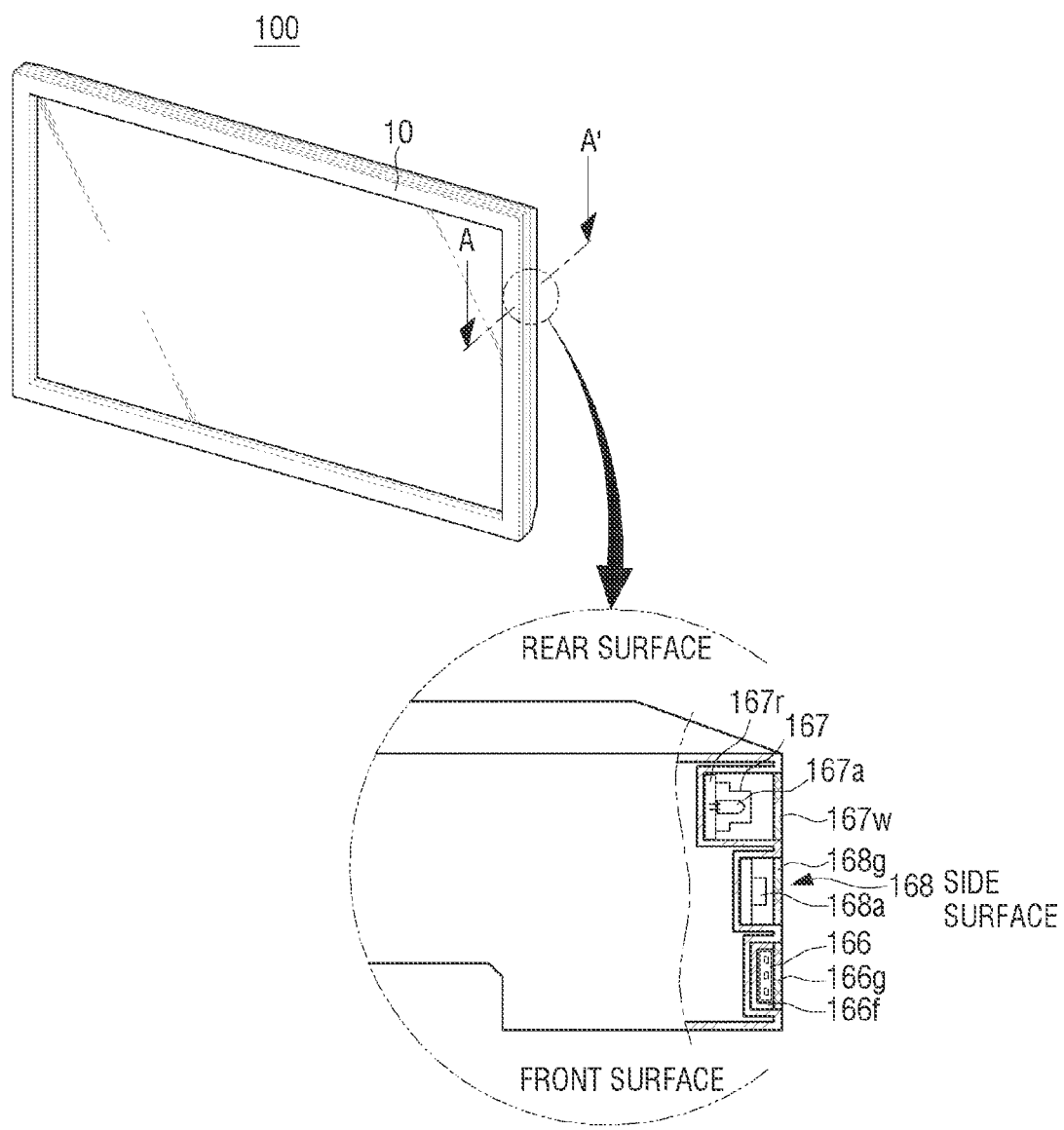
FIGS. 3A, 3B, and 3C are schematic diagrams illustrating a bezel of a display apparatus according to various embodiments of the present disclosure.
Figure 3B:
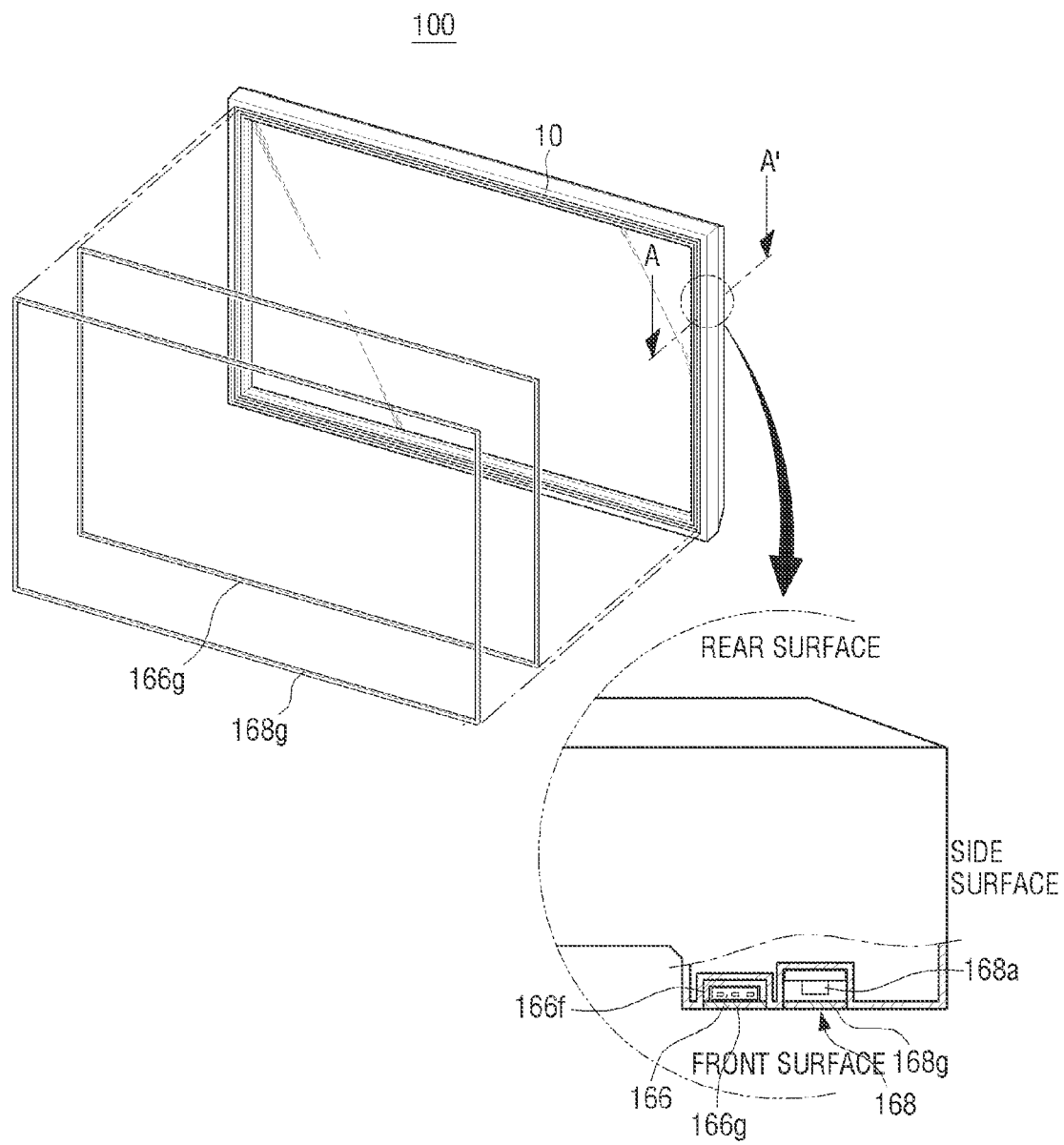
Figure 3C:
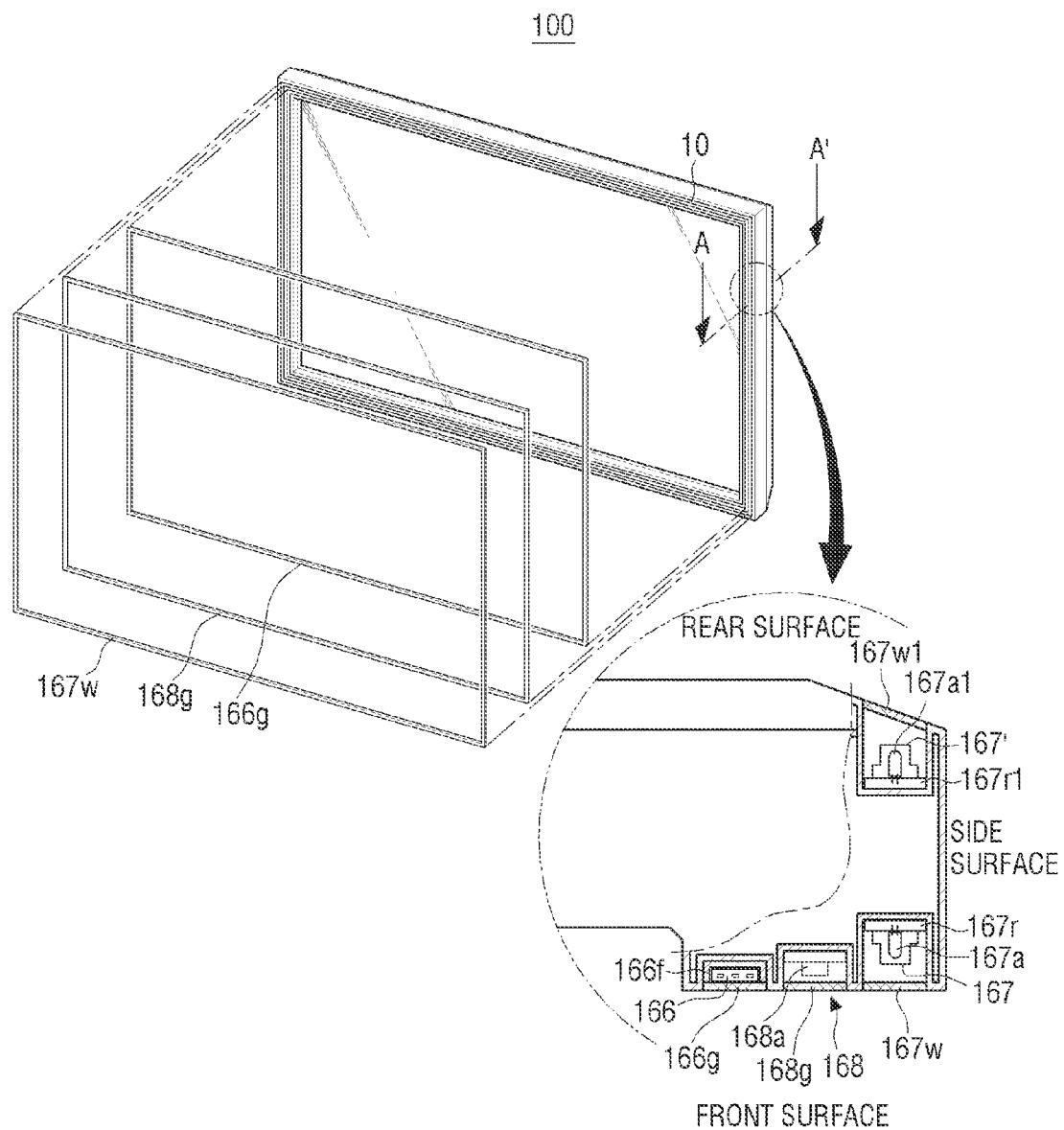

FIGS. 3A, 3B, and 3C are schematic diagrams illustrating a bezel of a display apparatus according to various embodiments of the present disclosure.

Referring to FIG. 3A, the distance measuring sensor 167 may measure a distance of the slave display apparatuses 102 and 103 which are located on the front surface, the rear surface, or the side surface of the display apparatus 100. A light outputted from a LED 167A of the distance measuring sensor 167 may be reflected in the slave display apparatuses 102 and 103 and detected by a light detector (not shown). The controller may calculate a distance between the master display apparatus 101 and the slave display apparatuses 102 and 103 based on a light output time and a light detected time from the distance measuring sensor 167. The detailed description on the distance measuring sensor 167 will be provided below with reference to FIGS. 3A, 3B, and 3C.

The distance measuring sensor 167 may be used as a sensor for detecting an approach of an external object. The sensor 165 may include an additional sensor for detecting a state of the display apparatus 100. For example, the sensor 165 may include an illumination intensity sensor (not shown) for detecting a quantity of ambient light or a temperature sensor (not shown) for detecting an internal temperature or an external temperature of the display apparatus 100. In addition, the sensor 165 may include a gyro sensor (not shown) for detecting a direction by using a rotational inertia of the display apparatus 100. The sensor 165 may also include an acceleration sensor (not shown) for detecting an acceleration which is applied to three axes (e.g., x-axis, y-axis, and z-axis) of the display apparatus 100. The sensor 165 may detect an acceleration of movement and an acceleration of gravity of the display apparatus 100.

The sensor 165 may detect a state of the display apparatus 100 and transmits an electronic signal corresponding to a detected result to the controller.

The LED bar (i.e., a lamp or a bulb) 168 may emit a light according to the control of the controller. The LED bar 168 may be an aggregation (or an array) of a plurality of LEDs. In addition, the LED bar 168 may include an LED lamp (not shown) or an LED bulb (not shown). The display apparatus 100 may include a plurality of LED bars 168. For example, a left LED bar, a right LED bar, an upper LED bar, and a lower LED bar may be disposed in a left bezel area, a right bezel area, an upper bezel area, and a lower bezel area, respectively.

In response to an approach of the slave display apparatuses 102 and 103 being received or in response to a user input being received, the LED bar 168 may flicker for a setting time according to the control of the controller. A setting time may be 500 to 1,000 msec, for example. The setting time may be changed according to a setting of a user or a manufacturer.

According to another embodiment of the present disclosure, at least one of the bezel touch sensor 166, the distance measuring sensor 167, and the LED bar 168 in the bezel 10 may be realized as a separate device (not shown) outside the display apparatuses 101 to 103. The display apparatuses 101 to 103 may be engaged with the separate device (not shown)

through an engagement member (e.g., a screw (not shown)). For example, the separate device (not shown) may include one of the bezel touch sensor 166, the distance measuring sensor 167, and the LED bar 168 or a combination thereof.

The separate device (not shown) may be controlled by including a controller (not shown) or by electrically being connected to the controller of the display apparatuses 101 to 103.

The display 170 displays a video included in a broadcasting signal received from the tuner 120 in the screen according to the control of the controller. The display 170 may display a content (e.g., a video image or a text) received through the communication unit 130 or the input/output unit 160 according to the control of the controller. In addition, the display 170 may output a video stored in the storage 180 according to the control of the controller. In addition, the display 170 may display a voice user interface (UI) (e.g., a voice UI including a voice command guide) for performing a voice recognition task corresponding to voice recognition or a motion UI (e.g., a user motion guide for motion recognition) for performing a motion recognition task corresponding to the motion recognition.

Screen resolution of the display 170 may include high definition (HD), full HD, ultra HD, or more higher resolution than the ultra HD, for example.

A diagonal length of the screen of the display 170 may include a length shorter than 650 mm, a length of 660 mm, a length of 800 mm, a length of 1,010 mm, a length of 1,520 mm, or a length longer than 2,000 mm, for example. An aspect ratio of the screen of the display 170 may include 4:3 ratio, 16:9 ratio, 16:10 ratio, 21:9 ratio, or 21:10 ratio, for example. The display apparatus information on the display apparatus may include the resolution, a size, or the aspect ratio of the screen of the display 170.

According to an embodiment of the present disclosure, the display 170 may output a visible feedback corresponding to the operation of displaying the content split screen 521A of FIG. 5E and/or the operation of transmitting the content split screen 521B, 521C of FIG. 5E to the slave display apparatuses 102 and 103 according to the control of the controller. In addition, according to an embodiment of the present disclosure, the display 170 may output a visible feedback corresponding to the operation of displaying the updated content split screen 521A and/or the operation of transmitting the updated content split screens 521E, 521F of FIG. 5G to the slave display apparatuses 102 and 103, according to the control of the controller.

The audio output unit 175 outputs an audio included in the broadcasting signal received from the tuner 120 according to the control of the controller. In addition, the audio output unit 175 may output an audio (e.g., a voice or a sound) received through the communication unit 130 or the input/output unit 160 according to the control of the controller. The audio output unit 175 may output an audio stored in the storage 180 according to the control of the controller. In addition, the audio output unit 175 may include at least one of a speaker 176, a headphone output terminal 177, and a Sony/Philips digital interface (S/PDIF) output terminal 178 or a combination thereof.

The speaker 176 of the display apparatus 100 may include 2-channel, 2.1-channel, 4-channel, 4.1-channel, 5.1-channel, 6.1-channel, 7.1-channel, 9.1-channel, or 11.2-channel which may be realized as an integral type or a separate type, but not limited thereto.

According to an embodiment of the present disclosure, the audio output unit 175 may output an auditory feedback corresponding to the operation of displaying the content split screen 521A of FIG. 5E and/or the operation of transmitting the content split screens 521B, 521C of FIG. 5E to the slave display apparatuses 102 and 103 according to the control of the controller. In addition, according to an embodiment of the present disclosure, the audio output unit 175 may output an auditory feedback corresponding to the operation of displaying the updated content split screen 521A and/or the operation of transmitting the updated content split screens 521E, 521F of FIG. 5G to the slave display apparatuses 102 and 103 according to the control of the controller.

The storage 180 may store diverse data, programs, or applications for operating and controlling the display apparatus 100 according to the control of the controller. The storage 180 may store an input/output signal or data corresponding to the operations of the tuner 120, the communication unit 130, the microphone 140, the camera 145, the light receiver 150, the input/out unit 160, the display 170, the audio output unit 175, the storage 180, and/or the power unit 190.

The storage 180 may store a control program for controlling the display apparatus 100 and the controller, an application being initially provided by a manufacturer or downloaded from an external source, a GUI related to an application, an object for providing a GUI (e.g., an image text, an icon, a button, and the like), user information, a document, databases (DB), or related data. For example, the user information may include a user identifier (ID), a password, a user name, user biometric data (e.g., fingerprint, iris, pulse, blood pressure, or temperature), and the like.

The storage 180 may include a broadcasting receiving module, a channel control module, a volume control module, a communication control module, a voice recognition module, a motion recognition module, a light receiving module, a display control module, an audio control module, an external input control module, a power control module, a power control module of a mobile device which is connected wirelessly (e.g., Bluetooth), a voice DB, or a motion DB (not shown).

The above described modules and data of the storage 180 may be realized as software in the display apparatus 100 to execute a broadcasting reception control function, a channel control function, a volume control function, a communication control function, a voice recognition function, a motion recognition function, a light reception control function, a display control function, an audio control function, an external input control function, a power control function, or a power control function of the mobile device which is connected wirelessly (e.g., Bluetooth) of the display apparatus 100. The controller may execute respective functions by using the software stored in the storage.

Meanwhile, the storage 180 may store display apparatus information on the master display apparatus 101.

In addition, the storage 180 may store received display apparatus information on the slave display apparatuses 102 and 103.

The storage 180 may store an approach status (e.g., space, approaching, or contact) of the slave display apparatuses 102 and 103 measured by the distance measuring sensor 167.

The storage 180 may store a distance of the master display apparatus 101 and the slave display apparatuses 102 and 103 measured by the distance measuring sensor 167.

The storage 180 may store a contact point of the slave display apparatuses 102 and 103 received through the bezel touch sensor 166.

The storage 180 may store first touch position information, first hovering position information, and first touch gesture information received through the bezel touch sensor 166.

The storage 180 may store the content 520 and an original copy 521 of the content 520.

The storage 180 may store content split information transmitted to the slave display apparatuses 102 and 103.

The storage 180 may store a dimension, location, or shape of a main area in a multi-vision screen. In addition, the storage 180 may store a dimension, location, or shape of a sub area in the multi-vision screen.

The storage 180 may store a dimension, location, or shape of a changed main area. In addition, the storage 180 may store a dimension, location, or shape of a changed sub area.

The storage 180 may store contents (image or video) generated in a chronological order.

The storage 180 may store a distance of the display apparatuses 101 to 103 which display the contents in a chronological order.

The storage 180 may store a changed distance of the display apparatuses 101 to 103 which display the contents in a chronological order.

The storage 180 may store a video or an image corresponding to the visual feedback. In addition, the storage 180 may store a sound corresponding to the auditory feedback.

In an embodiment of the present disclosure, a term 'storage of the display apparatus 100' may include the storage 180, the ROM 112 and the RAM 113 of the controller, or a memory card (e.g., a micro secure digital (SD) card or a USB memory (not shown)) which is mounted to the display apparatus 100. In addition, the storage 180 may store a non-volatile memory, a volatile memory, a hard disk drive (HDD), or a solid state drive (SDD).

The power unit 190 may supply power being received from an external power source to the internal components 110 to 180 of the display apparatus 100 according to the control of the controller. In addition, the power unit 190 may supply power being received from a battery or two or more batteries (not shown) inside the display apparatus 100 to the internal components 110 to 180 according to the control of the controller.

The slave display apparatuses 102 and 103 have substantially the same components as the components 110 to 190 of the master display apparatus 101, and thus, the overlapped description is omitted.

Referring to FIGS. 1 and 2A, at least one of the components (e.g., 110 to 190) of the display apparatus 100 may be added or omitted depending upon the performance of the display apparatus 100. In addition, the locations of the components (e.g., 110 to 190) may be changed depending upon the performance or structure of the display apparatus 100, which may be easily understood by those skilled in the art.

Referring to FIG. 2B, the electronic apparatus 200 may be connected to one display apparatus or a plurality of display apparatuses 100. The electronic apparatus 200 may be connected to the master display apparatus 101 or the slave apparatuses 102 and 103 in a wired and/or wireless manner through the communication unit 230. In addition, the electronic apparatus 200 may be connected to the master display apparatus 101 or the slave apparatuses 102 and 103 in a wired manner through an input/output unit (not shown). According to an embodiment of the present disclosure, the electronic apparatus 200 may be a computing device (not shown) or a server (not shown), and the like.

A controller 210 may include a processor 211, a ROM 212 which stores a control program for controlling the electronic apparatus 200, and a RAM 213 which stores a signal or data received from outside of the electronic apparatus 200 or is used as a storage area corresponding to various operations executed in the electronic apparatus 200.

The controller 210 controls overall operations and a signal flow in internal components 230 to 280 of the electronic apparatus 200 and processes data. The controller 210 controls power supplied from a power unit 280 to the internal components 230 to 280. In addition, in response to a user input being received or a certain condition being satisfied, the controller 210 may execute an OS and various applications stored in the storage 275.

The processor 211 may include a GPU (not shown) for performing a graphic processing operation with respect to an image or a video. The processor 211 may be realized as an SOC in which a core (not shown) and a GPU (not shown) are integrated. The processor 211 may include a single core, a dual core, a triple core, a quad core, and cores in the number of multiple thereof.

The processor 211 may include a plurality of processors. For example, the processor 211 may be realized as a main processor (not shown) and a sub processor (not shown) which operates in a sleep mode (including a standby mode). In addition, the processor 211, the ROM 212, and the RAM 213 may be interconnected through an internal bus.

According to an embodiment of the present disclosure, the controller 210 may transmit various types of contents so as to be displayed in the display apparatus 100. In addition, the controller 210 may split a first content displayed in the master display apparatus 101 into a plurality of content split screens corresponding to the slave display apparatuses 102 and 103 and output the content split screens so as to be displayed in the display apparatuses 101 to 103, respectively.

The controller 210 may set up or finish the multi-vision output with respect to the display apparatus 100 through a setting of an application which controls the display apparatus 100.

In addition, the controller 210 may set up or finish the multi-vision output with respect to the display apparatus 100 through the setting of the application which controls the display apparatus 100 in response to a user input.

The controller 210 may control to receive a detection on a movement of the slave display apparatuses 102 and 103 from the master display apparatus 101 through the communication unit 230 or an input/output unit 240.

The controller 210 may control to receive a detection on the movement of the slave display apparatuses 102 and 103 from the slave display apparatuses 102 and 103 through the communication unit 230 or the input/output unit 240.

The controller 210 may control to receive approach information (e.g., first approach information, second approach information, or third approach information) from the display apparatus 100 through the communication unit 230 or the input/output unit 240.

The controller 210 may control to store the received approach information in a storage 275.

The controller 210 may control to receive display apparatus information from the display apparatus 100 through the communication unit 230 or the input/output unit 240.

The controller 210 may control to store the received display apparatus information in the storage 275.

The controller 210 may control to receive contact point information detected in the display apparatus 100 through the communication unit 230 or the input/output unit 240.

The controller 210 may control to store the received contact point information in the storage 275.

The controller 210 may control to generate a plurality of content split screens by using the received contact point information or display apparatus information.

The controller 210 may control to store the plurality of generated content split screens in the storage 275. In addition, the controller 210 may control to store an original copy of a content in the storage 275.

The controller 210 may transmit the plurality of generated content split screens to the display apparatus 100, respectively.

The controller 210 may control to receive movement information (e.g., first movement information, second movement information, or third movement information) from the display apparatus 100 through the communication unit 230 or the input/output unit 240.

The controller 210 may transmit the plurality of updated content split screens to the display apparatus 100, respectively.

The controller 210 may set up or finish a timeline view with respect to the display apparatus 100 in a setting of an application which controls the display apparatus 100.

The controller 210 may set up or finish the timeline view with respect to the display apparatus 100 in the setting of the application which controls the display apparatus 100 in response to a user input.

The controller 210 may control to store contents corresponding to the timeline view (e.g., contents having a chronological order) in the storage 275.

The controller 210 may transmit the contents having a chronological order to a plurality of display apparatuses which are spaced from each other through the communication unit 230 or the input/output unit 240.

The controller 210 may control to receive detection of a movement of the master display apparatus 101 through the communication unit 230 or the input/output unit 240.

The controller 210 may control to receive detection of the movement of the master display apparatus 101 from the slave display apparatuses 102 and 103 through the communication unit 230 or the input/output unit 240.

The controller 210 may control to receive distance information (e.g., first distance information, second distance information, or third distance information) from the display apparatus 100 through the communication unit 230 or the input/output unit 240.

The controller 210 may control to transmit contents in a different year corresponding to the received distance information to the master display apparatus 101 through the communication unit 230 or the input/output unit 240.

According to an embodiment of the present disclosure, a term 'controller of the electronic apparatus 200' includes the processor 211, the ROM 212, and the RAM 213.

The configuration and operations of the controller 210 of the electronic apparatus 200 may be realized variously according to an embodiment of the present disclosure, which may be easily understood by those skilled in the art.

The communication unit 230 may connect the electronic apparatus 200 to the display apparatus 100 according to the control of the controller 210. The communication unit 230 may transmit the content spit screens to the display apparatus 100 according to the control of the controller 210. The communication unit 230 may download an application for controlling the display apparatus 100 or the electronic apparatus 200 from an external source according to the control of the controller 210. The communication unit 230 may perform a web browsing operation according to the control of the controller 210.

The communication unit 230 may receive the display apparatus information from the display apparatus 100 according to the control of the controller 210. The communication unit 230 may receive a detection signal of the bezel touch sensor 166 or a detection signal of the distance measuring sensor 167 from the display apparatus 100 according to the control of the controller 210. The communication unit 230 may receive a signal corresponding to an approach of the display apparatus 100 (e.g., an approach detected by the distance measuring sensor 167 or the bezel touch sensor 166) and/or a signal corresponding to a user touch (e.g., a user touch detected by the bezel touch sensor 166) from the display apparatus 100.

The communication unit 230 may include one of a wireless LAN 231, a short range communication unit 232, and a wired Ethernet 233 depending upon the performance and structure of the electronic apparatus 200. The communication unit 230 may include a combination of the wireless LAN, the short range communication unit 232, and the wired Ethernet 233. The wireless LAN 231 may be wirelessly connected to an access point (AP, not shown) in a place where the AP is installed according to the control of the controller 210. The wireless LAN 231 supports a wireless LAN standard 'IEEE802.11x' of Institute of electrical and electronics engineers (IEEE). The short range communication unit 232 may include Bluetooth, Bluetooth low energy, IrDA, UWB, NFC, and the like.

The input/output unit 240 may connect the electronic apparatus 200 to the display apparatus 100 according to the control of the controller 210. The input/output unit 240 may receive a signal corresponding to an approach (e.g., an approach detected by the distance measuring sensor 167) of the display apparatus 100 and/or a signal corresponding to a user touch (e.g., a user touch detected by the bezel touch sensor 166) from the display apparatus 100 according to the control of the controller 210.

The input/output unit 240 may respectively transmit the contents corresponding to the approach of the display apparatus 100 or the user touch to the large scale display apparatus 100 according to the control of the controller 210. The input/output unit 240 may respectively output the contents corresponding to the approach of the display apparatus 100 or the user touch to the plurality of display apparatuses 100 according to the control of the controller 210.

The input/output unit 240 may include a HDMI port (not shown), a display port (not shown), a digital video interface (DVI) port (not shown), a D-subminiature (D-sub) port (not shown), an unshielded twisted pair (UTP) cable port (not shown), a USB jack (not shown), and an audio-out port (not shown). The audio-out port (not shown) may output an audio to a speaker (not shown) or a headphone (not shown) according to the control of the controller 210.

Meanwhile, at least one of the above components (not shown) of the input/output unit 240 may be added or omitted depending upon the performance of the electronic apparatus 200. In addition, the locations of the components (not shown) may be changed depending upon the performance and structure of the electronic apparatus 200, which may be easily understood by those skilled in the art.

A display 260 may display the content split screens corresponding to a first content or the number of the display apparatus 100 according to the control of the controller 210. The display 260 may display an application (not shown) for controlling the display apparatus 100 according to the control of the controller 210. In addition, the controller 210 may set up a function or an operation of the display apparatus 100 by using the application (not shown) in response to a user input.

The display 260 may display an approach of the slave display apparatuses 102 and 103 with respect to the master display apparatus 101 according to the control of the controller 210. The display 260 may provide a visual feedback corresponding to the approach of the slave display apparatuses 102 and 103 with respect to the master display apparatus 101 according to the control of the controller 210.

For example, the display 260 may include a liquid crystal display (LCD), an OLED, a plasma display panel (PDP), or a vacuum emitting diode (VFD). In addition, the display 260 may be realized as an integral type or a separate type with respect to the electronic apparatus 200. The separate type display (not shown) may be electrically connected to the electronic apparatus 200 through the input/output unit 240 or the communication unit 230.

A speaker 265 may output an audio according to the control of the controller 210. The speaker 265 may output an audio (e.g., voice, music, or sound) received through the communication unit 230 and an input/output unit (not shown) according to the control of the controller 210. The speaker 265 may provide an auditory feedback corresponding to the approach of the slave display apparatuses 102 and 103 with respect to the master display apparatus 101 according to the control of the controller 210.

The speaker 265 may be realized as 1-channel, 2-channel, or 2.1-channel. In addition, the speaker 265 may be realized as 4-channel, 4.1-channel, 5.1-channel, 6.1-channel, 7.1-channel, 9.1-channel, or 11.2-channel, but not limited thereto.

A storage 275 may store diverse data, programs, or applications for operating and controlling the electronic apparatus 200 according to the control of the controller 210. The storage 275 may store an input/output signal or data corresponding to the operations of the communication unit 230, the input/out unit 240, the display 260, the speaker 265, the storage 275, and/or the power unit 280.

The storage 275 may store a control program for controlling the electronic apparatus 200 and the controller, an application being initially provided by a manufacturer or downloaded from an external source, a GUI related to an application, an object for providing a GUI (e.g., an image text, an icon, a button, and the like), user information, a document, DBs, or related data. For example, the user information may include a user ID, a password, a user name, user biometric information (e.g., fingerprint, iris, pulse, blood pressure, or temperature), and the like.

Meanwhile, the storage 275 may store received display apparatus information on the display apparatus 100.

In addition, the storage 275 may store received display apparatus information on the display apparatuses 101 to 103.

The storage 275 may store an approach status (e.g., space, approaching, or contact) of the slave display apparatuses 102 and 103 measured by the distance measuring sensor 167 of the master display apparatus 101.

The storage 275 may store a distance of the slave display apparatuses 102 and 103 measured by the distance measuring sensor 167 of the master display apparatus 101.

The storage 275 may store the contact point of the slave display apparatuses 102 and 103 received through the bezel touch sensor 166 of the master display apparatus 101.

The storage 275 may store the first touch position information, the first hovering position information, and the first touch gesture information received through the bezel touch sensor 166 of the master display apparatus 101.

The storage 275 may store the content 520 and the original copy 521 of the content 520.

The storage 275 may store the content split information transmitted to the slave display apparatuses 102 and 103.

The storage 275 may store the dimension, location, or shape of the main area in the multi-vision screen. In addition, the storage 275 may store the dimension, location, or shape of the sub area in the multi-vision screen.

The storage 275 may store the dimension, location, or shape of the changed main area. In addition, the storage 275 may store the dimension, location, or shape of the changed sub area.

The storage 275 may store the contents (image or video) generated in a chronological order.

The storage 275 may store the distance of the display apparatuses 101 to 103 which display the contents in a chronological order.

The storage 275 may store the changed distance of the display apparatuses 101 to 103 which display the contents in a chronological order.

The storage 275 may store a video or image corresponding to the visual feedback. In addition, the storage 275 may store a sound corresponding to the auditory feedback.

In an embodiment of the present disclosure, a term 'storage of the electronic apparatus 200' may include the storage 180, the ROM 112 and the RAM 113 of the controller, or the memory card (e.g., an SD card or a USB memory/not shown) which is mounted to the display apparatus 100. In addition, the storage 275 may store a non-volatile memory, a volatile memory, a HDD, or a SDD.

The power unit 280 supplies the power being received from an external power source to the internal components 210 to 280 of the electronic apparatus 200 according to the control of the controller 210. In addition, the power unit 280 may supply the power being received from a battery or two or more batteries (not shown) inside the electronic apparatus 200 to the internal components 210 to 280 according to the control of the controller 210.

Referring to FIGS. 1 and 2B, at least one of the components (e.g., 210 to 280) of the electronic apparatus 200 may be added or omitted depending upon the performance of the electronic apparatus 200. In addition, the locations of the components (e.g., 210 to 280) may be changed depending upon the performance or structure of the electronic apparatus 200, which may be easily understood by those skilled in the art.

Referring to FIG. 3A, the sensor 165 and the LED bar 168 may be disposed on the side surface of the bezel 10 which surrounds and supports the display 170.

The bezel 10 may be made of light metal material (e.g., aluminum), reinforced plastics having high strength/high elasticity, or a carbon fiber having high strength/high elasticity. In addition, the bezel 10 may have a gradient or curvature corresponding to the structure and/or performance of the display apparatus 100. The gradient of the bezel 10 may be obtained based on a width of the front surface of the bezel 10. The curvature of the bezel 10 may be obtained based on a connection area between the front surface and the side surface of the bezel 10.

The bezel touch sensor 166, the distance measuring sensor 167, and/or the LED bar 168 may be disposed in a groove formed on the side surface of the bezel 10. A side surface of the groove formed on the side surface of the bezel 10 may come into contact with one of both surfaces of the bezel touch sensor 166, one of both surfaces of the distance measuring sensor 167, and one of both surfaces of the LED bar 168. The groove on the side surface of the bezel 10 may be formed in the bezels on four places of the display apparatus 100. The grooves in the side surfaces of the bezel 10 may be interconnected.

In response to a user contact (or a non-contact including hovering) with respect to the bezel touch sensor 166 being received, a bezel touch sensor controller (not shown) may output an electronic signal (e.g., a digital signal or an analog signal) corresponding to a contact point (e.g., x-coordinate and y-coordinate) to the controller. The controller may calculate the x-coordinate and the y-coordinate corresponding to the contact point by using the received electronic signal. In addition, the controller may detect a user touch corresponding to the contact point.

The bezel touch sensor 166 may include a thin potentiometer. The bezel touch sensor 166 may detect an accurate contact point by using a resistance which varies linearly in response to the received user contact. In addition, the bezel touch sensor 166 may detect an accurate consecutive contact points by using the resistance which varies linearly in response to a consecutive movement of the received user contact.

The bezel touch sensor 166 may be realized as one bezel touch sensor or a plurality of bezel touch sensors depending upon a length and width of the bezel 10. For example, when a width of the bezel 10 is 1,200 mm, the bezel touch sensor 166 may be realized as two bezel touch sensors having a width of 500 mm and one bezel touch sensor having a width of 200 mm which are electrically connected. When a length of the bezel 10 is 600 mm, the bezel touch sensor 166 may be realized as one bezel touch sensor having a length of 500 mm and one bezel touch sensor having a length of 100 mm which are electrically connected.

In response to consecutive user contacts (or non-contact including consecutive hovering) with respect to the bezel touch sensor 166 being received, the bezel touch sensor controller (not shown) may output an electronic signal (e.g., a digital signal or an analog signal) corresponding to the consecutive contact points (e.g., a plurality of x-coordinates and y-coordinates) to the controller. The controller may calculate a plurality of x-coordinates and y-coordinates corresponding to the consecutive contact points by using the received electronic signal. In addition, the controller may detect the consecutive movements of the user touch (e.g., a touch gesture) corresponding to the consecutive contact points.

Meanwhile, two or more grooves (not shown) may be formed on at least one or more side surfaces of the bezels 10 of the display apparatus 100. The bezel touch sensor 166 may be disposed inside the two or more grooves (not shown) formed on the side surfaces of the bezel 10. The controller may detect a one-dimensional movement (e.g., a vertical movement or a horizontal movement of a touch) and a two-dimensional movement (e.g., a diagonal movement of the touch) of the existing bezel touch sensor through a plurality of bezel touch sensors disposed in a plurality of grooves (not shown) which are formed on the side surfaces of the bezel 10.

The bezel touch sensor 166 may be disposed on an insulating layer (e.g., an insulating tape 166F) in the groove on the side surface of the bezel depending upon the material of the bezel 10. In addition, a protective layer (e.g., a film, a plastic layer, or a glass layer 166G) may be disposed on the bezel touch sensor 166. The protective layer 166G may protect the bezel touch sensor 166 against a strong impact and/or damage from outside. In addition, a color of the protective layer 166G may be the same as a color of the bezel 10. The protective layer 166G may have a gradient and/or curvature corresponding to the gradient and/or curvature of the bezel 10.

The bezel touch sensor 166 may be fixed by the groove on the side surface of the bezel 10, an adhesive tape, an adhesive, or an engagement member (e.g., a screw (not shown)). Meanwhile, a printed circuit board (not shown) which is electrically connected to the bezel touch sensor 166 may be disposed inside the groove on the side surface of the bezel 10. The printed circuit board (not shown) may include a bezel touch sensor controller (not shown). The printed circuit board (not shown) which is electrically connected to the bezel touch sensor 166 may be disposed inside the display apparatus 100. The bezel touch sensor 166 and/or the printed circuit board (not shown) may be electrically connected to the controller of the display apparatus 100.

The distance measuring sensor 167 may include an infrared light emitting element 166A and an infrared light receiving element (not shown). The infrared light emitting element 166A and the infrared light receiving element (not shown) of the distance measuring sensor 167 may be laminated vertically with reference to a bottom surface of the distance measuring sensor 167. In addition, the infrared light emitting element 166A and the infrared light receiving element (not shown) of the distance measuring sensor 167 may be disposed horizontally with reference to the bottom surface of the distance measuring sensor 167.

Meanwhile, a distance measuring sensor array (not shown) including a plurality of distance measuring sensors 167 may be disposed in an upper bezel and a lower bezel of the display apparatus 100 in a horizontal direction. The distance measuring sensor array (not shown) including the plurality of distance measuring sensors 167 may be disposed in a vertical direction with reference to a left bezel and a light bezel of the display apparatus 100. In addition, a reflecting plate 167R for reflecting a light outputted from the light emitting element 167A may be disposed below the distance measuring sensor 167.

The distance measuring sensor 167 may be disposed in a groove which is adjacent to the bezel touch sensor 166. A distance between the groove in which the distance measuring sensor 167 is located and a groove in which the bezel touch sensor 166 is located is shorter than a width of the bezel 10. A light outputted from the infrared light emitting element of the distance measuring sensor 167 is reflected in the slave display apparatuses 102 and 103 and detected in the infrared light receiving element.

The distance measuring sensor 167 may detect an accurate distance by using a voltage which varies linearly in response to a distance between the master display apparatus 101 and the slave display apparatuses 102 and 103. In addition, the distance measuring sensor 167 may detect an accurate consecutive contact points by using the voltage which varies linearly in response to a change of the distance between the master display apparatus 101 and the slave display apparatuses 102 and 103.

The controller may calculate the distance between the master display apparatus 101 and the slave display apparatuses 102 and 103 by using a detected voltage and/or a difference between a light emitting time and a light receiving time. The distance measuring sensor 167 may transmit an analog signal (or a digital signal) to the controller.

The controller may calculate a distance from 2 mm to 6 m by using the received signal. The calculated distance may vary (e.g., decrease or increase) depending upon the performance of the distance measuring sensor, which may be easily understood by those skilled in the art.

The distance measuring sensor 167 may be disposed on the insulating layer (e.g., an insulating tape (not shown)) in the groove on the side surface of the bezel 10 depending upon the material of the bezel 10. In addition, a light window 167W may be disposed in an upper part of the distance measuring sensor 167. Respective lights outputted from the light emitting element of the distance measuring sensor 167 pass through the light window 167W, and a plurality of light receiving elements may receive the lights reflected in the slave display apparatuses 102 and 103 and passed through the light window 167W.

A material of the light window 167W may include optical glass (e.g., a crown glass, a flint glass, and a barium crown glass) and plastic (e.g., poly-methyl-metha-acrylate, polycarbonate, and allyl-diglycol-carbonate). The light window 167W may protect the distance measuring sensor 167 against a strong impact and/or damage from outside. In addition, the light window 167W may have a gradient and/or curvature corresponding to the gradient and/or curvature of the bezel 10. The light window 167W may include a light guide (not shown) which may guide a light that passed through the light window 167W to the light receiving element of the distance measuring sensor.

The distance measuring sensor 167 may be fixed by the groove on the side surface of the bezel 10, an adhesive tape, an adhesive, or an engagement member (e.g., a screw (not shown)). Meanwhile, a printed circuit board (not shown) which is electrically connected to the distance measuring sensor 167 may be disposed inside the groove on the side surface of the bezel 10. The printed circuit board (not shown) may include a distance measuring sensor controller (not shown).

The distance measuring sensor 167 may include the distance measuring sensor controller (not shown). The printed circuit board (not shown) which is electrically connected to the distance measuring sensor 167 may be disposed inside the display apparatus 100. The distance measuring sensor 167 and/or the printed circuit board (not shown) may be electrically connected to the controller of the display apparatus 100.

The LED bar 168 may be an aggregation (or an array) of a plurality of LEDs 168A. A groove in which the LED bar 168 is located may be formed between the groove in which the distance measuring sensor 167 is located and the groove in which the bezel touch sensor 166 is located. In addition, the groove in which the LED bar 168 is located may be formed outside the groove in which the distance measuring sensor 167 is located and the groove in which the bezel touch sensor 166 is located.

In response to an approach of the slave display apparatuses 102 and 103 being detected by the distance measuring sensor 167 or in response to a user input being detected by the bezel touch sensor 166, the LED bar 168 may emit a light for a certain setting time according to the control of the controller. The setting time may be 500 to 1,000 msec, for example. The setting time may be changed according to a setting of a user or a manufacturer.

Depending upon the length and width of the bezel 10, one LED bar 168 or a plurality of LED bars 168 may be provided. For example, when the width of the bezel 10 is 1,200 mm, three LED bars having a width of 400 mm may be electrically connected. When the length of the bezel 10 is 600 mm, one LED bar having a length of 400 mm and one LED bar having a length of 200 mm may be electrically connected.

The LED bar 168 may be disposed on an insulating layer (e.g., an insulating tape (not shown)) in the groove on the side surface of the bezel depending upon the material of the bezel. In addition, a protective layer (e.g., a film, a plastic light guide plate, or a glass light guide plate, 168G) may be disposed on the LED bar 168. The protective layer 168G may protect the LED bar 168 against a strong impact and/or damage from outside. In addition, the protective layer 168G may be transparent or may be white. Alternatively, the LED bar 168 may have a color which is the same as the color of the bezel 10. The protective layer 168G may have a gradient and/or curvature corresponding to the gradient and/or curvature of the bezel 10.

The LED bar 168 may be fixed by the groove on the side surface of the bezel 10, an adhesive tape, an adhesive, or an engagement member (e.g., a screw (not shown)). Meanwhile, a printed circuit board (not shown) which is electrically connected to the LED bar 168 may be disposed inside the groove on the side surface of the bezel 10. The printed circuit board (not shown) which is electrically connected to the LED bar 168 may be disposed inside the display apparatus 100. The LED bar 168 and/or the printed circuit board (not shown) may be electrically connected to the controller of the display apparatus 100.

Referring to FIG. 3B, only the bezel touch sensor 166 and the LED bar 168 may be disposed on the front surface of the bezel 10 which surrounds and supports the display 170.

Depending upon an arrangement of the bezel touch sensor 166, the distance measuring sensor 167, and the LED bar 168 (e.g., the front surface or the side surface of the bezel 10), the width of the front surface of the bezel 10 may vary. For example, in FIG. 3B, the width of the front surface of the bezel 10 in which the bezel touch sensor 166 and the LED bar 168 are located may be shorter than a width of the front surface of the bezel 10 in which the bezel touch sensor 166, the distance measuring sensor 167, and the LED bar 168 are located in FIG. 3A.

The bezel touch sensor 166 and the LED bar 168 in FIG. 3B are substantially the same as the bezel touch sensor 166 and the LED bar 168 in FIG. 3A (e.g., except for a difference in an arrangement), and thus, the overlapped description is omitted.

Referring to FIG. 3C, the bezel touch sensor 166, the distance measuring sensor 167, and the LED bar 168 may be disposed on the front surface of the bezel 10 which surrounds and supports the display 170. In addition, a distance measuring sensor 167' may be disposed on the rear surface of the bezel 10. The distance measuring sensor 167 on the front surface of the bezel 10 may measure a distance between the master display apparatus 101 and the slave display apparatus 102. In addition, the distance measuring sensor 167' on the rear surface of the bezel 10 may measure a distance between the master display apparatus 101 and the slave display apparatus 103.

Protective layers 167W and 167W1 of the distance measuring sensors 167 and 167' may have a gradient and/or curvature corresponding to the gradient and/or curvature of the bezel 10. The gradient of the protective layer 167W of the distance measuring sensor 167 which is located on the front surface of the bezel 10 may be different from the gradient of the protective layer 167W1 of the distance measuring sensor 167' which is located on the rear surface of the bezel 10. For example, the gradient of the protective layer 167W of the distance measuring sensor 167 which is located on the front surface of the bezel 10 may be more gradual than the gradient of the protective layer 167W1 of the distance measuring sensor 167' which is located on the rear surface of the bezel 10. A reflecting plate 167r1 may be positioned underneath the distance measuring sensor 167' to reflect light output from the infrared light-emitting device 167a1.

The bezel touch sensor 166 and the LED bar 168 in FIG. 3C are substantially the same as the bezel touch sensor 166 and the LED bar 168 in FIG. 3B, and thus, the overlapped description is omitted.

Referring to FIGS. 3A, 3B, and 3C, at least one of the bezel touch sensor 166, the distance measuring sensor 167, and the LED bar 168 located in the bezel 10 may be added/omitted depending upon the performance of the display apparatus 100. In addition, the distance measuring sensor 167, and the LED bar 168 located in the bezel 10 may be changed depending upon the performance or structure of the display apparatus 100, which may be easily understood by those skilled in the art.

Hereinafter, a method for displaying a screen of a display apparatus according to the first embodiment of the present disclosure will be described with reference to FIGS. 4 to 5.

FIG. 4 is a flowchart illustrating a method for displaying a screen of a display apparatus according to an embodiment of the present disclosure.

FIGS. 5A, 5B, 5C, 5D, 5E, 5F, 5G, 5H, 5I, and 5J are diagrams illustrating a method for displaying a screen of a display apparatus according to various embodiments of the present disclosure.

Referring to FIG. 4, a multi-vision output is set up at operation S410.

Referring to FIGS. 5A and 5B, a user is able to set up the multi-vision output in a setting 500 of the display apparatus 100. The user is able to change the setting 500 of the display apparatus 100 by using a remote controller (not shown) or a panel key (not shown) which is located on the rear surface of the display apparatus 100. In response to the remote controller (not shown) or a menu key of the display apparatus 100 being selected by the user, the controller of the display apparatus 100 may display the setting 500 in a screen.

The user is able to select a multi-vision output 511 from a picture 510 in the setting 500 by using the remote controller (not shown) or the panel key (not shown).

In response to the multi-vision output 511 being selected, the controller 110 of the display apparatus 100 may display a pop-up window for a specific setting operation of the multi-vision output 511. In the displayed pop-up window, the multi-vision output 511 may include a multi-vision output on 511A and a multi-vision output off 511B. In addition, the multi-vision output 511 may include a master/slave status 511C of the display apparatus.

The controller 110 of the display apparatus 100 may receive a selection of one of 'ON,' 'OFF,' and 'AUTO' with respect to the multi-vision output 511 according to a user input. In addition, the controller 110 of the display apparatus 100 may receive a selection of one of 'master' and 'slave' with respect to the display apparatus according to a user input.

In response to the ON 511A of the multi-vision output being selected and the display apparatus 100 being the master display apparatus 101, the controller 110 of the master display apparatus 101 may generate an enlarged and split content and output the displayed content to the slave display apparatuses 102 and 103 which come into contact to correspond to the arrangement of the slave display apparatuses 102 and 103 (e.g., left side or right side of the display apparatus or a contact point of a bezel).

In response to the plurality of slave display apparatuses 102 and 103, the controller of the display apparatus 100 may be set up by the user in the setting (not shown) so as to output the enlarged content (or an enlarged content split screen) to one of the slave display apparatuses 102 and 103 first. In addition, in response to the plurality of slave display apparatuses 102 and 103, the controller of the display apparatus 100 may be set up by the user in the setting (not shown) so as to output a reduced content (or a reduced content split screen) to one of the slave display apparatuses 102 and 103 first.

In response to the OFF 511B of the multi-vision output being selected and the slave display apparatuses 102 and 103 being set as 'slave', the controller of the slave display apparatuses 102 and 103 may receive an enlarged and split part of the content displayed in the master display apparatus 101 to correspond to the arrangement of the slave display apparatuses 102 and 103 (e.g., left side or right side of the display apparatus or a contact point of a bezel).

In response to a return/exit button (not shown) being selected by the user from the remote controller (not shown) or the panel key (not shown), the controller of the display apparatus 100 may finish a setting operation of the multi-vision output 511 in the setting 500. In addition, the user is able to set up or finish the multi-vision output 511 in the setting 500 of the display apparatuses 101 to 103.

The controller of the display apparatuses 101 to 103 may store a result of the setting operation of the multi-vision output in respective storages thereof.

According to another embodiment of the present disclosure, a user is able to set up the multi-vision output through the setting (e.g., a setting displayed in an application (not shown) for controlling a display apparatus) in the display 260 of the electronic apparatus 200. The user is able to execute a shortcut icon (not shown) corresponding to an application (not shown) displayed in the display 260 of the electronic apparatus 200. In addition, the user is able to execute dedicated software (not shown) for controlling a display apparatus 100' displayed in the display 260 of the electronic apparatus 200.

The user is able to change the setting (e.g., an on/off status of the multi-vision output) of the display apparatus 100 through the setting of the executed application (or the dedicated software).

In addition, the user is able to select the multi-vision output (not shown) in the setting (not shown) by using a voice, a motion, a keyboard (not shown), a mouse (not shown), or other input units (e.g., a stylus (not shown)).

According to another embodiment of the present disclosure, the setting through an application is substantially the same as the setting 500 through the display apparatus 100, and thus, the overlapped description is omitted.

Referring to FIG. 4, contents are displayed in the master display apparatus and the slave display apparatus at operation S420.

Referring to FIG. 5C, the slave display apparatuses 102 and 103 and the master display apparatus 101 which is located between the slave display apparatuses 102 and 103 display different contents 520, 530, 540, respectively. The master display apparatus 101 and the slave display apparatuses 102 and 103 may display different contents 520, 530, 540, respectively, to correspond to a direction of a screen (e.g., a horizontal direction or a vertical direction). Referring to FIG. 5C, an arrangement of the display apparatuses 101 to 103 is only an example, and the arrangement of the display apparatuses 101 to 103 may vary as illustrated in FIG. 5J.

The master display apparatus 100 may be designated through the setting 500. In addition, the master display apparatus 101 may be a display apparatus from which a user touch is detected initially through the bezel touch sensor 166 after the multi-vision output is set up.

The master display apparatus 101 may display the contents stored in the storage or the contents received from an external source. The slave display apparatuses 102 and 103 may display the contents stored in the storage or the contents received from an external source. In addition, only the master display 101 displays the contents, and the slave display apparatuses 102 and 103 may be in a standby mode (e.g., a mode where power is supplied but any content is not displayed in a screen).

The master display apparatus 101 and the slave display apparatuses 102 and 103 are spaced from each other.

Referring to FIG. 5I, the slave display apparatuses 102 and 103 and the master display apparatus 101 which is located between the slave display apparatuses 102 and 103 display different contents 521, 530, 540, respectively. The master display apparatus 101 and the slave display apparatuses 102 and 103 may display the different contents 521, 530, 540, respectively, to correspond to the direction of the screen (e.g., a horizontal direction or a vertical direction). Referring to FIG. 5I, the content 521 displayed in the master display apparatus 101 is a full screen of the content 520 displayed in the master display apparatus 101 in FIG. 5C. The controller 110 of the master display apparatus 101 in FIG. 5I may reduce the content 521 to correspond to a screen size and display the reduced content as a full screen. The controller 110 of the master display apparatus 101 may display blank spaces in upper and lower parts of the content 521, as well as the content 521.

Referring to FIG. 5J, FIG. 5J illustrate examples of an arrangement of the master display apparatus and the slave display apparatus which are arranged variously. Referring to FIG. 5J-(a), the slave display apparatuses 102 and 103 are disposed on a left side and a right side of the master display apparatus 101. Comparing the arrangement with the arrangement in FIG. 5C, a contact point where the slave apparatuses 102 and 103 come into contact with the master display apparatus 101 and a direction of a screen of the slave display apparatus 102 are different from those of FIG. 5C. Referring to FIG. 5J-(b), the slave display apparatuses 102 and 103, 104 are disposed on the left side and the right side of the master display apparatus 101. Comparing the arrangement with the arrangement in FIG. 5C, the contact point where the slave apparatuses 102 and 103, 104 come into contact with the master display apparatus 101 and the direction of the screen of the slave display apparatuses 102 and 103, 104 may be different from those of FIG. 5C.

Referring to FIG. 5J-(c), the slave display apparatuses 102 and 103 are disposed on the left side and the right side of the master display apparatus 101. In addition, other slave display apparatuses 104, 105 are disposed on a left side and a right side of the slave display apparatuses 102 and 103, respectively. In response to the slave display apparatus 104 coming contact with the slave display apparatus 102, the slave display apparatus 102 may transmit display apparatus information and a contact point of the slave display apparatus 104 to the master display apparatus 101. In addition, in response to the slave display apparatus 105 coming contact with the slave display apparatus 103, the slave display apparatus 103 may transmit display apparatus information and a contact point of the slave display apparatus 105 to the master display apparatus 101.

The controller 110 of the master display apparatus 101 may generate the content split screens corresponding to the five display apparatuses. The generated content split screens (corresponding to the five display apparatuses) may be transmitted to the slave display apparatuses 102 to 105, respectively. The control unit of the slave display apparatuses 102 to 105 may display the received content split screens in the screen.

Comparing the arrangement with the arrangement of FIG. 5C, a contact point with respect to the master display apparatus 101 and a direction of the screen of the slave display apparatuses 102 to 1054 are different from those in FIG. 5C. In addition, the slave display apparatus 102 may be disposed (not shown) on one of the left side and the right side of the master display apparatus 101. The generated content split screens may be transmitted to the slave display apparatuses to correspond to the number of the slave display apparatuses which are disposed on a certain side of the master display apparatus 101, which may be easily understood by those skilled in the art.

According to another embodiment of the present disclosure, the display apparatuses 101 to 103 may respectively display the different contents 520 to 540 or 521 to 540 received from the electronic apparatus 200. The electronic apparatus 200 may transmit the contents 520 to 540 or 521 to 540 to the display apparatuses 101 to 103. The contents 520 to 540 or 521 to 540 may be stored in the storage 275 of the electronic apparatus 200 or received from outside of the electronic apparatus 200.

The electronic apparatus 200 may be connected to the display apparatuses 101 to 103 in a wired and/or wireless manner. In response to the contents being received from the electronic apparatus 200, the display apparatuses 101 to 103 may not be classified into a master display apparatus and a slave display apparatus. In addition, in response to the contents being received from the electronic apparatus 200, the master display apparatus may be a display apparatus which detects an approach of a slave display apparatus being moved or comes into contact with the slave display apparatus being moved.

According to another embodiment of the present disclosure, the operation of displaying the contents received from the electronic apparatus 200 in the display apparatuses 101 to 103 is substantially the same as the operation of displaying the contents in the display apparatuses 101 to 103, and thus, the overlapped description is omitted.

Referring to FIG. 4, an approach of the slave display apparatus is detected from the master display apparatus at operation S430.

Referring to FIG. 5C, the slave display apparatuses 102 and 103 approaches the master display apparatus 101. The slave display apparatuses 102 and 103 may approach the master display apparatus 101 manually by a user.

When a rail (not shown) for moving the display apparatuses 101 to 103 is installed in a ceiling or a floor of a place in which the display apparatuses 101 to 103 are located (e.g., an exhibition, a performance hall, or indoor/outdoor), the display apparatuses 101 to 103 may be easily moved through the rail by a user. When the display apparatuses 101 to 103 include a transport unit (e.g., a motor, wheel, or a remote-controllable processor (not shown)) for moving through the rail (not shown), the display apparatuses 101 to 103 may be easily moved through the rail by remote control.

The controller 110 of the master display apparatus 101 may detect an approach of the slave display apparatuses 102 and 103 by using the distance measuring sensor 167 disposed on the side surface of the bezel 10. The controller 110 of the master display apparatus 101 may detect the approaching slave display apparatuses 102 and 103 according to a measurement range of the distance measuring sensor 167.

The controller 110 of the master display apparatus 101 may store approach information corresponding to the detection of the approaching slave display apparatuses 102 and 103 in the storage 180. The approach information may include an ID for history management, an ID of one or a plurality of distance measuring sensors 167 which detect an approach of the slave display apparatus, an approach detecting time, an approach detecting voltage (or current), and the like. The slave display apparatus (e.g., the slave display apparatus 102) which approaches a certain side of the master display apparatus 101 may be detected by the plurality of distance measuring sensors 167 located in a certain side of the master display apparatus 101. In addition, the slave display apparatuses (e.g., the slave display apparatuses 102 and 103) which approaches both sides of the master display apparatus 101 may be detected by the plurality of distance measuring sensors 167 located in both sides of the master display apparatus 101.

The approach information may be updated in response to a change of a distance between the master display apparatus 101 and the slave display apparatuses 102 and 103 (e.g., decrease or increase of the distance). In addition, in response to the master display apparatus 101 coming contact with the slave display apparatuses 102 and 103, an update operation of the approach information may be finished.

The controller 110 of the master display apparatus 101 may output a feedback corresponding to the detection of the approach of the slave display apparatuses 102 and 103. In addition, the controller 110 of the master display apparatus 101 may let the LED bar 168 flickers 520A, 520B in response to the detection of the approach of the slave display apparatuses 102 and 103.

The controller 110 of the master display apparatus 101 may let the LED bar 168 flicker for a certain setting time (e.g., 300 ms, the setting time may be changed according to the setting). In addition, in response to the master display apparatus 101 coming contact with the slave display apparatuses 102 and 103, the controller 110 of the master display apparatus 101 may finish a flickering operation with respect to the LED bar 168.

According to another embodiment of the present disclosure, the electronic apparatus 200 may receive the approach information corresponding to the detection of the approaching slave display apparatuses 102 and 103 from the master display apparatus 101.

The controller 110 of the master display apparatus 101 may transmit the approach information (e.g., first approach information) corresponding to the approach of the slave display apparatuses 102 and 103 and being detected by the distance measuring sensor 167 to the electronic apparatus 200 through the communication unit 130 or the input/output unit 160. In addition, the controller 110 of the slave display apparatus 102 may transmit the approach information (e.g., second approach information) corresponding to the approach of the master display apparatus 101 and the slave display apparatus 103 and being detected by the distance measuring sensor 167 to the electronic apparatus 200 through the communication unit 130 or the input/output unit 160. In addition, the controller 110 of the slave display apparatus 103 may transmit the approach information (e.g., third approach information) corresponding to the approach of the master display apparatus 101 and the slave display apparatus 102 and being detected by the distance measuring sensor 167 to the electronic apparatus 200 through the communication unit 130 or the input/output unit 160.

The storage 275 may store the received approach information according to the control of the controller 210 of the electronic apparatus 200. The approach information may be at least one of the first approach information, the second approach information, and the third approach information, for example. The approach information may include one of the first approach information, the second approach information, and the third approach information or a combination thereof. The approach information may include the ID for history management, the ID of one or the plurality of distance measuring sensors 167 which detect the approach of the slave display apparatus, the approach detecting time, the approach detecting voltage (or current), and the like.

According to another embodiment of the present disclosure, the operation of receiving the approach information corresponding to the detection of the approach of the display apparatus in the electronic apparatus 200 is substantially the same as the operation of detecting the approaching slave display apparatuses 102 and 103 in the master display apparatus 101, and thus, the overlapped description is omitted.

Referring to FIG. 4, display apparatus information is received from the slave display apparatus at operation S440.

Referring to FIG. 5D, in response to a distance between the master display apparatus 101 and the detected slave display apparatuses 102 and 103 being gradually decreased, the controller 110 of the master display apparatus 101 may be connected to the slave display apparatuses 102 and 103 through the communication unit.

In response to the master display apparatus 101 and the detected slave display apparatuses 102 and 103 having a connection history, the controller 110 of the master display apparatus 101 may be connected to the slave display apparatuses 102 and 103 through the communication unit. In response to the master display apparatus 101 being initially connected to the slave display apparatuses 102 and 103, the controller 110 of the master display apparatus 101 may display the setting 500 for a network setting.

A user is able to select a network 540 in the setting 500 of the master display apparatus 101 by using the remote controller (not shown) or the panel key (not shown). In addition, the user is able to select a Wi-Fi direct (not shown) in the network 540 of the setting 500 by using the remote controller (not shown) or the panel key (not shown). In response to the Wi-Fi direct (not shown) being selected by the user, the controller 110 of the master display apparatus 110 may search for the adjacent slave display apparatuses 102 and 103 which support a Wi-Fi direct communication method.

The slave display apparatuses 102 and 103 which are objects to be connected may be selected by the user from a search list (not shown) corresponding to a search result displayed in the screen of the master display apparatus 101. The controller of the master display apparatus 101 may be wirelessly connected to the communication unit of the slave display apparatuses 102 and 103 through the communication unit in response to a user selection.

The Wi-Fi direct communication method is only an example, and not limited thereto. For example, the master display apparatus 101 and the slave display apparatuses 102 and 103 may be connected in any communication method of capable of transmitting contents (e.g., a video or an image), which may be easily understood by those skilled in the art.

In response to the master display apparatus 101 being connected to the slave display apparatuses 102 and 103, the controller 110 of the master display apparatus 101 may store the display apparatus information respectively being received from the slave display apparatuses 102 and 103 in the storage. The respective display apparatus information may include wireless connection information (e.g., wireless communication method, SSID, internet protocol (IP) address, media access control (MAC) address, channel number, or security key), a product name of the display apparatus, an ID of the display apparatus, a type of the display apparatus, a profile supported by the display apparatus, an extender of a video which may be reproduced in the display apparatus, a video codec, a screen size of the display apparatus, the screen resolution of the display apparatus, a wireless communication method supported by the display apparatus, and the like.

According to another embodiment of the present disclosure, the electronic apparatus 200 may receive the display apparatus information from the display apparatus 100.

The controller 110 of the master display apparatus 101 may transmit the received display apparatus information on the slave display apparatuses 102 and 103 to the electronic apparatus 200 through the communication unit 130 or the input/output unit 160. The controller 110 of the slave display apparatus 102 may transmit the received display apparatus information on the master display apparatus 101 and the slave display apparatus 103 to the electronic apparatus 200 through the communication unit 130 or the input/output unit 160.

The controller 110 of the slave display apparatus 103 may transmit the received display apparatus information on the master display apparatus 101 and the slave display apparatus 102 to the electronic apparatus 200 through the communication unit 130 or the input/output unit 160. The storage 275 may store the received contact point information according to the control of the controller 210 of the electronic apparatus 200.

According to another embodiment of the present disclosure, the operation of receiving the display apparatus information on the display apparatus in the electronic apparatus 200 is substantially the same as the operation of receiving the display apparatus information on the approaching slave display apparatuses 102 and 103 in the master display apparatus 101, and thus, the overlapped description is omitted.

Referring to FIG. 4, the content split screens are generated according to an arrangement of the master display apparatus and the slave display apparatus at operation S450.

Referring to FIG. 5E, the slave display apparatuses 102 and 103 which approached the left side and the right side of the master display apparatus 101 come into contact with the master display apparatus 101. The controller 110 of the master display apparatus 101 may detect a contact between the master display apparatus 101 and the slave display apparatuses 102 and 103 by using the distance measuring sensor 167 located in the bezel 10. In addition, the controller 110 of the master display apparatus 101 may detect a contact between the master display apparatus 101 and the slave display apparatuses 102 and 103 by using the bezel touch sensor 166 located in the bezel 10.

The controller 110 of the master display apparatus 101 may calculate a contact point (e.g., x-coordinate and y-coordinate) between the master display apparatus 101 and the slave display apparatuses 102 and 103 by using the distance measuring sensor 167 located in the bezel 10. The controller 110 of the master display apparatus 101 may detect a contact point between the master display apparatus 101 and the slave display apparatuses 102 and 103 by using an output status of an output value of the distance measuring sensor 167. For example, in response to an output value (e.g., voltage) of the distance measuring sensor 167 being constant from a point of time when an approach starts or in response to no output value being outputted, the controller 110 of the master display apparatus 101 may determine that the slave display apparatuses 102 and 103 do not come into contact with the master display apparatus 101.

In addition, the controller 110 of the master display apparatus 101 may calculate a contact point (e.g., x-coordinate and y-coordinate) between the master display apparatus 101 and the slave display apparatuses 102 and 103 by using the bezel touch sensor 166 located in the bezel 10. The controller 110 of the master display apparatus 101 may determine whether the master display apparatus 101 and the slave display apparatuses 102 and 103 come into contact with each other by using an output value of the bezel touch sensor 166. In addition, the controller 110 of the master display apparatus 101 may detect a contact point between the master display apparatus 101 and the slave display apparatuses 102 and 103 by using the output value of the bezel touch sensor 166. For example, in response to the output value (e.g., voltage) of the bezel touch sensor 166 being constant from a point of time when an approach starts or in response to no output value being outputted, the controller 110 of the master display apparatus 101 may determine that the slave display apparatuses 102 and 103 do not come into contact with the master display apparatus 101.

The controller 110 of the master display apparatus 110 may store the contact point information corresponding to the contact point in the storage 180. The stored contact point information may include an ID for the history management, an ID of one or a plurality of bezel touch sensors 166 which detect an approach, an ID of one or a plurality of distance measuring sensors 167 which detect an approach, a contact point detecting time, a contact point detecting voltage (or current), and the like.

The contact point information may be generated to correspond to the number of the slave display apparatus which come into contact with the master display apparatus 101. For example, in response to the master display apparatus 101 coming contact with one slave display apparatus, one piece of contact point information may be generated. In response to the master display apparatus 101 coming contact with two slave display apparatuses, two pieces of contact point information may be generated.

In response to the contact point between the master display apparatus 101 and the slave display apparatuses 102 and 103 being calculated, the controller 110 of the master display apparatus 101 may generate the content split screens by using the stored display apparatus information. In addition, in response to the contact point between the master display apparatus 101 and the slave display apparatuses 102 and 103 being calculated, the controller 110 of the master display apparatus 101 may generate the content split screens by using the stored display apparatus information and contact point information. In addition, in response to the contact point between the master display apparatus 101 and the slave display apparatuses 102 and 103 being calculated, the controller 110 of the master display apparatus 101 may generate the content split screens by using a GPU (not shown) and the display apparatus information. The content split screens may include a split video or a split image. In case of a video content, the content split screens may be a split video. In addition, in case of an image content, the content split screens may be a split image.

The controller 110 of the master display apparatus 101 may split a size (e.g., 521A to 521D in FIG. 5E) of the original copy 521 (refer to FIG. 5E) of the content 520 displayed in FIG. 5C to correspond to the same screen size of the display apparatuses 101 to 103 which come into contact with each other and generate the content split screens 521A to 521C.

The controller 110 of the master display apparatus 101 may split the original copy 521 of the content 520 to correspond to the contact point of the master display apparatus 101 and the slave display apparatuses 102 and 103 having the same screen size to generate the content split screens 521A to 521C. The size of the original copy 521 of the content 520 may be greater than a sum of the screen sizes of the display apparatuses 101 to 103 having the same screen size. In response to the screen sizes of the display apparatuses 101 to 103 being the same and the size of the original copy 521 of the content 520 being 4,250×1,660 mm, the master display apparatus 101 that is a reference object may display the content split screen 521A having the size of 933×1,660 mm, and the slave display apparatuses 102 and 103 may display the content split screens 521B, 521C having the size of 1,660×933 mm, respectively.

Meanwhile, the controller 110 of the master display apparatus 101 may split the original copy 521 of the content 520 to correspond to the different screen sizes of the display apparatuses 101 to 103 which come into contact with each other to generate the content split screens (not shown). The controller 110 of the master display apparatus 101 may split the original copy 521 of the content 520 to correspond to the contact point of the display apparatuses 101 to 103 having different screen sizes to generate the content split screens (not shown).

The size of the original copy 521 of the content 520 may be greater than a sum of the different screen sizes of the display apparatuses 101 to 103. The master display apparatus 101 and the slave display apparatuses 102 and 103 having the different screen sizes may display the content split screens corresponding to respective screen sizes, which may be easily understood by those skilled in the art.

The controller 110 of the master display apparatus 101 may split the original copy 521 of the content 520 to correspond to the same screen resolution of the display apparatuses 101 to 103 which come into contact with each other to generate the content split screens 521A to 521C. In addition, the controller 110 of the master display apparatus 101 may split the original copy 521 of the content 520 to correspond to the contact point of the master display apparatus 101 and the slave display apparatuses 102 and 103 having the same screen resolution to generate the content split screens 521A to 521C. The resolution of the original copy 521 of the content 520 may be greater than a sum of the same screen resolution of the display apparatuses 101 to 103.

In response to the screen resolution of the display apparatuses 101 to 103 being the same and the resolution of the original copy 521 of the content 520 being 4920×1920 pixels, the master display apparatus 101 that is the reference object may display the content split screen 521A having the resolution of 1080×1920 pixels, and the slave display apparatuses 102 and 103 may display the content split screens 521B, 521C having the resolution of 1920×1080 pixels, respectively.

The controller 110 of the master display apparatus 101 may split the original copy 521 of the content 520 to correspond to the different screen resolution of the display apparatuses 101 to 103 which come into contact with each other to generate the content split screens (not shown). In addition, the controller 110 of the master display apparatus 101 may split the original copy 521 of the content 520 to correspond to the contact point of the display apparatuses 101 to 103 having the different screen resolution to generate the content split screens (not shown).

The resolution of the original copy 521 of the content 520 may be greater than the sum of the different screen resolution of the display apparatuses 101 to 103. The master display apparatus 101 and the slave display apparatuses 102 and 103 having the different screen resolution may display the content split screens corresponding to the respective screen resolution, which may be easily understood by those skilled in the art.

The controller 110 of the master display apparatus 101 may increase or decrease the size of the original copy 521 of the content 520 to correspond to the screen size of the display apparatuses 101 to 103. In addition, the controller 110 of the master display apparatus 101 may increase or decrease the resolution of the original copy 521 of the content 520 to correspond to the screen resolution of the display apparatuses 101 to 103.

In response to increasing or decreasing the size of the original copy 521 of the content 520 to correspond to the screen sizes of the display apparatuses 101 to 103, the controller 110 of the master display apparatus 101 may display the original copy 521 of the content 520 in the screens of the display apparatuses 101 to 103 along with the blank spaces (e.g., screen areas between edges of the content 521 and the bezel (not shown). The blank spaces (not shown) may be displayed in a single color (e.g., chromatic color or achromatic color). In addition, the blank spaces (not shown) may be displayed in a single color or a plurality of colors having gradation.

In addition, in response to increasing or decreasing the resolution of the original copy 521 of the content 520 to correspond to the screen resolution of the display apparatuses 101 to 103, the controller 110 of the master display apparatus 101 may display the original copy 521 of the content 520 in the screens of the display apparatuses 101 to 103 along with the blank spaces (e.g., the screen areas between the edges of the content 520 and the bezel (not shown)).

The blank spaces (not shown) may be displayed in a single color (e.g., chromatic color or achromatic color). In addition, the blank spaces (not shown) may be displayed in a single color or a plurality of colors having gradation.

The content split screen 521D other than the content split screens 521A to 521C may not be displayed in the display apparatuses 101 to 103. In the original copy 521 of the content 520, the content split screen 521D may be changed to correspond to the contact point of the master display apparatus 101 and the slave display apparatuses 102 and 103.

The controller 110 of the master display apparatus 101 may store the generated content split screens 521A to 521C in the storage. In addition, the controller 110 of the master display apparatus 101 may store the content split screen 521D in the storage.

In addition, in response to the slave display apparatuses 102 and 103 gradually approaching the master display apparatus 101 (e.g., before the slave display apparatuses 102 and 103 and the master display apparatus 101 come into contact with each other), the controller 110 of the master display apparatus 101 may generate the content split screens by using the stored display apparatus information. In response to the slave display apparatuses 102 and 103 gradually approaching the master display apparatus 101 (e.g., before the slave display apparatuses 102 and 103 and the master display apparatus 101 come into contact with each other), the controller 110 of the master display apparatus 101 may generate the content split screens by using the GPU (not shown) and the display apparatus information.

According to another embodiment of the present disclosure, the electronic apparatus 200 may receive the contact point information corresponding to the contact of the slave display apparatuses 102 and 103 from the master display apparatus 101. In addition, the controller 110 of the display apparatuses 101 to 103 may transmit the contact point information to the electronic apparatus 200 through the communication unit 130 or the input/output unit 160.

According to another embodiment of the present disclosure, the controller 210 of the electronic apparatus 200 may generate the content split screens by using the received contact point information. In addition, the controller 210 of the electronic apparatus 200 may generate the content split screens by using the received contact point information and the display apparatus information. In addition, the controller 210 of the electronic apparatus 200 may generate the content split screens by using the GPU (not shown), the contact point information, and the display apparatus information. The storage 275 may store the content split screens according to the control of the controller 210 of the electronic apparatus 200.

According to another embodiment of the present disclosure, the operation of generating the content split screens in the electronic apparatus 200 is substantially the same as the operation of generating the content split screens in the master display apparatus 101, and thus, the overlapped description is omitted.

Referring to FIG. 4, the generated content split screens are transmitted to the slave display apparatuses at operation S460.

The controller 110 of the master display apparatus 101 may transmit the generated content split screens 521B, 521C to the slave display apparatuses 102 and 103 through the communication unit by using the stored display apparatus information. The controller 110 of the master display apparatus 101 may transmit the generated content split screens 521B, 521C to the slave display apparatuses 102 and 103 through the communication unit by using the stored display apparatus information and a priority (e.g., the controller 110 of the master display apparatus 101 may transmit the content split screens to the slave display apparatus 102 first).

In addition, the controller 110 of the master display apparatus 101 may stream the generated content split screens 521B, 521C to the slave display apparatuses 102 and 103 through the communication unit by using the stored display apparatus information.

In response to the generated content split screens 521B, 521C being transmitted from the master display apparatus 101 to the slave display apparatuses 102 and 103, a time delay (e.g., below 5 sec, it may vary) may occur between the operation of displaying the content split screen 521A in the master display apparatus 101 and the operation of displaying the content split screens 521B, 521C in the slave display apparatuses 102 and 103.

In addition, in response to the generated content split screens 521B, 521C being transmitted from the master display apparatus 101 to the slave display apparatuses 102 and 103, a time delay (e.g., below 5 sec, it may vary) may occur between the operation of transmitting the content split screen 521A in the master display apparatus 101 and the operation of transmitting the content split screens 521B, 521C in the slave display apparatuses 102 and 103.

Considering the time delay, the controller 110 of the master display apparatus 101 may control (e.g., including change) a start time of the operation of transmitting the content split screens 521B, 521C to the slave display apparatuses 102 and 103. In addition, considering the time delay, the controller 110 of the master display apparatus 101 may control (e.g., including change) a start time of the operation of displaying the content split screen 521A in the screen of the master display apparatus 101 and a start time of the operation of displaying the content split screens 521B, 521C in the screens of the slave display apparatuses 102 and 103.

The controller 110 of the master display apparatus 101 may control the time delay between the start time of the operation of displaying the content split screen 521A in the master display apparatus 101 and the start time of the operation of displaying the content split screens 521B, 521C in the slave display apparatuses 102 and 103 to be shorter than 500 ms (e.g., the controller 110 of the master display apparatus 101 may control the start time of the operation of transmitting the content split screens 521B, 521C in the slave display apparatuses).

The controller 110 of the master display apparatus 101 may transmit the content split screens to the slave display apparatuses 102 and 103 through the communication unit by using the stored display apparatus information and the priority (e.g., the controller 110 of the master display apparatus 101 may transmit the content split screens to the slave display apparatus 102 first).

According to another embodiment of the present disclosure, the controller 210 of the electronic apparatus 200 may transmit the stored content split screens to the display apparatuses 101 to 103, respectively.

According to another embodiment of the present disclosure, the operation of transmitting the content split screens to the display apparatus by the controller 210 of the electronic apparatus 200 is substantially the same as the operation of transmitting the content split screens from the master display apparatus 101 to the slave display apparatuses 102 and 103, and thus, the overlapped description is omitted.

Referring to FIG. 4, the content split screens are displayed in the slave display apparatuses at operation S470.

Referring to FIG. 5F, the content split screens 521B, 521C are transmitted from the master display apparatus 101 to the slave display apparatuses 102 and 103. The controller of the slave display apparatuses 102 and 103 may display the received content split screens 521B, 521C in the screens of the slave display apparatuses 102 and 103, respectively.

In case of a video content, the controller of the slave display apparatuses 102 and 103 may display the content split screens 521B, 521C in the screens of the slave display apparatuses 102 and 103 until the transmission is finished.

The controller 110 of the master display apparatus 101 may provide a user with a feedback corresponding to the operation of displaying the content split screen 521A and/or the operation of transmitting the content split screens 521B, 521C to the slave display apparatuses 102 and 103. The feedback provided by the master display apparatus 101 may be one of a visual feedback, an auditory feedback, and a tactile feedback. The controller 110 of the master display apparatus 101 may provide the user with one of the visual feedback, the auditory feedback, and the tactile feedback or a combination thereof, together with the slave display apparatuses 102 and 103.

The visual feedback refers to a visual effect corresponding to the operation of displaying the content split screen 521A and/or the operation of transmitting the content split screens 521B, 521C to the slave display apparatuses 102 and 103 (e.g., an image or an animation effect, such as a fade effect applied to the image). The visual feedback may be displayed to be distinguished from an object displayed in the screen. In addition, the visual feedback may be provided through a flickering operation of the LED bar so that the visual feedback is distinguished from the content split screens 521A to 521C.

The auditory feedback refers to a sound corresponding to the operation of displaying the content split screen 521A and/or the operation of transmitting the content split screens 521B, 521C to the slave display apparatuses 102 and 103. The auditory feedback may be outputted through the audio output unit 175. The tactile feedback is an operation corresponding to the operation of displaying the content split screen 521A and/or the operation of transmitting the content split screens 521B, 521C to the slave display apparatuses 102 and 103. The tactile feedback may be outputted through a vibration motor (not shown).

The feedback (e.g., at least one of the visual feedback, auditory feedback, and tactile feedback (not shown)) corresponding to the operation of displaying the content split screen 521A and/or the operation of transmitting the content split screens 521B, 521C to the slave display apparatuses 102 and 103 may be selected and/or changed in the setting 500 of the master display apparatus 101.

The user is able to input and/or change a feedback providing time where at least one feedback is provided (e.g., 300 msec, it may vary).

According to another embodiment of the present disclosure, each controller 110 of the display apparatuses 101 to 103 may display the content spit screens received from the electronic apparatus 200, respectively. The storage 180 of the display apparatuses 101 to 103 may store the updated content split screens according to the control of the controller 110.

According to another embodiment of the present disclosure, the operation of displaying the received content split screens in the display apparatuses 101 to 103 is substantially the same as the operation of displaying the content split screens in the master display apparatus 101 and the operation of displaying the received content split screens in the slave display apparatuses 102 and 103, and thus, the overlapped description is omitted.

Referring to FIG. 4, a movement of the slave display apparatuses is detected at operation S480.

Referring to FIG. 5F, in response to the master display apparatus 101 and the slave display apparatuses 102 and 103 coming contact with each other, the slave display apparatuses 102 and 103 may move along the side surface of the master display apparatus 101 (e.g., a height change). In addition, in response to the master display apparatus 101 and the slave display apparatuses 102 and 103 coming contact with each other, the slave display apparatuses 102 and 103 may move along the side surface of the master display apparatus 101 (e.g., a height change) by the user.

The controller 110 of the master display apparatus 110 may detect the movement of the slave display apparatuses 102 and 103 by using the bezel touch sensor 166 and/or the distance measuring sensor 167. In response to the movement of the slave display apparatuses 102 and 103 being continued, the controller 110 of the master display apparatus 101 may detect consecutive movements of the slave display apparatuses 102 and 103 by using the bezel touch sensor 166 and/or the distance measuring sensor 167.

The controller 110 of the master display apparatus 110 may detect a movement end point of the slave display apparatuses 102 and 103 by using the bezel touch sensor 166 and/or the distance measuring sensor 167.

The controller 110 of the master display apparatus 110 may store movement information corresponding to the movement of the slave display apparatuses 102 and 103 which come into contact. The movement information may include the ID for history management, the ID of one or the plurality of distance measuring sensors 167 which detect an approach of the slave display apparatus, the approach detecting time, the approach detecting voltage (or current), and the like.

The slave display apparatus (e.g., the slave display apparatus 102) which approaches and moves along a certain side of the master display apparatus 101) may be detected by the plurality of bezel touch sensors 166 or the plurality of distance measuring sensors 167 which are located in the certain side of the master display apparatus 101. In addition, the slave display apparatuses (e.g., the slave display apparatuses 102 and 103) which approach and move along both sides of the master display apparatus 101 may be detected by the plurality of bezel touch sensors 166 or the plurality of distance measuring sensors 167 which are located in the both sides of the master display apparatus 101. The approach information may be updated in response to a contact movement of the master display apparatus 101 and the slave display apparatuses 102 and 103. In addition, in response to the movement of the slave display apparatuses 102 and 103 which move by coming into contact with the master display apparatus 101 being finished, the update operation of the approach information may be finished.

The controller 110 of the master display apparatus 101 may calculate a moving distance of the slave display apparatuses 102 and 103 (e.g., a movement start point, a movement end point, or a moving distance). In addition, the controller 110 of the master display apparatus 101 may store the calculated movement start point, movement end point, and moving distance in the storage. The calculated moving distance (e.g., a calculated movement start point, a movement end point, or a moving distance) may be included in the movement information. The storage 180 may store the movement information including the calculated moving distance (e.g., a movement start point, a movement end point, or a moving distance) according to the control of the controller 110 of the master display apparatus 101.

In response to the master display apparatus 101 and the slave display apparatuses 102 and 103 coming contact with each other, the master display apparatus 101 may be moved by the user (e.g., the master display apparatus 101 may be moved to the left or to the right.) As the master display apparatus 101 is moved, the slave display apparatuses 102 and 103 may be moved correspondingly (e.g., a contact point may be maintained).

At operation S480 in FIG. 4, the operation of detecting the movement of the slave display apparatuses 102 and 103 is substantially the same as the operation of detecting the approach of the slave display apparatuses 102 and 103 at operations S430 and S440 in FIG. 4 (e.g., the operation of detecting an approach and the operation of detecting a movement), and thus, the overlapped description is omitted.

According to another embodiment of the present disclosure, the electronic apparatus 200 may receive a movement of the slave display apparatuses 102 and 103 which come into contact with the master display apparatus 101.

The controller 110 of the master display apparatus 101 may transmit the movement information (e.g., first movement information) corresponding to the movement of the slave display apparatuses 102 and 103 which come into contact with the master display apparatus 101 detected by the distance measuring sensor 167 or the bezel touch sensor 166 to the electronic apparatus 200 through the communication unit 130 and/or the input/output unit 160.

The controller 110 of the slave display apparatus 102 may transmit the movement information (e.g., second movement information) corresponding to the movement with respect to the master display apparatus 101 detected by the distance measuring sensor 167 or the bezel touch sensor 166 to the electronic apparatus 200 through the communication unit 130 and/or the input/output unit 160. In addition, the controller 110 of the slave display apparatus 103 may transmit the movement information (e.g., third movement information) corresponding to the movement with respect to the master display apparatus 101 detected by the distance measuring sensor 167 or the bezel touch sensor 166 to the electronic apparatus 200 through the communication unit 130 and/or the input/output unit 160.

According to another embodiment of the present disclosure, the operation of receiving the movement information corresponding to the movement of the display apparatus in the electronic apparatus 200 is substantially the same as the operation of calculating the movement information on the slave display apparatuses 102 and 103 which move by coming contact with the master display apparatus 101, and thus, the overlapped description is omitted.

Referring to FIG. 4, the operation S480 proceeds to a next operation S490 in response to the movement of the slave display apparatuses 102 and 103. In response to the slave display apparatuses 102 and 103 not being moved at operation S480, the method for displaying as screen of the display apparatus ends.

At operation S490 in FIG. 4, the content split screens are updated and displayed in response to the movement of the slave display apparatuses.

Figure 5H:
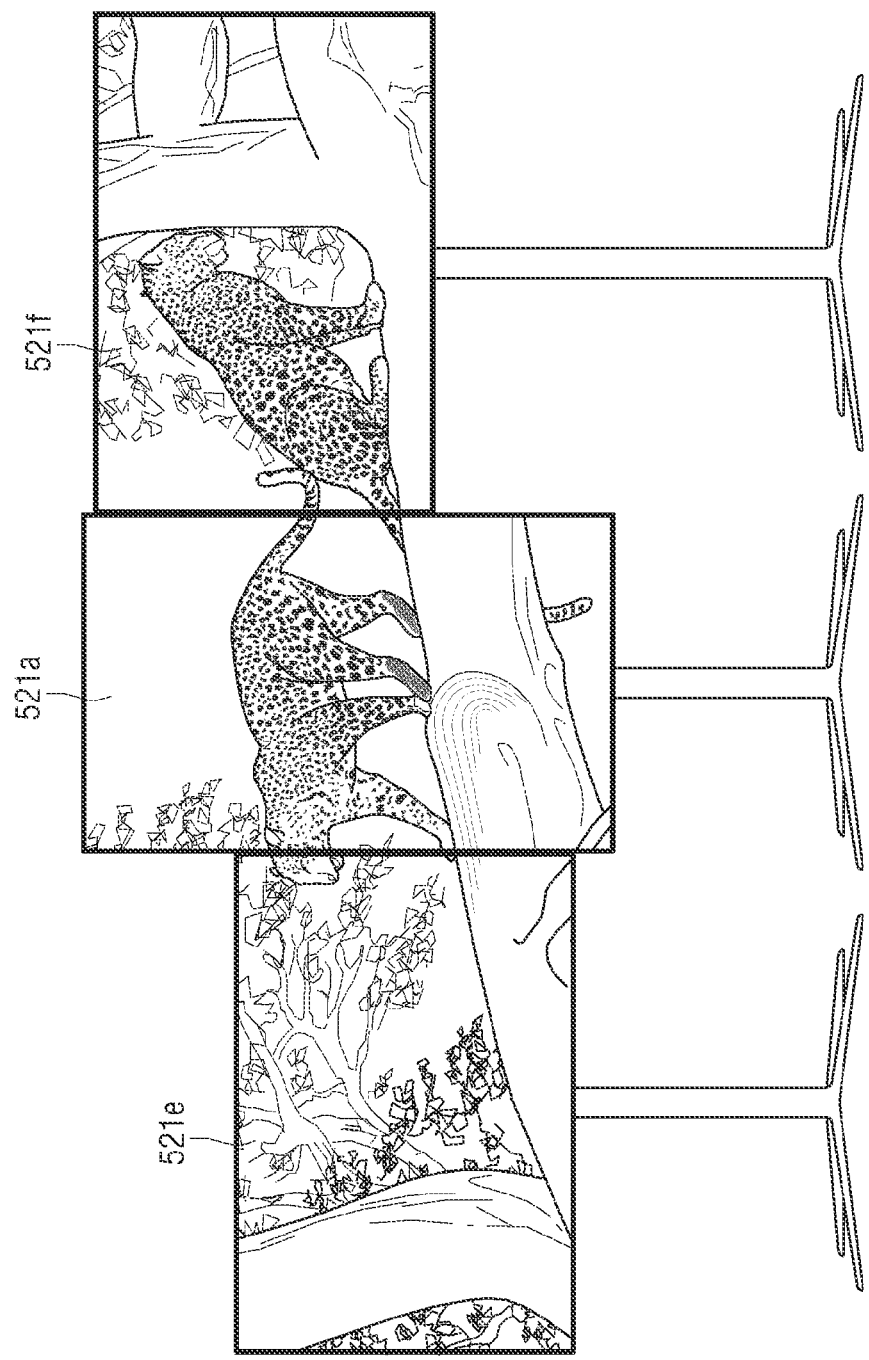
Figure 5J:
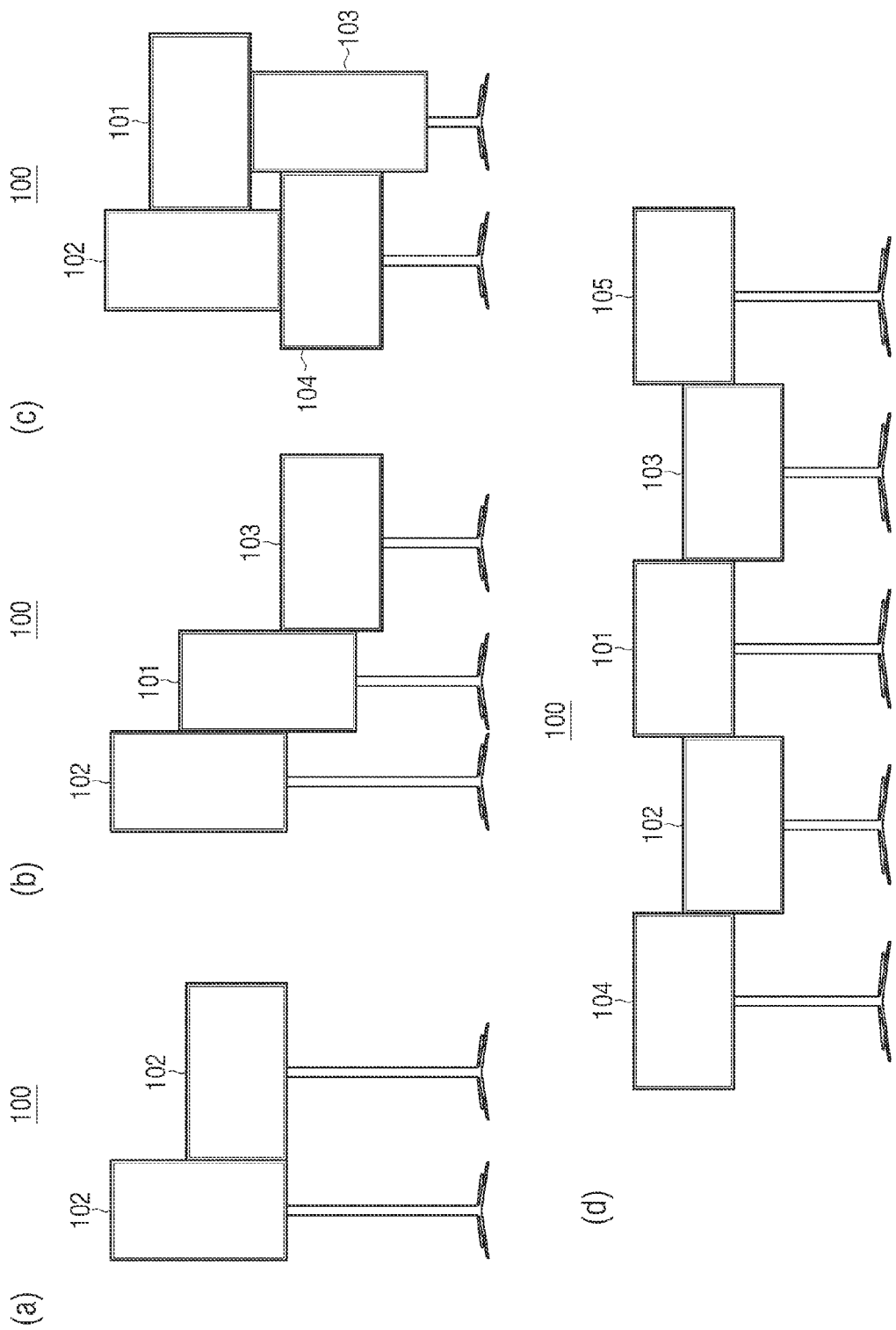

Referring to FIGS. 5G and 5H, the controller 110 of the master display apparatus 101 may update the content split screens in response to the movement of the slave display apparatuses 102 and 103. At operation S490 in FIG. 4, the updated content split screens 521A, 521E, 521F are different from the content split screens 521A, 521B, 521C generated at operation S450 in FIG. 4. In response to the master display apparatus 101 being fixed, the content split screen 521A may be maintained, and the other content split screens 521E, 521F may be updated.

The content split screen 521G other than the updated content split screens 521A, 521E, 521F may not be displayed in the display apparatuses 101 to 103.

At operation S490 in FIG. 4, the operation of updating the content split screens in response to the movement of the slave display apparatuses 102 and 103 is substantially the same as the operation of generating the content split screens in response to the contact of the slave display apparatus at operation S450 in FIG. 4, and thus, the overlapped description is omitted.

The controller 110 of the master display apparatus 101 may transmit the generated content split screens 521E, 521F to the slave display apparatuses 102 and 103 through the communication unit by using the stored display apparatus information.

At operation S490 in FIG. 4, the operation of transmitting the updated content split screens in response to the movement of the slave display apparatuses 102 and 103 is substantially the same as the operation of transmitting the generated content split screens in response to the contact of the slave display apparatuses 102 and 103 at operation S460 in FIG. 4, and thus, the overlapped description is omitted.

The updated content split screens 521E, 521F are transmitted from the master display apparatus 101 to the slave display apparatuses 102 and 103. Each controller of the slave display apparatuses 102 and 103 may display the updated content split screens 521E, 521F in the screens.

In case of a video content, the controller of the slave display apparatuses 102 and 103 may display the updated content split screens 521E, 521F in the screens of the slave display apparatuses 102 and 103 until the transmission of the updated content split screens 521E, 521F is finished.

At operation S490 in FIG. 4, the operation of providing a user with a feedback corresponding the operation of displaying the updated content split screen 521A and/or the operation of transmitting the updated content split screens 521E, 521F to the slave display apparatuses 102 and 103 is substantially the same as the operation of displaying the content split screen 521A and/or the operation of transmitting the content split screens 521B, 521C to the slave display apparatuses 102 and 103 at operation S470 in FIG. 4, and thus, the overlapped description is omitted.

According to another embodiment of the present disclosure, the controller 210 of the electronic apparatus 200 may update the content split screens (not shown) by using the received movement information. The storage 275 may store the updated content split screens according to the control of the controller 210 of the electronic apparatus 200. In addition, the controller 210 of the electronic apparatus 200 may transmit the updated content split screens to the display apparatuses 101 to 103, respectively, by using the communication unit 230 or the input/output unit 240.

Each controller 110 of the display apparatuses 101 to 103 may display the updated content split screens being received. The storage 180 of the display apparatuses 101 to 103 may store the updated content split screens according to the control of the controller 110.

According to another embodiment of the present disclosure, the operation of updating the content split screens in the electronic apparatus 200 is substantially the same as the operation of updating the content split screens in the master display apparatus 101, and thus, the overlapped description is omitted.

At operation S490 in FIG. 4, in response to the updated content split screen 521A being displayed or in response to the updated content split screens 521E, 521F being transmitted, the method for displaying a screen of the display apparatus ends.

Hereinafter, a method for displaying a screen of the display apparatus according to the second embodiment of the present disclosure will be described with reference to FIGS. 6 and 7.

FIG. 6 is a flowchart illustrating a method for displaying a screen of a display apparatus according to an embodiment of the present disclosure.

FIGS. 7A, 7B, 7C, 7D, 7E, 7F, and 7G are diagrams illustrating a method for displaying a screen of a display apparatus according to various embodiments of the present disclosure.

Referring to FIG. 6, at operation S610, a timeline view is set up.

Figure 7A:
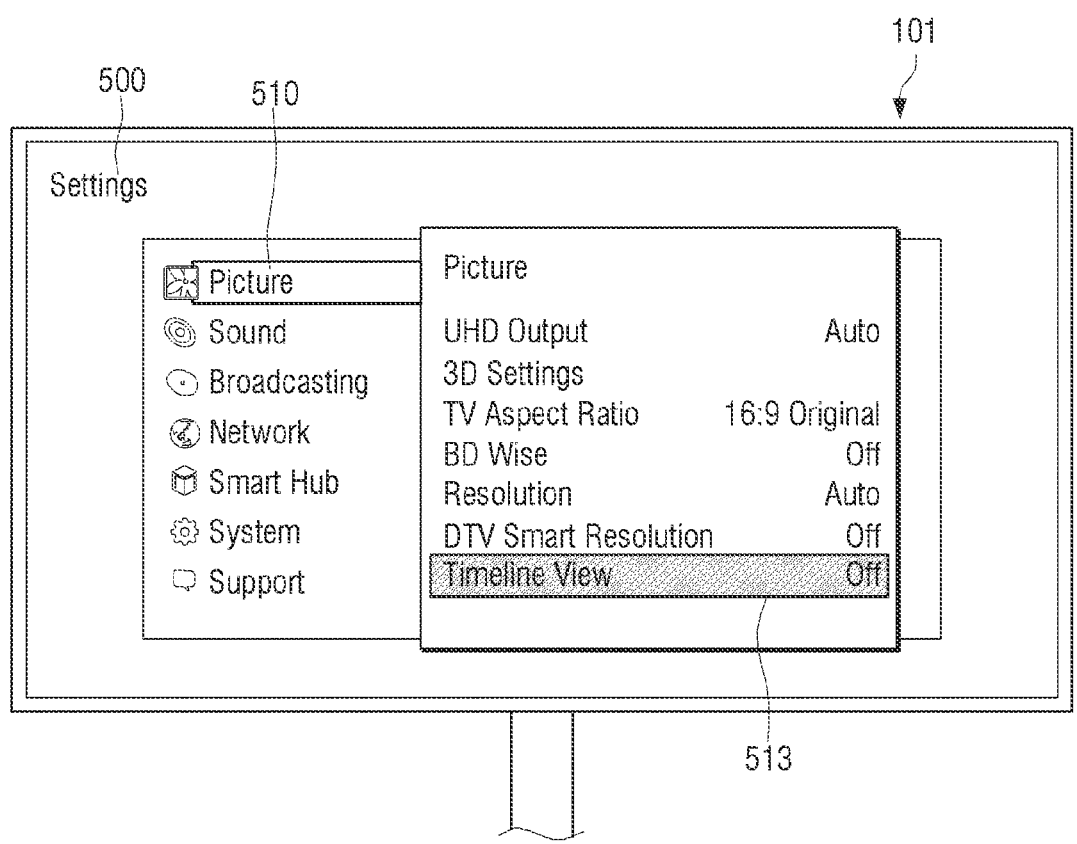
FIGS. 7A, 7B, 7C, 7D, 7E, 7F, and 7G are diagrams illustrating a method for displaying a screen of a display apparatus according to various embodiments of the present disclosure.
Figure 7B:
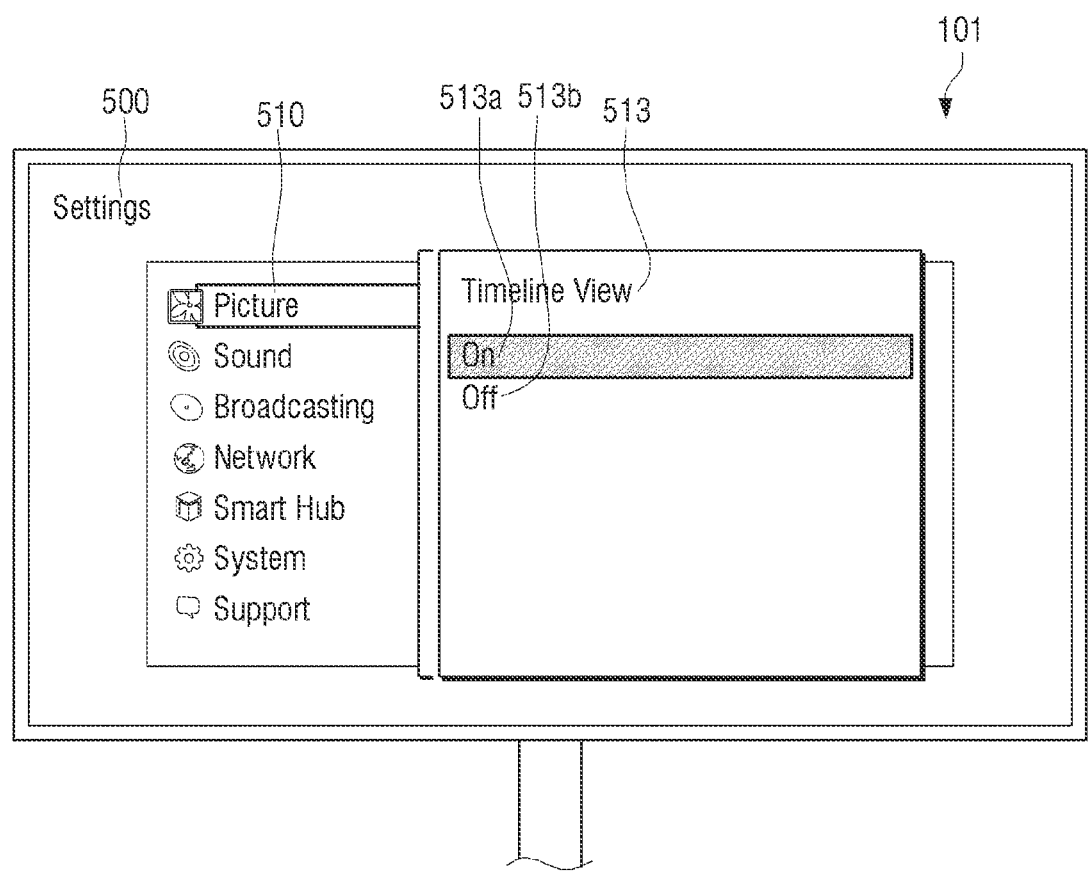
Figure 7C:
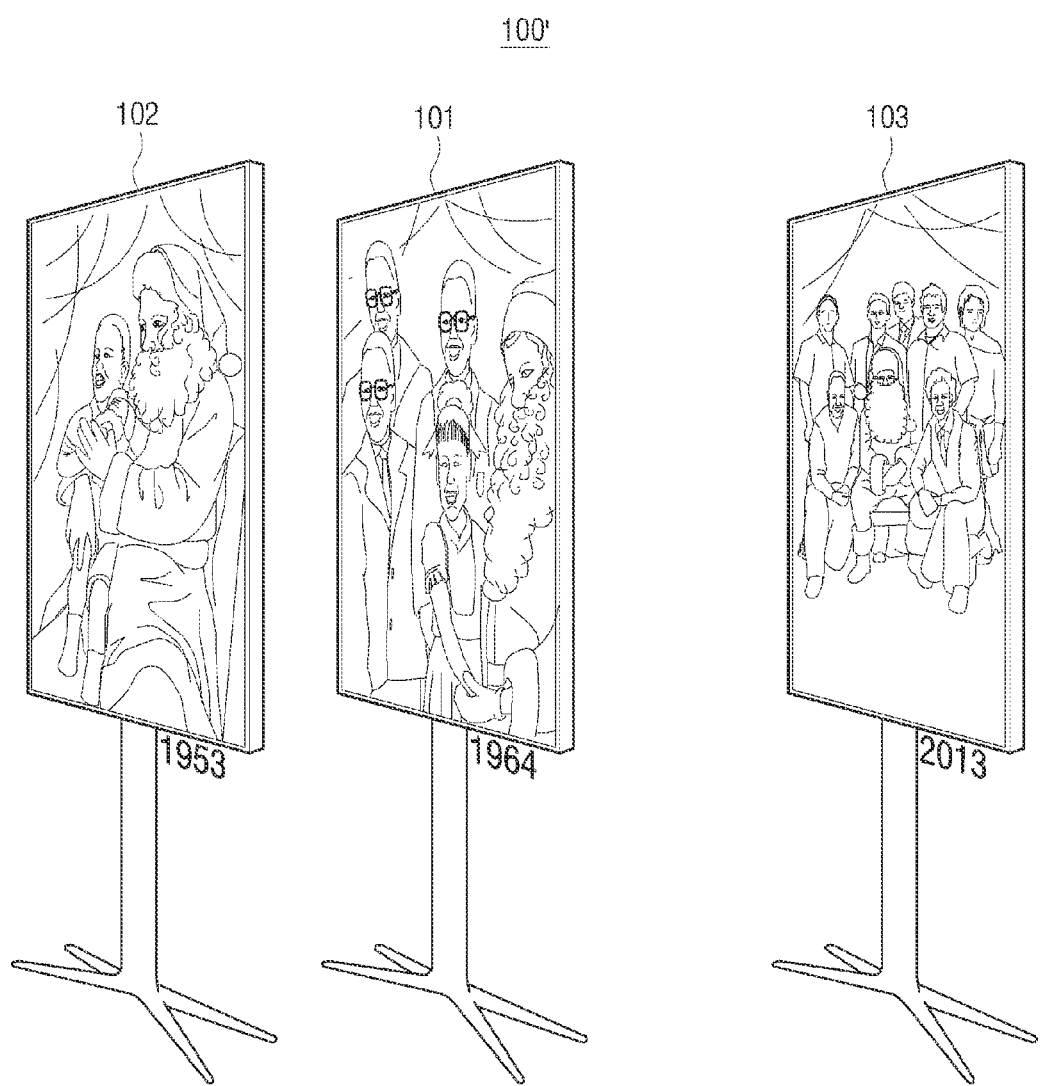

Referring to FIGS. 7A and 7B, a user is able to set up a timeline view in the setting 500 of the display apparatus 100'. The timeline view may display the contents (e.g., an image or a video) displayed in the display apparatuses 101 to 103 in a chronological order to correspond to a distance of the display apparatuses 101 to 103.

The user is able to change the setting 500 of the display apparatus 100' by using the remote controller (not shown) or the panel key (not shown) located on the rear surface of the display apparatus 100'. In response to the remote controller (not shown) or the menu key (not shown) of the display apparatus 100' being selected by the user, the controller of the display apparatus 100' may display the setting 500 in the screen.

In addition, the user is able to select a timeline view 513 from the picture 510 of the setting 500 by using the remote controller (not shown) or the panel key (not shown).

In response to the timeline view 513 being selected, the controller 110 of the display apparatus 100' may display a pop-up window for a specific setting operation of the timeline view. In the displayed pop-up window, the timeline view 513 may include a timeline view ON 513A and a timeline view OFF 513B.

The controller 110 of the display apparatus 100' may receive a selection of one of 'ON' and 'OFF' with respect to the timeline view 513 in response to a user input.

In response to the timeline view ON 513A being selected, the display apparatuses 101 to 103 may display the contents (e.g., an image or a video) in the screen of the display apparatus 100' as a timeline view in response to the distance of the display apparatuses detected by the distance measuring sensor 167.

In response to a return/exit button (not shown) being selected by the user from the remote controller (not shown) or the panel key (not shown), the controller 110 of the display apparatus 100' may finish the setting operation with respect to the timeline view 513 in the setting 500. The user is able to set up or finish the timeline view 513 in the setting 500 of the display apparatus 100'.

The controller 110 of the display apparatus 100' may store a result of the setting with respect to the timeline view 513 in the storage.

According to another embodiment of the present disclosure, the user is able to set up the timeline view through the setting (e.g., a setting displayed in an application (not shown) for controlling the display apparatus 100') in the display 260 of the electronic apparatus 200. In addition, the user is able to execute a shortcut icon (not shown) corresponding to an application (not shown) displayed in the display 260 of the electronic apparatus 200. In addition, the user is able to execute the dedicated software (not shown) for controlling the display apparatus 100' displayed in the display 260 of the electronic apparatus 200.

The user is able to change the setting (e.g., an on/off status of the timeline view) of the display apparatus 100' through the setting of the executed application (or the dedicated software).

In addition, the user is able to select the multi-vision output (not shown) in the setting (not shown) by using a voice, a motion, a keyboard (not shown), a mouse (not shown), or other input units (e.g., a stylus (not shown)).

According to another embodiment of the present disclosure, the setting through an application is substantially the same as the setting 500 through the display apparatus 100', and thus, the overlapped description is omitted.

At operation S620 in FIG. 6, the contents are displayed in the respective display apparatuses as a timeline view.

Referring to FIG. 6C, the display apparatuses 101 to 103 are spaced from each other. The controller 110 of the display apparatuses 101 to 103 which are spaced from each other may display the contents (e.g., an image or a video) as the timeline view. In addition, the controller 110 of the display apparatuses 101 to 103 which are spaced from each other may display the contents (e.g., an image or a video) as the timeline view in response to a user input. The timeline view may be displayed through two, three, four, or five or more display apparatuses. In addition, a location of one of a plurality of display apparatuses being fixed, the other display apparatuses than the fixed display apparatus may display the timeline view.

In case of image content, image files may be stored in the storage 275 of the external electronic apparatus 200 in a chronological order (e.g., photographed time or stored time). In addition, the image files may be stored in the storage 180 of the display apparatuses 101 to 103 in a chronological order (e.g., photographed time or stored time). For example, when the user takes a family picture every December since 1953, sixty one (61) or more stored image files may exist (e.g., a plurality of pictures may be taken in one year).

In response to a distance between a display apparatus that is a reference object of the timeline view (e.g., the slave display apparatus 102 which is located in the foremost place from among a plurality of display apparatuses) and the slave display apparatus 103 being 5 m, the master display apparatus 101 located between the slave display apparatus 102 and the slave display apparatus 103 may move a space between the slave display apparatus 102 and the slave display apparatus 103.

In response to a distance between the slave display apparatus 102 and the slave display apparatus 103 being 5 m, the master display apparatus 101 may display twelve (12) images while the master display apparatus 101 moves 1 m. For example, in response to the slave display apparatus 102 displaying an image of 1953 that is a start year of the photographing period and the slave display apparatus 103 displaying an image of 2013 that is the last year of the photographing period, the master display apparatus 101 which is disposed on a ⅕ position from the slave display apparatus 102 which is located in the foremost place may display an image of 1964 from among the entire image files.

The distance between the slave display apparatus 102 and the slave display apparatus 103 may be determined by the distance measuring sensor 167 or a user input (e.g., a manual input). In addition, the controller 110 of the master display apparatus 101 may calculate a distance between the slave display apparatus 102 located in the foremost place and the master display apparatus 101 by using the distance measuring sensor 167. In addition, the controller 110 of the master display apparatus 101 may calculate a distance between the master display apparatus 101 and the slave display apparatus 103 by using the distance measuring sensor 167.

In case of video content, video files may be stored in the storage 275 of the external electronic apparatus 200 in a chronological order (e.g., photographed time or stored time). In addition, the video files may be stored in the storage 180 of the display apparatuses 101 to 103 in a chronological order (e.g., photographed time or stored time). For example, when the user takes a family video every May since 2000, fourteen (14) or more video files may exist (e.g., a plurality of videos may be taken in one year). In response to a distance between a display apparatus that is the reference object of the timeline view (e.g., the slave display apparatus 102 which is located in the foremost place from among a plurality of display apparatuses) and the slave display apparatus 103 being 5 m, the master display apparatus 101 located between the slave display apparatus 102 and the slave display apparatus 103 may move a space between the slave display apparatus 102 and the slave display apparatus 103.

In response to a distance between the slave display apparatus 102 and the slave display apparatus 103 being 5 m, the master display apparatus 101 may display two (2) videos while the master display apparatus 101 moves 1 m. For example, in response to the slave display apparatus 102 displaying a video of 2000 that is a start year of the photographing period and the slave display apparatus 103 displaying an image of 2013 that is the last year of the photographing period, the master display apparatus 101 which is disposed on a ⅕ position from the slave display apparatus 102 may display an image of 2002 from among the entire video files.

In the case of video content, the timeline view of the video files is substantially the same as the timeline view of the image files in the case of image content, and thus, the overlapped description is omitted.

According to another embodiment of the present disclosure, the display apparatuses 101 to 103 may display the contents corresponding to the timeline view received from the electronic apparatus 200. The electronic apparatus 200 may transmit the contents corresponding to the timeline view to the display apparatuses 101 to 103, respectively. For example, the controller 210 of the electronic apparatus 200 may transmit an image of 1953 that is the start year of the photographing period to the slave display apparatus 102 located in the foremost place.

In addition, the controller 210 of the electronic apparatus 200 may transmit an image of 2013 that is the last year of the photographing period to the slave display apparatus 103. In addition, the controller 210 of the electronic apparatus 200 may transmit an image of 1964 corresponding to the ⅕ position to the master display apparatus 101 which is located on the ⅕ position from the slave display apparatus 102 located in the foremost place.

In addition, the controller 210 of the electronic apparatus 200 may receive distance information on the space of the display apparatuses 101 to 103 by using the distance measuring sensor 167 of the display apparatuses 101 to 103. The distance information received from the display apparatuses 101 to 103 may be a detection signal (e.g., an analog signal) of each distance measuring sensor 167 or a distance value (e.g., a digital signal) processed in the display apparatuses 101 to 103. The controller 210 of the electronic apparatus 200 may transmit the contents corresponding to the timeline view that is an object to be transmitted to the display apparatuses 101 to 103 by using the distance information.

The contents corresponding to the timeline view may be stored in the storage 275 of the electronic apparatus 200 or may be received from outside of the electronic apparatus 200.

According to another embodiment of the present disclosure, the operation of displaying the contents corresponding to the timeline view received from the electronic apparatus 200 in the display apparatuses 101 to 103 is substantially the same as the operation of displaying the contents corresponding to the timeline view in the display apparatuses 101 to 103, and thus, the overlapped description is omitted.

At operation S630 in FIG. 6, a movement of a display apparatus is detected.

Figure 7D:
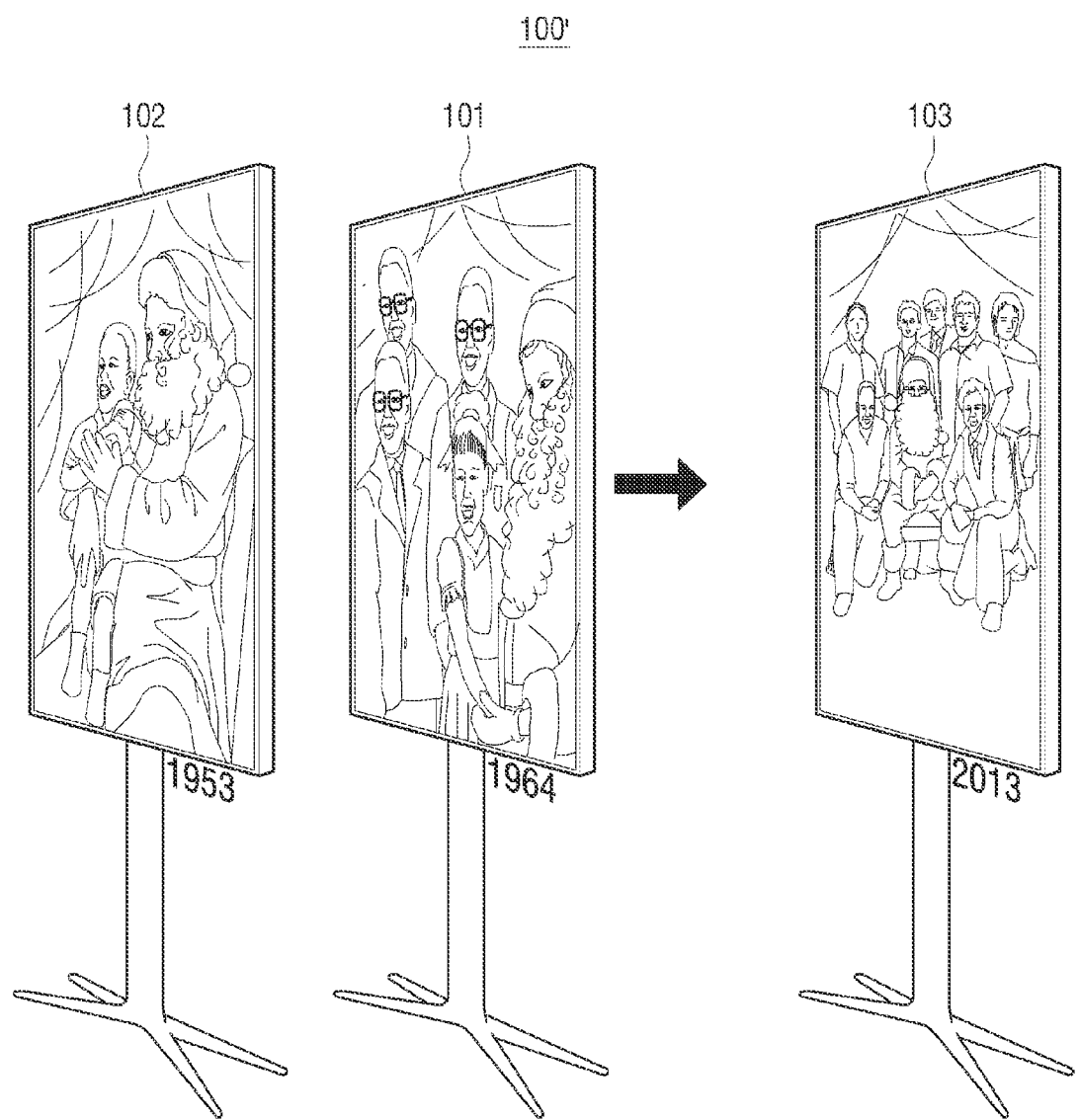

Referring to FIGS. 7D and 3C, a movement of the master display apparatus 101 which is located between the slave display apparatus 102 and the slave display apparatus 103 is detected. The master display apparatus 101 may be manually moved in one of a direction of the slave display apparatus 102 and a direction of the slave display apparatus 103. In addition, the master display apparatus 101 may be manually moved in one of the direction of the slave display apparatus 102 and the direction of the slave display apparatus 103 by the user.

The controller 110 of the master display apparatus 101 may detect a movement in one of the direction of the slave display apparatus 102 and the direction of the slave display apparatus 103 by using the distance measuring sensors 167, 167' respectively being located on the front surface and the rear surface of the bezel. For example, the controller 110 of the master display apparatus 101 may determine whether the master display apparatus 101 approaches the slave display apparatus 103 by using a difference in an output detected by the distance measuring sensor 167' on the rear surface of the bezel. In addition, the controller 110 of the master display apparatus 101 may determine whether the master display apparatus 101 recesses from the slave display apparatus 103 by using a difference in an output detected by the distance measuring sensor 167 on the front surface of the bezel. The controller 110 of the master display apparatus 101 may detect the movement to the slave display apparatus 103 according to a measurement range of the distance measuring sensors 167, 167'.

The controller 110 of the master display apparatus 101 may output a feedback corresponding to the detection of the moving slave display apparatus 103. The controller 110 of the master display apparatus 101 may let the LED bar 168 flicker in response to the detection of the movement to the slave display apparatus 103. The controller 110 of the master display apparatus 101 may let the LED bar 168 flicker for a certain setting time (e.g., 300 ms, it may change depending upon the setting). In addition, in response to the movement of the master display apparatus 101 being finished, the controller 110 of the master display apparatus 101 may finish the flickering operation of the LED bar 168.

Figure 7E:
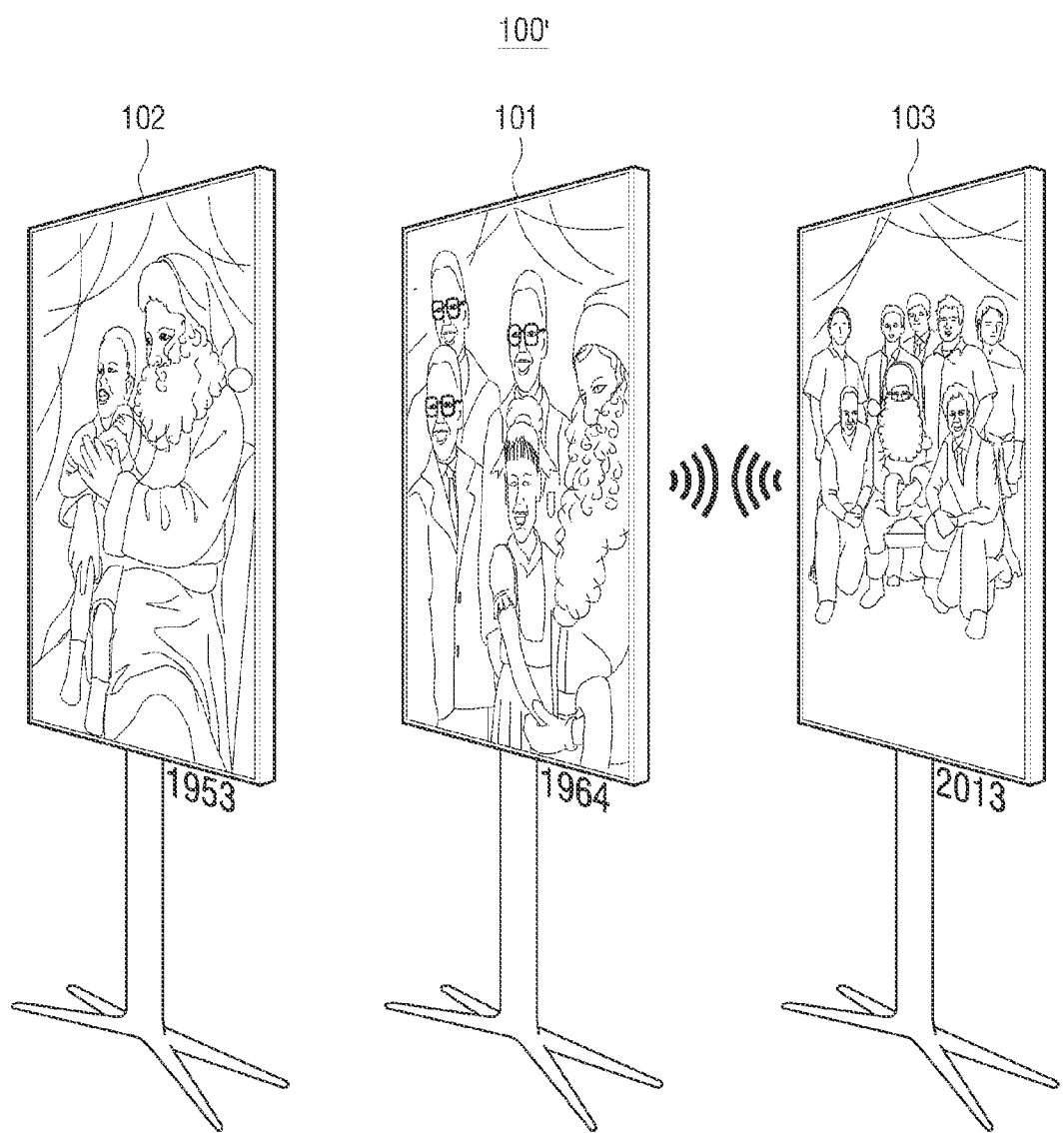
Figure 7F:
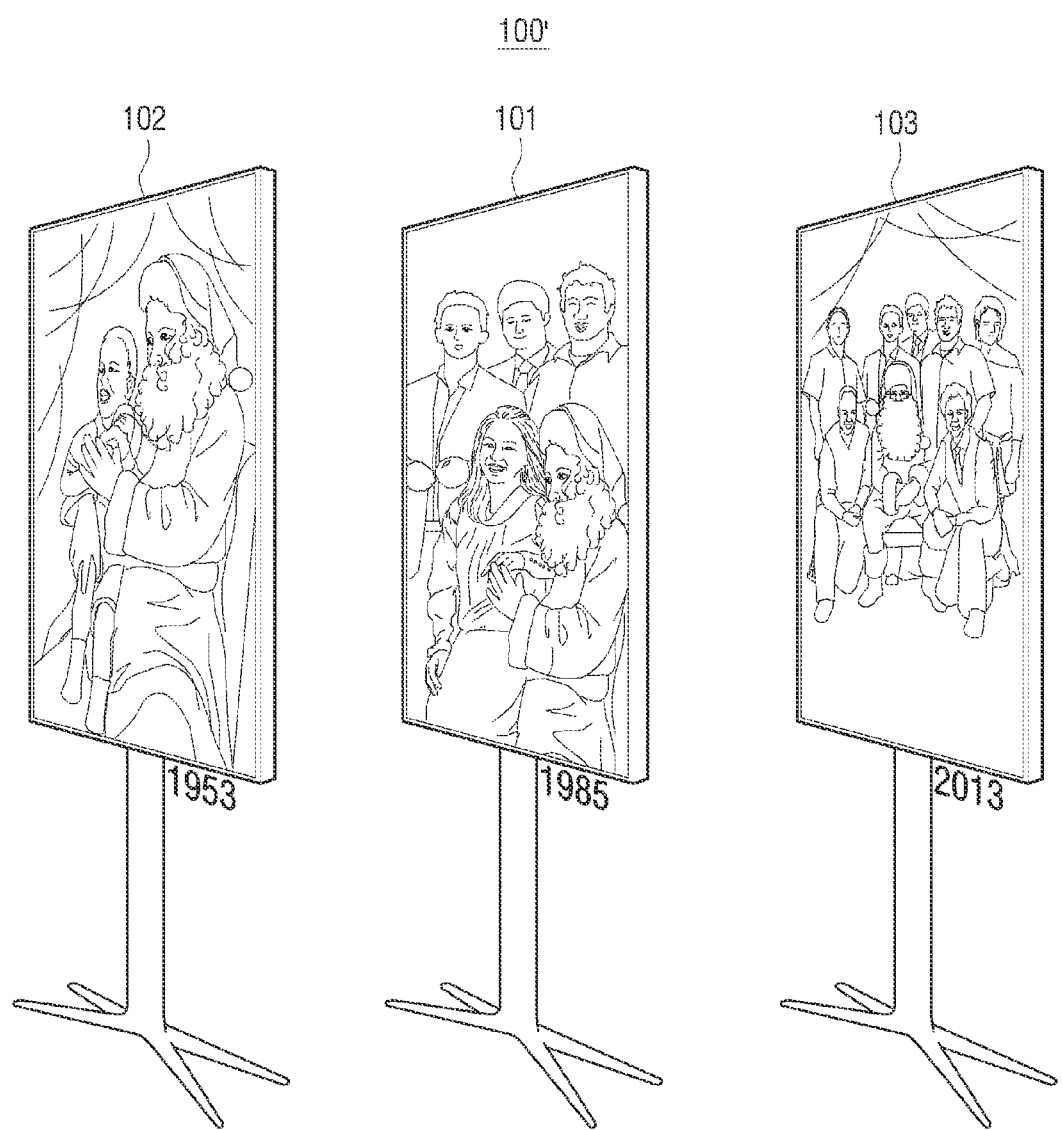
Figure 7G:
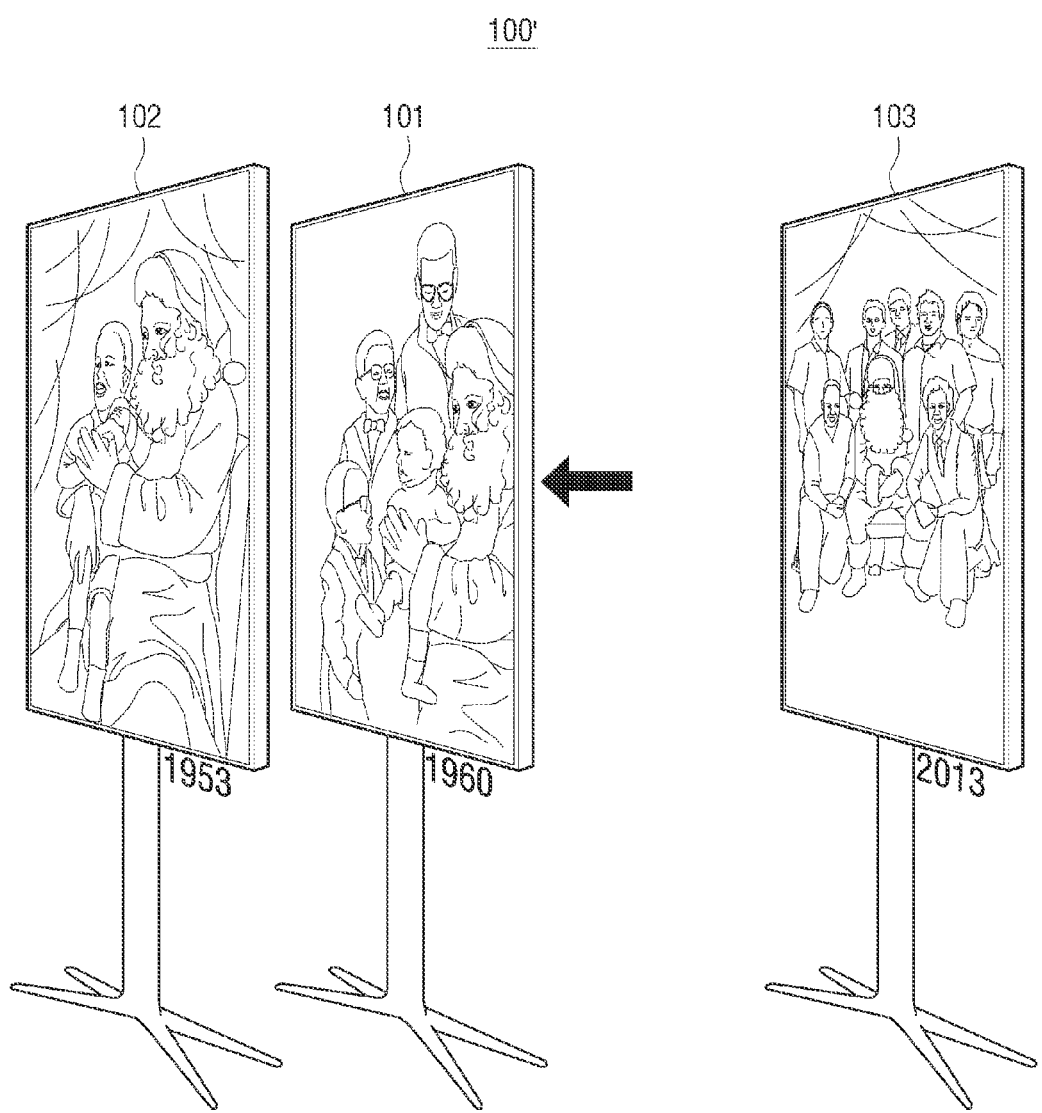

Referring to FIG. 7G, the controller 110 of the master display apparatus 101 may detect a movement of the master display apparatus 101 in the direction of the slave display apparatus 102 that is an opposite direction, as compared with the direction on FIG. 7D.

Referring to FIG. 7G, the operation of detecting the movement of the master display apparatus 101 in the direction of the slave display apparatus 102 is substantially the same as the operation of detecting the movement of the master display apparatus 101 in the direction of the slave display apparatus 103 in FIG. 7D (e.g., opposite moving directions), and thus, the overlapped description is omitted.

According to another embodiment of the present disclosure, the electronic apparatus 200 may receive the movement of the master display apparatus 101. The controller 110 of the master display apparatus 101 may transmit the movement information (e.g., eleventh movement information) corresponding to the movement of the master display apparatus 101 detected through the distance measuring sensors 167, 167' to the electronic apparatus 200 by using the communication unit 130 or the input/output unit 160. The controller 110 of the slave display apparatus 102 may transmit the movement information (e.g., twelfth movement information) corresponding to the movement of the master display apparatus 101 detected through the distance measuring sensors 167, 167' to the electronic apparatus 200 by using the communication unit 130 or the input/output unit 160. In addition, the controller 110 of the slave display apparatus 103 may transmit the movement information (e.g., thirteenth movement information) corresponding to the movement of the master display apparatus 101 detected through the distance measuring sensors 167, 167' to the electronic apparatus 200 by using the communication unit 130 or the input/output unit 160.

The controller 110 of the master display apparatus 101 may transmit the movement information (e.g., eleventh' movement information) corresponding to the movement of the master display apparatus 101 detected through an acceleration sensor (not shown) or a gyro sensor (not shown) to the electronic apparatus 200 by using the communication unit 130 or the input/output unit 160.

The controller 210 of the electronic apparatus 200 may receive the received movement information (e.g., the eleventh movement information, the eleventh' movement information, the twelfth movement information, or the thirteenth movement information). The storage 275 may store the received movement information (e.g., the eleventh movement information, the eleventh' movement information, the twelfth movement information, or the thirteenth movement information) according to the control of the controller 210.

According to another embodiment of the present disclosure, the operation of receiving the movement information in the electronic apparatus 200 is substantially the same as the operation of detecting the movement of the master display apparatus 101 in the display apparatuses 101 to 103, and thus, the overlapped description is omitted.

At operation S640 in FIG. 6, a distance between the slave display apparatuses is measured.

Referring to FIG. 7E, in response to the movement of the master display apparatus 101, the controller 110 of the master display apparatus 101 may measure a distance between the master display apparatus 101 and the slave display apparatus 103 by using the distance measuring sensor 167' on the rear surface of the bezel. In addition, in response to the movement of the master display apparatus 101, the controller 110 of the master display apparatus 101 may measure a distance between the master display apparatus 101 and the slave display apparatus 102 by using the distance measuring sensor 167 on the front surface of the bezel.

The controller 110 of the master display apparatus 101 may calculate the distance between the master display apparatus 101 and the slave display apparatus 103 by using the distance measuring sensor 167'. In addition, the controller 110 of the master display apparatus 101 may calculate the distance between the master display apparatus 101 and the slave display apparatus 102 by using the distance measuring sensor 167.

The controller 110 of the master display apparatus 101 may store the distance information (e.g., first distance information) corresponding to the movement of the master display apparatus 101 in the storage 180. In addition, the controller 110 of the slave display apparatus 102 may store the distance information (e.g., second distance information) corresponding to the movement of the master display apparatus 101 in the storage 180. The controller 110 of the slave display apparatus 103 may store the distance information (e.g., third distance information) corresponding to the movement of the master display apparatus 101 in the storage 180.

The stored distance information may include the ID for history management, the ID of one or a plurality of distance measuring sensors 167 which detect a distance of the slave display apparatuses, a movement detecting time, a movement detecting voltage (or current), and the like. The distance information may be updated in response to a change of a distance (e.g., decrease or increase) between the master display apparatus 101 and the slave display apparatuses 102 and 103. In addition, in response to the movement of the master display apparatus 101 being finished, the update operation of the distance information may be finished.

For example, the movement of the master display apparatus 101 may be finished on a ½ position between the slave display apparatus 102 and the slave display apparatus 103.

According to another embodiment of the present disclosure, the electronic apparatus 200 may receive a distance between the master display apparatus 101 and the slave display apparatuses 102 and 103. In addition, the electronic apparatus 200 may receive the distance between the master display apparatus 101 and the slave display apparatuses 102 and 103 from the display apparatuses 101, 102 and 103.

The controller 110 of the master display apparatus 101 may transmit the distance information (e.g., eleventh distance information) corresponding to the movement of the master display apparatus 101 to the electronic apparatus 200 by using the communication unit 130 or the input/output unit 160. The controller 110 of the slave display apparatus 102 may transmit the distance information (e.g., twelfth distance information) corresponding to the movement of the master display apparatus 101 to the electronic apparatus 200 by using the communication unit 130 or the input/output unit 160. In addition, the controller 110 of the slave display apparatus 103 may transmit the distance information (e.g., thirteenth distance information) corresponding to the movement of the master display apparatus 101 to the electronic apparatus 200 by using the communication unit 130 or the input/output unit 160.

The controller 110 of the display apparatuses 101 to 103 may periodically transmit the updated distance information to the electronic apparatus 200 by using the communication unit 130 or the input/output unit 160. In addition, in response to the movement of the master display apparatus 101 being finished, the controller 110 of the display apparatuses 101 to 103 may finish the transmission of the distance information by using the communication unit 130 or the input/output unit 160.

According to another embodiment of the present disclosure, the operation of receiving the distance information in the electronic apparatus 200 is substantially the same as the operation of detecting a distance corresponding to the movement of the master display apparatus 101 in the display apparatuses 101 to 103, and thus, the overlapped description is omitted.

At operation S650 in FIG. 6, the different contents are displayed in the display apparatuses to correspond to a distance.

Referring to FIG. 7F, in response to the distance between the master display apparatus 101 and the slave display apparatus 103, the controller 110 of the master display apparatus 101 may change a displayed image of 1964 to another image (e.g., image of 1985).

In response to consecutive movements of the master display apparatus 101, the controller 110 of the master display apparatus 101 may change (e.g., a display) a displayed image in a certain year to an image in a year corresponding to the distance calculated during the movement. In response to the consecutive movements of the master display apparatus 101, the controller 110 of the master display apparatus 101 may consecutively change the displayed image in the certain year to the image in the year corresponding to the distance calculated during the movement.

In response to the distance between the master display apparatus 101 and the slave display apparatus 103, the controller 110 of the master display apparatus 101 may change (e.g., a display) a displayed video of 2002 to another video (e.g., video of 2006).

In response to the consecutive movements of the master display apparatus 101, the controller 110 of the master display apparatus 101 may change (e.g., a display) a displayed video in a certain year to a video in a year corresponding to the distance calculated during the movement. In response to the consecutive movements of the master display apparatus 101, the controller 110 of the master display apparatus 101 may consecutively change the displayed image in the certain year to the image in the year corresponding to the distance calculated during the movement.

According to another embodiment of the present disclosure, the controller 210 of the electronic apparatus 200 may transmit an image in a different year corresponding to the received distance information to the master display apparatus 101. In addition, the controller 210 of the electronic apparatus 200 may transmit an image in a different year corresponding to the updated distance information corresponding to the consecutive movements of the master display apparatus 101 to the master display apparatus 101.

Meanwhile, the controller 110 of the master display apparatus 101 may receive the image in the different year transmitted from the electronic apparatus 200. The controller 110 of the master display apparatus 101 may display the received image in the different year. The storage 180 may store the received image in the different year according to the control of the controller 110 of the master display apparatus 101.

According to another embodiment of the present disclosure, the operation of transmitting the image in the different year from the controller 210 of the electronic apparatus 200 to the master display apparatus 101 is substantially the same as the operation of displaying the image in the different year in the master display apparatus 101, and thus, the overlapped description is omitted.

According to another embodiment of the present disclosure, the display apparatuses 101 to 103 may display an image (not shown) as a close-range view, a medium-range view, or a distance view, respectively. For example, the slave display apparatus 102 may display the image (not shown) as the close-range view, the master display apparatus 101 may display the image (not shown) as the medium-range view, and the slave display apparatus 103 may display the image (not shown) as the distance view.

In response to the measured distance between the master display apparatus 101 and the slave display apparatus 103, the controller 110 of the master display apparatus 101 may change the image in the medium-range view as an image in another viewpoint. In addition, in response to the measured distance between the master display apparatus 101 and the slave display apparatus 102, the controller 110 of the master display apparatus 101 may change the image in the medium-range view as an image in another viewpoint.

According to another embodiment of the present disclosure, the controller 210 of the electronic apparatus 200 may transmit an image in a different viewpoint corresponding to the received distance information to the master display apparatus 101. In addition, the controller 210 of the electronic apparatus 200 may transmit an image in a different viewpoint corresponding to the updated distance information corresponding to the consecutive movements of the master display apparatus 101 to the master display apparatus 101.

The controller 210 of the master display apparatus 101 may display the received image in the different viewpoint.

According to another embodiment of the present disclosure, the operation of transmitting the image in the different viewpoint of the controller 210 of the electronic apparatus 200 with respect to the master display apparatus 101 is substantially the same as the operation of displaying the image in the different viewpoint in the master display apparatus 101, and thus, the overlapped description is omitted.

At operation S650 in FIG. 6, in response to different contents being displayed to correspond to a distance, the method for displaying a screen of the display apparatus ends.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The foregoing embodiments and advantages are not to be construed as limiting the present inventive concept. The present teaching can be readily applied to other types of devices. In addition, the description of the various embodiments is intended to be illustrative, and not to limit the scope of the claims, and many alternatives, modifications, and variations will be apparent to those skilled in the art.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for displaying a screen of a display apparatus, the method comprising:
   detecting an approach of a slave display apparatus by a master display apparatus in response to the master display apparatus displaying a first content and the slave display apparatus displaying a second content;
   determining a contact point where the master display apparatus and the slave display apparatus come into contact with each other by the master display apparatus;
   splitting the first content displayed in the master display apparatus into a plurality of content split screens corresponding to the contact point of the slave display apparatus; and
   transmitting at least one of the plurality of content split screens from the master display apparatus to the slave display apparatus,
   wherein the contact point is a portion of a bezel arranged at a side of the master display apparatus, and
   wherein, in response to a movement of the contact point moving along the side of the master display apparatus being detected, the splitting comprises splitting the first content displayed in the master display apparatus into a plurality of content split screens corresponding to the moved contact point of the slave display apparatus.

2. The method of claim 1, wherein the detecting of the approach of the slave display apparatus comprises detecting the approach of the slave display apparatus by using a distance measuring sensor of the master display apparatus.

3. The method of claim 1, further comprising:
   providing a feedback by using a light emitting diode (LED) bar of the master display apparatus which comes into contact with the slave display apparatus in response to the detected approach of the slave display apparatus.

4. The method of claim 1, further comprising:
   receiving display apparatus information on the slave display apparatus in response to the approach of the slave display apparatus, before the master display apparatus comes into contact with the slave display apparatus.

5. The method of claim 4, wherein the plurality of content split screens are generated by using the received display apparatus information on the slave display apparatus.

6. The method of claim 1, wherein the determining of the contact point of the slave display apparatus comprises determining the contact point by using at least one of a bezel touch sensor or a distance measuring sensor of the master display apparatus.

7. The method of claim 1, wherein the first content has an original size which is greater than a sum of sizes of the plurality of content split screens.

8. The method of claim 1, wherein the transmitting of the at least one of the plurality of content split screens to the slave display apparatus comprises transmitting the at least one of the plurality of content split screens to the slave display apparatus in response to one of a state before the master display apparatus and the slave display apparatus come into contact with each other and a state when the master display apparatus and the slave display apparatus come into contact with each other.

9. The method of claim 1, wherein the transmitting of the at least one of the plurality of content split screens to the slave display apparatus comprises:
   transmitting the at least one of the plurality of content split screens to the slave display apparatus in response to a time delay between displaying one of the plurality of content split screens in the master display apparatus, and
   displaying another one of the plurality of content split screens in the slave display apparatus.

10. The method of claim 1, wherein the transmitting of the at least one of the plurality of content split screens to the slave display apparatus comprises:
    transmitting the at least one of the plurality of content split screens to the slave display apparatus in response to a time delay between the displaying of one of the plurality of content split screens in the master display apparatus, and
    transmitting another one of the plurality of content split screens to the slave display apparatus.

11. The method of claim 1, further comprising:
    providing at least one of a visual feedback or an auditory feedback in response to the transmitting of the at least one of the plurality of content split screens from the master display apparatus to the slave display apparatus.

12. A display apparatus comprising:
    a display configured to display contents;
    a transceiver configured to be connected to a slave display apparatus;
    a sensor configured to measure a distance of the slave display apparatus; and
    a processor configured to control the display, the transceiver, and the sensor,
    wherein the processor is further configured to:
       detect an approach of the slave display apparatus by using the sensor,
       split the contents into a plurality of content split screens to correspond to a contact point of the slave display apparatus that the display apparatus and the slave display apparatus come into contact with each other, and
       transmit at least one of the plurality of content split screens to the slave display apparatus through the transceiver, and
    wherein the contact point is a portion of a bezel arranged at a side of the display apparatus, and
    wherein, in response to a movement of the contact point along the side of the display apparatus being detected, the processor splits the content displayed in the display apparatus into a plurality of content split screens corresponding to the moved contact point of the slave display apparatus.

13. The apparatus of claim 12, further comprising:
    a bezel touch sensor configured to be located in a bezel of the display,
    wherein the processor is further configured to detect a contact point of the slave display apparatus by using one of the sensor and the bezel touch sensor.

14. The apparatus of claim 13, wherein the sensor is located on at least one of a front surface, a rear surface, or a side surface of the bezel of the display.

15. The apparatus of claim 13, wherein the sensor is fixed on the display apparatus as a separate apparatus from the display apparatus.

16. The apparatus of claim 12, further comprising:
    a light emitting diode (LED) bar,
    wherein the processor is further configured to let the LED bar flicker in response to the detected approach of the slave display apparatus.

17. The apparatus of claim 12, wherein, in response to one of a state before the master display apparatus and the slave display apparatus coming into contact with each other and a state when the master display apparatus and the slave display apparatus come into contact with each other, the processor is further configured to transmit the at least one of the plurality of content split screens to the slave display apparatus through the transceiver.

18. The apparatus of claim 12, wherein the processor is further configured to receive display apparatus information on the slave display apparatus in response to the approach of the slave display apparatus, before the master display apparatus comes into contact with the slave display apparatus.

19. The apparatus of claim 18, wherein the plurality of content split screens are generated by using the received display apparatus information on the slave display apparatus.

20. A method for displaying a screen of a display apparatus, the method comprising:
- receiving detection of a movement of a first display apparatus among a plurality of display apparatuses which display contents according to a time sequence in a chronological order;
- receiving distance information corresponding to a detected distance between the first display apparatus and a slave display apparatus; and
- transmitting contents in a different time sequence in a chronological order corresponding to the received distance information to the first display apparatus.

\* \* \* \* \*